US00RE49215E

(19) United States
(12) Reissued Patent
McFarland

(10) Patent Number: US RE49,215 E
(45) **Date of Reissued Patent: *Sep. 20, 2022**

(54) WAVE GENERATING APPARATUS AND METHOD

(71) Applicant: American Wave Machines, Inc., Solana Beach, CA (US)

(72) Inventor: Bruce McFarland, Solana Beach, CA (US)

(73) Assignee: American Wave Machines, Inc., Solana Beach, CA (US)

( * ) Notice: This patent is subject to a terminal disclaimer.

(21) Appl. No.: 16/876,076

(22) Filed: May 17, 2020

Related U.S. Patent Documents

Reissue of:
(64) Patent No.: 9,068,371
Issued: Jun. 30, 2015
Appl. No.: 14/105,817
Filed: Dec. 13, 2013

U.S. Applications:
(63) Continuation of application No. 15/246,233, filed on Aug. 24, 2016, now Pat. No. Re. 48,000, which is an (Continued)

(51) Int. Cl.
*E04H 4/00* (2006.01)
*A63G 31/00* (2006.01)

(Continued)

(52) U.S. Cl.
CPC ..... *E04H 4/0006* (2013.01); *A63B 69/0093* (2013.01); *A63B 71/04* (2013.01); *A63G 31/007* (2013.01); *Y10T 29/49947* (2015.01)

(58) Field of Classification Search
CPC ... E04H 4/0006; A63B 69/0093; A63B 71/04; A63G 31/007; Y10T 29/49947
See application file for complete search history.

(56) References Cited

U.S. PATENT DOCUMENTS 3,802,697 A * 4/1974 Le Mehaute ..... A63G 3/02 482/51
3,913,333 A 10/1975 Hubbard, Jr. ..... E02B 3/06 405/31

(Continued)

FOREIGN PATENT DOCUMENTS

DE 10 2004 013 367 10/2005

OTHER PUBLICATIONS http://commons.wikimedia.org/wiki/File: Elevon. f117 .arp. 750pix. jpg.

(Continued)

*Primary Examiner* — Joseph A Kaufman
(74) *Attorney, Agent, or Firm* — Manuel de la Cerra

(57) ABSTRACT

A wave forming apparatus has a channel for containing a flow of water with an inlet end connected to a water supply, a floor, and spaced side walls, a first bed form or weir at the inlet end of the channel, and a second bed form in the channel downstream of the first bed form. Also disclosed is a wave forming apparatus has a channel for containing a flow of water, the channel having an inlet end connected to a water supply for supplying a flowing stream of water, a floor, and spaced side walls, and at least one oblique foil member adjustably mounted in the floor of the channel. The foils, weirs or bed form, form a standing wave.

11 Claims, 53 Drawing Sheets

Related U.S. Application Data application for the reissue of Pat. No. 9,068,371, which is a continuation of application No. 13/740,419, filed on Jan. 14, 2013, now Pat. No. 9,103,133, said application No. 14/105,817 is a continuation of application No. 13/603,223, filed on Sep. 4, 2012, now Pat. No. 9,279,263, which is a continuation-in-part of application No. 13/411,520, filed on Mar. 3, 2012, now Pat. No. 8,434,966, said application No. 14/105,817 is a continuation of application No. 12/943,876, filed on Nov. 10, 2010, now Pat. No. 8,622,651, which is a continuation-in-part of application No. 12/700,042, filed on Feb. 4, 2010, now Pat. No. 8,523,484, and a continuation-in-part of application No. 12/700,036, filed on Feb. 4, 2010, now Pat. No. 8,303,213, said application No. 12/700,042 is a continuation-in-part of application No. 12/356,666, filed on Jan. 21, 2009, now Pat. No. 7,722,291, said application No. 12/943,876 is a continuation-in-part of application No. 11/550,239, filed on Oct. 17, 2006, now Pat. No. 7,658,571.

(60) Provisional application No. 61/721,304, filed on Nov. 1, 2012, provisional application No. 61/022,680, filed on Jan. 22, 2008.

(51) Int. Cl.
*A63B 69/00* (2006.01)
*A63B 71/04* (2006.01)

(56) References Cited

U.S. PATENT DOCUMENTS

| | | | | |
|---|---|---|---|---|
| 4,537,143 | A | 8/1985 | Gaide | B63B 32/60 441/79 |
| 5,401,117 | A | 3/1995 | Lochtefeld | A63B 69/0093 4/491 |
| 5,443,326 | A | 8/1995 | Bernard et al. | A63C 19/00 405/21 |
| 5,795,099 | A | 8/1998 | Parker | |
| 6,019,547 | A | 2/2000 | Hill | A63G 31/007 4/491 |
| 6,336,771 | B1 | 1/2002 | Hill | A63G 31/007 405/79 |
| 6,629,803 | B1 | 10/2003 | McFarland | A63G 3/02 405/79 |
| 6,932,541 | B2 | 8/2005 | McFarland | |
| 6,957,662 | B2 | 10/2005 | Lochtefeld et al. | A63G 3/00 104/70 |
| 7,326,001 | B2 | 2/2008 | McFarland | A63G 3/00 405/79 |
| 8,622,651 | B2 * | 1/2014 | McFarland | E04H 4/0006 405/79 |
| 2003/0004003 | A1 | 1/2003 | Lochtefeld | |
| 2003/0198515 | A1 | 10/2003 | McFarland | |
| 2010/0135727 | A1 | 6/2010 | McFarland | A63G 31/007 405/79 |

OTHER PUBLICATIONS http://en.wikipedia.org/wiki/Hydraulic_jump.
Claim Chart.

* cited by examiner

WAVE GENERATING APPARATUS AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application is a continuation of U.S. patent application Ser. No. 12/943,876, filed Nov. 10, 2010, which is a continuation-in-part of U.S. patent application Ser. No. 12/700,042, filed Feb. 4, 2010, now U.S. Pat. No. 8,523,484, issued Sep. 3, 2013, which is a continuation-in-part of U.S. patent application Ser. No. 11/550,239, filed Oct. 17, 2006, now U.S. Pat. No. 7,658,571, issued Feb. 9, 2010, and which is a continuation-in-part application of U.S. patent application Ser. No. 12/356,666, filed Jan. 21, 2009, now U.S. Pat. No. 7,722,291, issued May 25, 2010, which claims the benefit of U.S. Provisional Application No. 61/022,680, filed Jan. 22, 2008. U.S. patent application Ser. No. 12/943,876, filed Nov. 10, 2010, is also a continuation-in-part of U.S. patent application Ser. No. 12/700,036, filed on Feb. 4, 2010, now U.S. Pat. No. 8,303,213, issued Nov. 6, 2012, and a continuation-in-part of U.S. patent application Ser. No. 11/550,239, filed Oct. 17, 2006, now U.S. Pat. No. 7,658,571, issued Feb. 9, 2010.

The present application is a continuation of U.S. patent application Ser. No. 13/603,223, filed Sep. 4, 2012, which is a continuation-in-part of U.S. patent application Ser. No. 13/411,520, filed Mar. 3, 2012, now U.S. Pat. No. 8,434,966, issued May 7, 2013.

The present application is a continuation of U.S. patent application Ser. No. 13/740,419, filed Jan. 14, 2013, which claims the benefit of U.S. Provisional Application No. 61/721,304, filed Nov. 1, 2012.

Each of which is hereby incorporated in its entirety including all tables, figures, and claims.

FIELD OF THE INVENTION

The present invention relates generally to a wave forming apparatus and is partially concerned with water rides of the type provided in water-based amusement parks, particularly a wave forming apparatus and method for forming surfable waves, or a water toy.

BACKGROUND

Naturally occurring waves occur in the ocean and also in rivers. These waves are of various types, such as moving waves which may be of various shapes, including tubular and other breaking waves. A relatively rare type of wave in nature is the standing wave, which has a steep, unbroken and stable wave face. This type of wave can have enough power and velocity to support surfing on the wave face without causing the wave to decay rapidly. This wave, if forced to decay, for example by overly obstructing the flow, reforms naturally when the obstructions are removed. Natural standing waves have been shown to occur where water flows across natural river bed formations, known as anti-dunes. Upon flow over anti-dunes, the water flow rises into a natural standing wave. Natural standing waves occur in the Waimea Bay river mouth of the Waimea River on the Hawaiian island of Oahu, on the Snake River in Wyoming, and several other places.

Surfers are constantly searching for good surfing waves, such as tubular breaking waves and standing waves. There are only a few locations in the world where such waves are formed naturally on a consistent basis. Thus, there have been many attempts in the past to create artificial waves of various types for surfing in controlled environments such as water parks. In some cases, a sheet flow of water is directed over an inclined surface of the desired wave shape. Therefore, rather than creating a stand-alone wave in the water, the inclined surface defines the wave shape and the rider surfs on a thin sheet of water flowing over the surface. This type of apparatus is described, for example, in U.S. Pat. Nos. 5,564,859 and 6,132,317 of Lochtefeld. In some cases, the inclined surface is shaped to cause a tubular form wave. Sheet flow wave simulating devices have some disadvantages. For example, since these systems create a fast moving, thin sheet of water, they produce a different surfing experience to a real standing wave.

In other prior art wave forming devices, a wave is actually simulated in the water itself, rather than being defined by a surface over which a thin sheet of water flows. U.S. Pat. No. 6,019,547 of Hill describes a wave forming apparatus which attempts to simulate natural antidune formations in order to create waves. A water-shaping airfoil is disposed within a flume containing a flow of water, and a wave-forming ramp is positioned downstream of the airfoil structure. In other prior art arrangements, such as U.S. Pat. No. 3,913,332 of Forsman, a wave generator is driven around a circular body of water in order to create waves. This arrangement is also complex and will produce traveling waves, not standing waves.

Apparatus for forming deep water standing waves is described in my prior U.S. Pat. Nos. 6,629,803 and 6,932,541. This apparatus creates waves that simulate natural standing waves. Use of an oblique bed form extending across the width of the channel or two intersecting water flows to create a barreling wave is described in these patents.

SUMMARY

According to one aspect, a wave forming apparatus for producing a standing wave is disclosed that contains a passageway, a channel, a weir that extends from a peak downwardly into the channel, a reservoir having a throat section adapted to guide water over the peak of the weir and into the channel, at least one pump adapted to convey water from the passageway to the reservoir, and at least one foil in the channel at a distance downstream from the weir. The channel maybe positioned above the passageway, and the pump, during operation, produces a liquid level in the channel and water flowing down the weir that combine to form the standing wave at or adjacent to the at least one adjustable foil.

According to another aspect, a artificial surfing facility for producing a standing wave is disclosed that contains a main pool, a wave pool, a inclined ramp, a lower end of which discharges into the wave pool, a flow section connected at an outlet end thereof to an upper end of the ramp, at least one pump connected to an inlet end of the flow section by means of which water is conveyed from the main pool to the flow section, and at least one adjustable guide device in the wave pool at a distance downstream from the lower end of the ramp. The wave pool may be positioned above the main pool, and the pump unit, during operation, produces a liquid level in the wave pool sufficient to produce a defined resistance to water flowing down the ramp which will enable formation of the standing wave at the at least one adjustable guide device.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for an apparatus and method for forming waves in a water ride or water feature. For example, one method as disclosed herein allows for formation of an adjustable barreling or tubing wave which turns back at the peak to form a tube or tunnel and for adjustment of the barreling wave formation so that the wave travels.

After reading this description it will become apparent to one skilled in the art how to implement the invention in various alternative embodiments and alternative applications. However, although various embodiments of the present invention will be described herein, it is understood that these embodiments are presented by way of example only, and not limitation.

Figure 1:
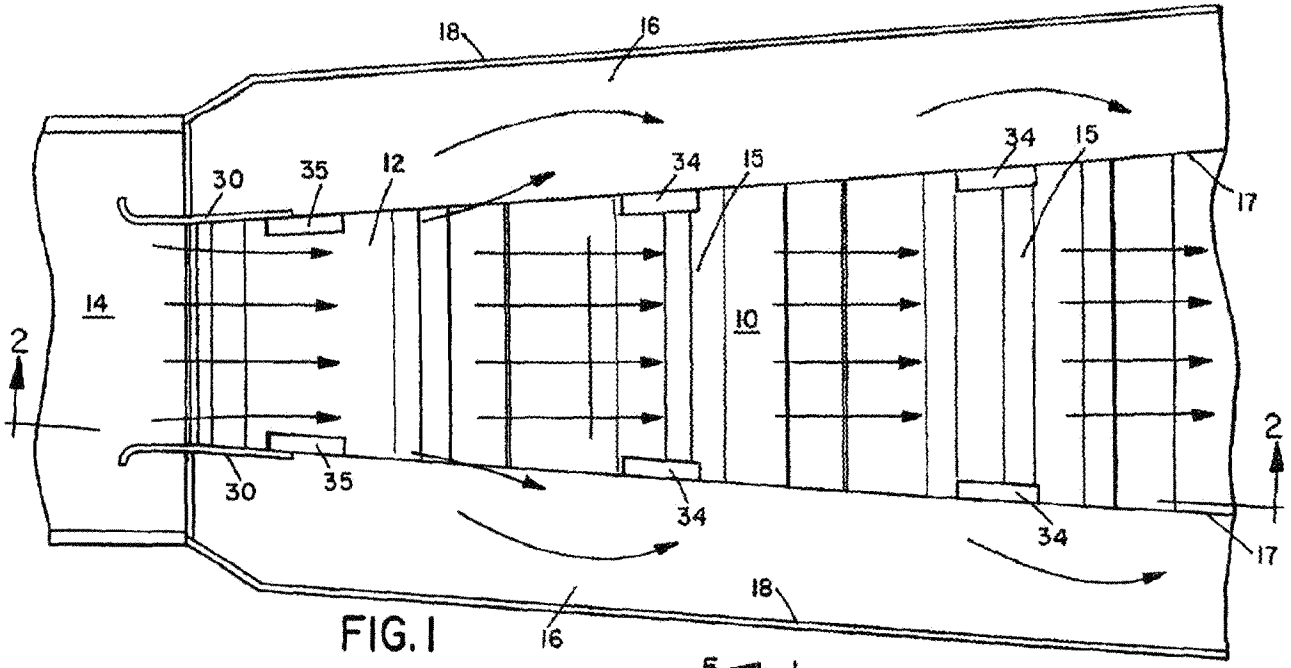
FIG. 1 is a top plan view of a wave forming apparatus according to a first exemplary embodiment.
Figure 2:
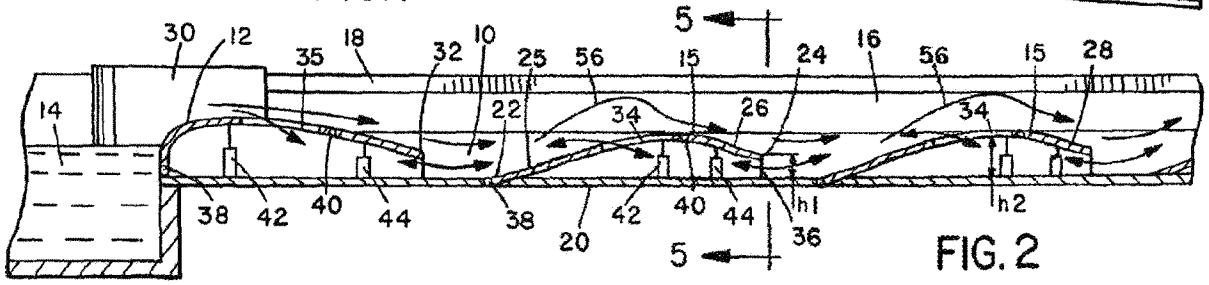
FIG. 2 is a sectional view taken along lines 2-2 of FIG. 1, showing the basic water flow.
Figure 5:
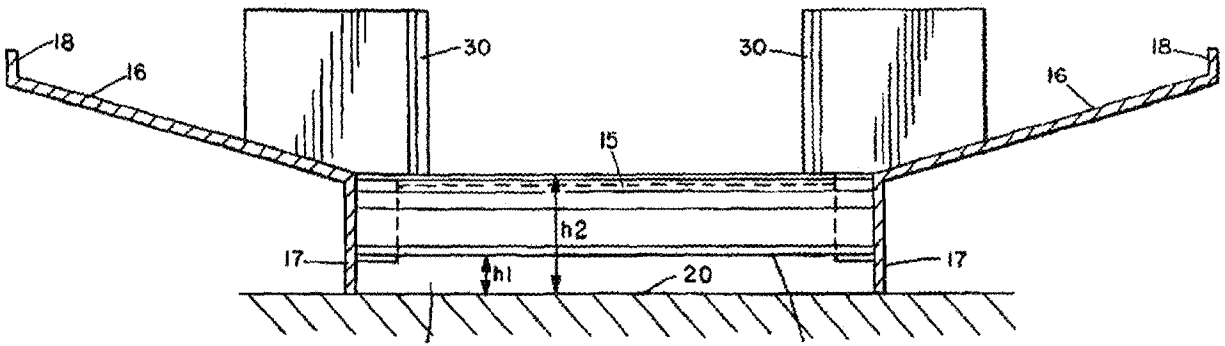
FIG. 5 is an enlarged sectional view taken on lines 5-5 of FIG. 2.

FIGS. 1, 2 and 5 illustrate a wave forming apparatus according to a first embodiment for forming rideable, standing waves. The apparatus basically comprises a channel 10 for containing a flow of water, the channel having a weir 12 at its inlet end connected to a supply of water in a reservoir 14, and a series of spaced bed forms 15 in the channel downstream of the weir. Sloping side walls or entry/exit portions 16 extend outwardly from opposite sides 17 of the wave forming channel 10 to the outer sides 18 of the apparatus, which are spaced outwardly from the outer sides of channel 10, as best illustrated in FIGS. 1 and 5.

As best illustrated in FIG. 2, the channel 10 has a floor 20 and the weir 12 and bed forms 15 are provided at spaced intervals along the channel, mounted in the floor of the channel and extending between the opposite side walls of the channel, to define a primary flow path for water over the weir and the bed forms. In the embodiment of FIGS. 1, 2 and 5, the opposite sides 17 of the channel 10 are shown to taper outwardly from the inlet end of the channel, at weir 12, to the opposite end of the channel. However, the sides 17 may alternatively be straight, as in the embodiment of FIGS. 15 and 16, discussed in more detail below, or taper inwardly.

The bed forms 15 are each of similar or identical shape and have a leading end 22 and a trailing end 24, with an upstream face 25 inclined upwardly to a peak or upper portion, and a downstream face 26 with a downwardly inclined, convex curvature extending from the peak towards the trailing end 24. As best illustrated in FIG. 2, the upstream end 22 is flush with the floor 20 of the channel, for improved safety. The downstream face has a re-curve or change in curvature adjacent the trailing end, such that it terminates in a generally flat or horizontal portion 28. The trailing end 24 is spaced above the floor 20 of the channel to form an abrupt vertical cut-off, as indicated in FIG. 2. The tail elevation factor TEF, or ratio of the height h1 of the trailing end 24 of the bed form above the floor of the channel to the height h2 at the top or peak of the next bed form is designed to be in a predetermined range which has been found to produce standing waves. The range in TEF may be in the range from 0.125 to 0.75 while still producing rideable standing waves.

The weir 12 also extends upwardly from the floor, with a trailing end at the inlet from reservoir 14. Spaced inlet side walls 30 extend from a location in reservoir 14 outwardly along opposite sides of weir 12. This has been found to smooth the water flow from the reservoir into the channel 10. The weir 12 is of an airfoil like shape, extending upwardly from the leading edge to a peak and then having a convex downward curvature up to trailing edge 32, which is also spaced above the floor 20 of the channel.

In the embodiment of FIG. 2, the weir and bed forms 12 and 15 may be of any suitable sheet material construction, such as metal, strong plastic material, or thin concrete and have a hollow interior. The bed forms each have a pair of elongate side vents 34 along opposite sides of the bed form extending across the peak of the bed form, as best illustrated in FIGS. 1 and 2. Similarly, the weir 12 has a pair of elongate side vents 35 on its opposite sides, extending along part of the downwardly inclined face. The raised trailing ends of the weir and bed forms also each form a vent 36 extending across the width of the channel, which defines, together with side vents 34, a secondary flow path for water traveling along channel 10.

The weir and bed form may each be supported by height adjusters under or adjacent the peak or highest point of the bed form, such as height adjuster 42 as illustrated in FIG. 2. Shorter height adjusters 44 are provided to support the tail end portion of the weir and bed forms. The height adjusters 42 and 44 are adjustable in height, with the opposite sides of the weir and bed forms sliding against the channel side walls 17. In an exemplary embodiment, two spaced height adjusters 42 and two spaced height adjusters 44 are provided, with each height adjuster being approximately one quarter of the bed form width inwardly from the adjacent side wall 17, and spaced apart from the other height adjuster by a distance equal to half the bed form width. A greater number of height adjusters may be provided if required for additional support.

In order to provide adjustability in the secondary flow, the height adjusters 42 and 44 vary the bed form and tail elevation. In the illustrated embodiment, the weir and bed forms are each secured to the channel floor at the leading end via a first pivot 38, and a trailing end portion of the weir and bed forms is formed as a separate section pivoted to the remainder at a second pivot 40. The height adjuster 42 acts between the floor of the channel and the upstream pivoted portion of the weir and bed form, and the second height adjuster 44 acts between the floor of the channel and the pivoted trailing end portion of the weir and bed forms. The first height adjuster 42 changes the height of the peak of the weir or bed form, while the second height adjuster changes the elevation of the tail end of the weir or bed form, thus changing the vent height and the amount of secondary flow into or out of the tail end vent. The two height adjusters can therefore be adjusted to vary the TEF ratio.

Figure 8:
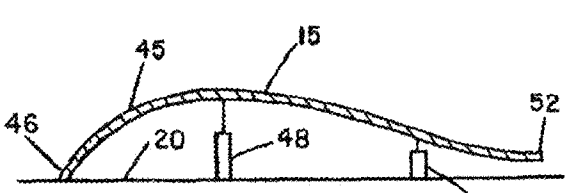
FIG. 8 is a sectional view illustrating another modified bed form with vent height adjustability.
Figure 9:
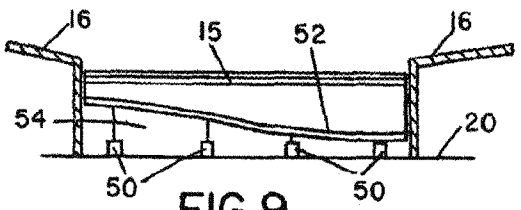
FIG. 9 is an end view of the bed form of FIG. 8, illustrating the height adjusters across the width of the vent.

FIGS. 8 and 9 illustrate a modified height adjustment mechanism for a bed form 15. In this case, rather than pivoted sections, each bed form is a hollow shell 45 formed from a flexible material and secured to the floor 20 of the channel at the leading end 46 only. A first series of spaced height adjusters 48 extend at spaced intervals across the channel between the floor of the channel and the inner surface of the shell 45 adjacent the peak of the bed form. A second series of spaced height adjusters 50 extend at spaced intervals across the width of the bed form adjacent the trailing end 52. Thus, the height adjusters 50 can be extended by different amounts, as in FIG. 9, in order to vary the height of the secondary passageway vent 54 across the width of the channel, to vary the standing wave properties. Useful waves can be created with different elevations across the width of the tail, for example one side may be at TEF=0 and the other side at TEF=0.8. This still creates a rideable wave. If the rams 50 are eliminated, the tail end of the bed form in FIG. 8 is self-adjusting in height. This creates an oscillating wave which may be desirable in some cases.

Although the embodiments of FIGS. 1, 2 and 5 and FIGS. 8 and 9 have both weirs and bed forms with height adjustment devices, the apparatus may alternatively have fixed weirs, without any height adjusters, combined with adjustable bed forms, or may have both fixed weirs and fixed bed forms of the same general shape illustrated in the drawings. The adjustability is provided as a means for the operator to vary the wave conditions as desired. However, this may not be necessary in all cases. In general, the height h2 of the peak of the bed form is in the range of half of the inner flume height to 1.5 times the inner flume height. In FIG. 5, the bed form height is approximately equal to the inner flume height. The inner flume height is dependent on the application requirements, and in one embodiment of a water park attraction the flume height may be around ⅙ of the width of the flume.

In the apparatus illustrated in FIGS. 1, 2 and 5 and the alternative of FIGS. 8 and 9, water flows from the reservoir in a primary flow path over the top of weir 12 and over each of the successive bed forms. At the same time, as indicated by the arrows 55, a secondary flow path is provided via the side vents and trailing end vents of the weir and bed forms. This secondary flow may be in either direction, i.e. from the trailing end back under the bed form and out at the peak of the bed form, or vice versa, depending on overall flow conditions. The provision of a secondary flow passageway through the bed form with a vent at the trailing edge of the bed form has been found to produce a stable standing wave 56 at the upstream face of the next bed form in the channel, as indicated in FIG. 2. The standing wave formation is enhanced by the provision of the shallow sloping side wall portions 16, which provide for some flow outside channe 10, as indicated in FIG. 1. In general, it is desirable that the flume be deeper in the channel or wave forming area 10 that contains the bed forms, and shallower just beyond the sides of the bed forms. This channels the water over the bed forms, and prevents too much water from escaping around the bed forms, while allowing the sides of the top portion of the standing wave to vent sideways. This is believed to help prevent the standing wave from decaying. The slight upward inclination out to the opposite sides 18 of the apparatus also helps to return water towards the center of the channel, helping additional wave formation at subsequent downstream bed forms.

Figure 17:
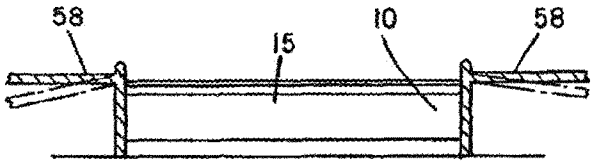
FIG. 17 is a sectional view similar to FIG. 5, but on a reduced scale, illustrating alternative side portions at opposite sides of the wave forming channel.

Although the opposite side portions 16 extending from opposite sides of the channel 10 and bed forms out to the outer sides 18 of the wave forming apparatus are shown in FIG. 5 as having a slight upward slope, they may alternatively be flat or even have a slight downward slope, as indicated in FIG. 17.

FIG. 17 is a view similar to FIG. 5 of a modified flume structure in which flat, shallow outer side portions 58 are provided on opposite sides of the channel. The side portions 58 may alternatively be inclined slightly downwardly, as indicated in dotted outline. It has been found that the side portions 16 or 58 may have an inclination in the range from −5 degrees up to +10 degrees. Any angle in this range has the desired effect of standing wave formation under the proper flow conditions, although an inclination above 0 degrees has the advantage of returning water back into the channel downstream of a first standing wave. In one embodiment, each side portion 16, 58 has a width equal to at least 33% of the channel width for optimum wave sustaining effect. If the side portions are of different widths, one side may have a width of 25% of the channel width if the other side is wider.

The reservoir 14 is continuously supplied with water via a suitable water-recirculating system of a type well known in the field of water park rides, in which water leaving the end of channel 10 is pumped back into the reservoir. The water re-circulation path may be beneath the channel 10, around one or both sides of the channel, or from other adjacent, linked rides.

The combination of features in FIG. 2, i.e. the specific bed form shape, the secondary passageways, and the shallow outer side portions 16, has been found on testing to lead to stable standing wave formation. This, in turn, produces a wave riding water ride suitable for a water amusement park. The shallow outer side portions 16 also provide a convenient means for a rider to enter and exit the ride. The side vents 34, 35 and end vents 36 are covered with gratings (not illustrated) for rider safety. The standing wave 56 in one embodiment has a steep, unbroken, and stable wave face which is good for surfing. Variation of the trailing end vent height across the width of the bed form, as in FIG. 9, may be used, if desired, to create effects such as a sideways breaking wave. The height adjusters 42, 44 may be adjusted to produce a desired sequence of standing, stable waves.

Figure 3:
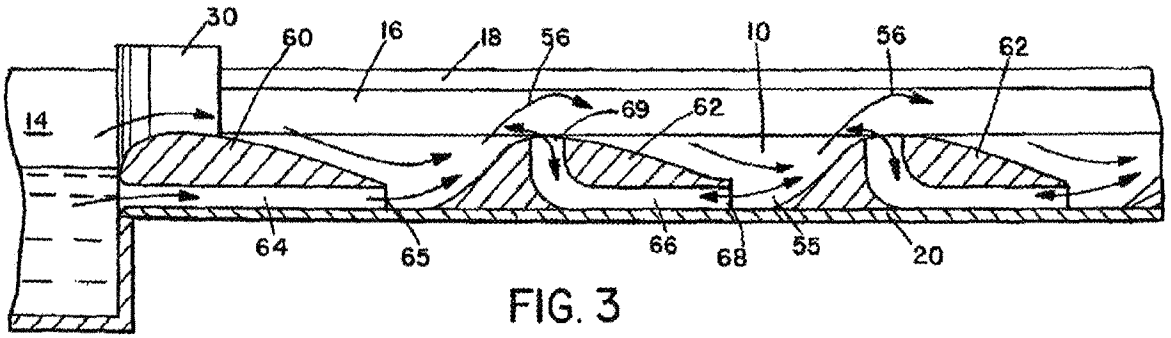
FIG. 3 is a sectional view similar to FIG. 2, showing a modified apparatus.

The weir and bed forms of FIGS. 2 and 8 are hollow shells which provide the secondary passageways back under the shell via suitable venting. Although the vents 34, 35 are spaced side vents in the illustrated embodiment, a vent extending across the top of the bed form may alternatively be provided. However, side vents avoid the need for a safety grating across the entire top of the bed form. Additionally, instead of forming the weir and bed forms by separate shaped sheet-like members secured in the channel, they may alternatively be formed or molded integrally in the floor of the channel as solid structures. FIG. 3 illustrates a modified wave forming apparatus according to another embodiment, in which the hollow shell weir and bed forms are replaced with a solid weir 60 and solid bed forms 62 spaced downstream of weir 60. The remainder of the apparatus, apart from the weir and bed forms, is identical to that of FIGS. 1 and 2, and like reference numerals have been used for like parts as appropriate.

The weir 60 is of identical surface shape to the hollow weir 12 of FIG. 2, but has a passageway 64 extending under the weir from the leading end to the trailing end 65, instead of the vent structure of FIG. 2. The bed forms 62 are also of identical shape to the bed forms 15 of FIG. 1, but the vent openings 34, 36 are replaced with passageways 66 through the bed forms. Each passageway 66 has one end opening 68 at the trailing end of the bed form, and another end opening 69 adjacent the peak of the bed form. Two openings 69 may be provided on opposite sides of bed form 62, with two spaced passageways 66 ending in a chamber extending across the width of the bed form and terminating at opening 68. Alternatively, a single opening 69 and passageway 66 may be provided. This arrangement produces standing waves under appropriate flow conditions in an identical manner to the previous embodiment.

Figure 4:
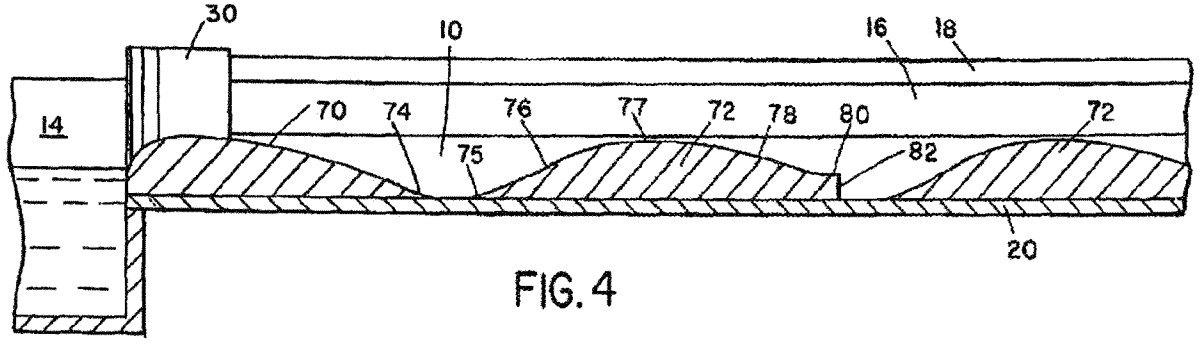
FIG. 4 is a sectional view similar to FIGS. 1 and 2 illustrating another embodiment of the wave forming apparatus.

FIG. 4 illustrates another modified embodiment, which has a similar solid weir and bed form arrangement to FIG. 3, but the secondary flow passageways are eliminated altogether. The structure in FIG. 4 is again identical to that of FIGS. 1 and 2, apart from the weir and bed forms, and like reference numerals are used for like parts as appropriate. In FIG. 4, a weir 70 is provided at the inlet end of channel 10 adjacent the reservoir outlet and a series of spaced, solid bed forms 72 of identical shape are provided along channel 10 downstream of the weir. The weir 70 is of similar, airfoil shape to the weir 60 of FIG. 4, but rather than having an abrupt vertical cut off at the trailing edge, the trailing edge 74 of weir 70 continues to curve downwardly to meet the floor 20 of the channel at a smooth transition.

The bed forms 72 are of similar or identical shape to the bed forms 15 and 52 of the previous embodiments, with a leading edge 75 which has a flush transition with the floor 20 of the channel, an upwardly inclined leading face 76, a peak 77, a downwardly inclined, concave trailing face 78, and a recurved, substantially flat trailing end portion 80 with an abrupt vertical drop off face 82 at the trailing end of the bed form. It has been found that an abrupt drop off, such as vertical face 82 or the trailing end drop offs of FIGS. 2 and 3, helps to create a stable standing wave at the leading face of the next bed form. This effect occurs in this embodiment without the secondary flow passageways.

Figure 6:
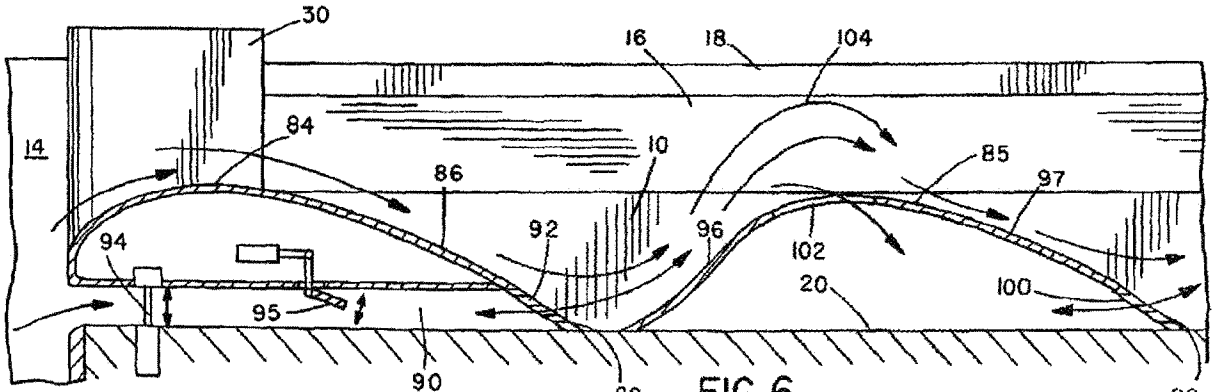
FIG. 6 is an enlarged sectional view similar to FIG. 2 illustrating another embodiment of a wave forming apparatus, with flow control mechanisms.

In the embodiments of FIGS. 1 to 5, the bed forms each have an abrupt trailing edge vertical drop off, with the trailing end of the bed form raised above the channel by a predetermined height, either with or without secondary flow paths for water through the bed form. FIG. 6 illustrates another alternative embodiment which has secondary water flow passageways, but no vertical drop off at the trailing edge of the weir or bed forms. Other parts of the wave forming apparatus are otherwise identical to the previous embodiments, and like reference numerals have been used as appropriate.

In the embodiment of FIG. 6, the channel 10 has a shaped weir 84 at the entry or reservoir end, and one or more bed forms 85 at spaced intervals downstream of weir 84. The weir and bed forms are of hollow shell construction, as in FIGS. 1 and 2, but may alternatively be of solid construction with formed passageways, as in FIG. 3. The weir is of generally airfoil like shape, and has a curved, convex trailing face 86 which extends down to merge smoothly with the floor 20 of the channel at its trailing end 88. A secondary passageway 90 extends from reservoir 14 through the lower part of the weir up to the trailing end 88, with a safety grating 92 covering the open, trailing end of passageway 90. The passageway 90 may be provided with one or more flow control devices, such as height adjuster 94 and flap valve 95. The adjustable weir 84 of FIG. 6 may used in place of weir 12 of FIG. 2, or in any of the other embodiments to provide added adjustability of water flow at the leading end of the channel.

The bed form 85 has a shape similar to bed form 15 of FIG. 1, with a generally concave, upwardly inclined leading face 96 leading up to a peak, and a downwardly inclined, generally convex trailing face 97. However, the shape at the trailing end is different from the previous embodiments, since the trailing end cut off is eliminated, and the trailing face instead curves smoothly down to meet the floor 20 of the channel at its trailing end 98. As in the previous embodiments, a secondary water flow passageway is provided through the bed form 85 via a vent opening 100 at the trailing end and vent openings 102 on opposite sides of the bed form which extend over the peak of the bed form. The vent openings are covered with gratings for safety.

In this embodiment, the secondary passageway through the bed form, along with the shallow side portions 16 on opposite sides of the deeper channel containing the bed forms, and the shape of the bed forms, tends to create a standing wave 104 at the first bed form 85 and each subsequent bed form in the channel, as in the previous embodiments. The weir and bed forms may alternatively be of solid construction with through passageways, as in FIG. 3.

Figure 7:
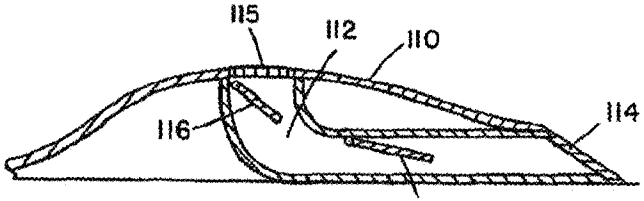
FIG. 7 is a sectional view of a single bed form forming part of a modified wave forming apparatus.

FIG. 7 illustrates an alternative bed form structure 110 which may be used in place of the bed forms 15 of the first embodiment. In this case, rather than permitting flow circulation in the entire area under the bed form, the flow is channeled through one or more passageways 112 via a vent or slot 114 at the trailing end of the bed form, and a vent or slot 115 adjacent the peak of the bed form. Each vent 114, 115 and the associated passageway 112 may extend across the width of the bed form, or two side slots may be provided as in FIGS. 1 and 2 to communicate via spaced passageways with a full width vent 115. Flow control flaps or valves 116 are provided in the passageway 112 to control the secondary flow, so that the size and stability of the subsequent standing wave can be controlled more readily.

Figure 10:
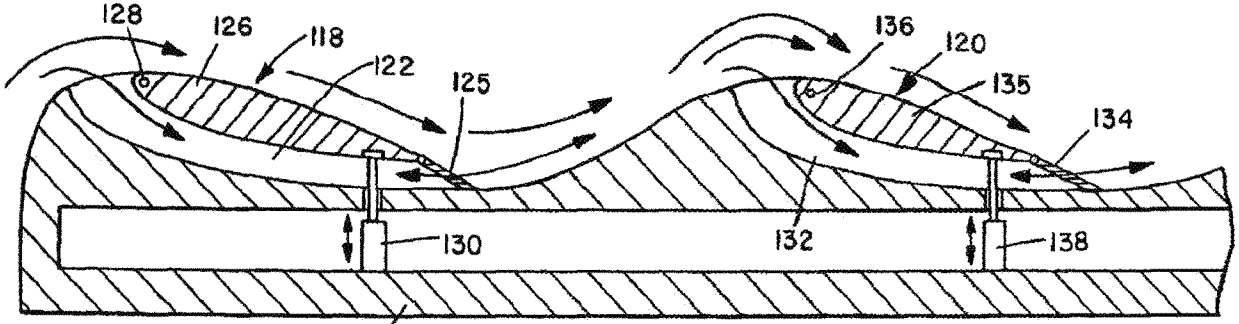
FIG. 10 is an enlarged sectional view similar to FIG. 6, illustrating another embodiment of the wave forming apparatus.

FIG. 10 illustrates a wave forming apparatus according to another embodiment, in which the weir 118 and bed forms 120 are actually molded into the floor 121 of the channel, out of concrete or the like. The weir 118 has a passageway 122 extending from the leading end to a trailing end vent covered with a pivoted grating flap 125 which rests freely against the floor 121. The upper portion 126 of the weir is pivoted at its leading end via pivot 128 and supported adjacent its trailing end by one or more height adjusters 130 spaced across the width of the passageway 122, acting between the floor 121 and portion 126. Thus, the secondary flow rate can be readily adjusted simply by extending or retracting ram 130, either lifting the free end of portion 126 to increase the size of vent opening 124, or lowering portion 126 to reduce the vent size.

The bed form 120 is of similar shape to the previous embodiments, and has a secondary flow passageway 132 extending from a location adjacent the peak or highest point of the bed form to the trailing end of the bed form, wherein the vent is again covered with a pivoted grating flap 134 permitting height adjustment. An upper portion 135 of the bed form 120 is pivotally mounted at its leading end via pivot 136, and supported at its trailing end by one or more height adjusters 138 spaced across the width of the bed form, extending between floor 121 and the portion 135. Again, this permits the size of the trailing end vent, and thus the amount of secondary flow in either direction through channel 132, to optimize the standing wave 139.

Figure 11:
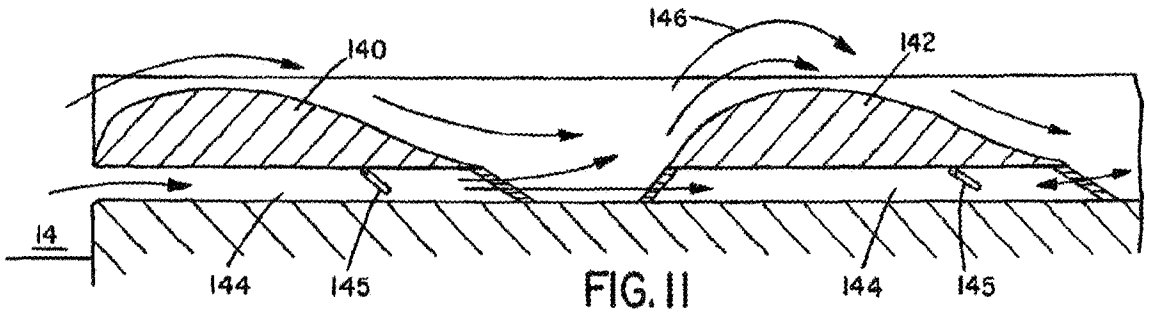
FIG. 11 is a view similar to FIG. 10 illustrating another embodiment of the wave forming apparatus.

FIG. 11 illustrates an alternative embodiment in which both the weir 140 and bed forms 142 have secondary flow passageways 144 extending from the leading end to the trailing end. Each passageway 144 has a flow control valve 145 for adjusting the amount of secondary water flow. The vent openings at each end of the bed form passageways, and the trailing end of the weir passageway, are covered with safety gratings. The bed forms are of similar shape to the previous embodiments, and are mounted in an apparatus similar to that illustrated in FIGS. 1 and 2, with shallow side portions outside the channel containing bed forms 142. As in the previous embodiments, the arrangement is such that rideable standing waves 146 forms adjacent the peak of the first bed form 142 and each subsequent bed form.

Figure 12:
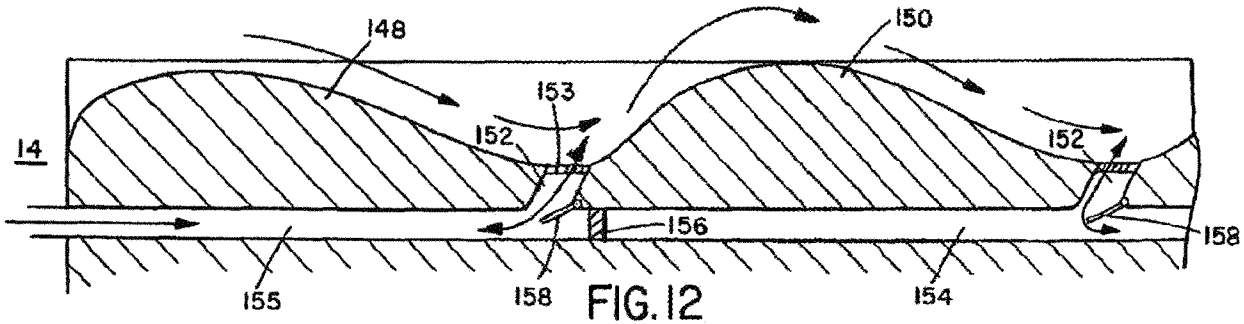
FIG. 12 is a view similar to FIGS. 10 and 11, illustrating another modified embodiment of the wave forming apparatus.

FIG. 12 illustrates another modification in which a weir 148 is followed by subsequent bed forms 150 of similar shape to the previous embodiments. However, in this case, rather than providing a secondary flow passageway extending from the peak or leading end of the bed form to the trailing end of the bed form, secondary water flow is instead provided via a vent passageway or opening 152 located between each adjacent pair of bed forms, and between the weir and first bed form.

The passageways 152 are each covered by a safety grating 153 at their open end and communicate with a single through passageway 154 extending through the floor of the channel beneath the bed forms. A first portion 155 of the passageway beneath the weir is cut off from the subsequent portion of the passageway extending beneath the bed forms via wall 156. A flow control valve 158 is provided at the junction between each vent passageway 152 and the first portion 155. This arrangement helps standing waves to form by permitting flow into and out of the area beneath the standing wave.

The embodiment of FIG. 12 may be incorporated in an apparatus as generally illustrated in FIG. 1 with a central, deeper channel containing the weir and bed forms, and shallow side portions on each side of the channel. The valves 158 provide additional control for adjusting the properties of the standing waves formed over the bed forms.

Figure 14:
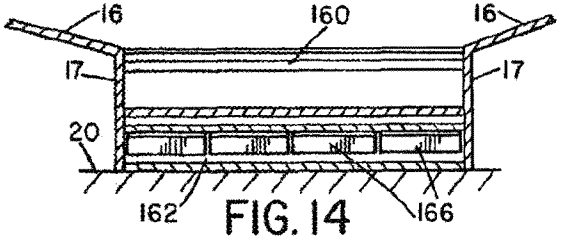
FIG. 14 is a sectional view on the lines 14-14 of FIG. 13.
Figure 13:
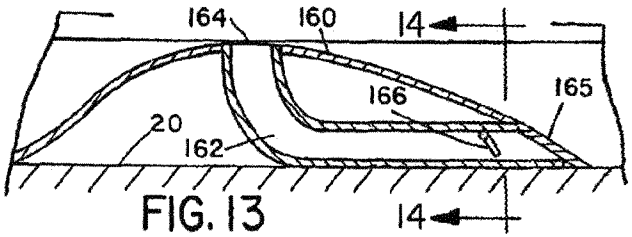
FIG. 13 is a view similar to FIG. 7, illustrating an alternative flow control.

FIGS. 13 and 14 illustrate another modified bed form 160 which may be used in place of the bed forms 15 of FIGS. 1 and 2 in a wave forming apparatus. The apparatus is otherwise identical to that of FIGS. 1, 2 and 5, and like reference numerals have been used for like parts as appropriate. In FIG. 13, the bed form is of similar shape to that of FIG. 6, although it may have a shape similar to that of FIG. 2, with a re-curved trailing end and a sharp vertical drop off. A secondary flow passageway 162 is provided from a vent opening or slot 164 at the peak of the bed form to a trailing end vent 165 covered by a grating. The trailing end vent 165 extends across the full width of the bed form, as indicated in FIG. 14.

A series of flap valves 166 are provided across the width of passageway 162 adjacent the trailing end vent opening. This allows the opening size to be varied across the width of the vent 165, to produce various effects in the subsequent standing wave formed downstream of bed form 160. For example, by closing the flaps 166 successively across the width of the vent 165, a sideways breaking wave may be produced. With all the flaps open, a stable standing wave is produced.

Figure 15:
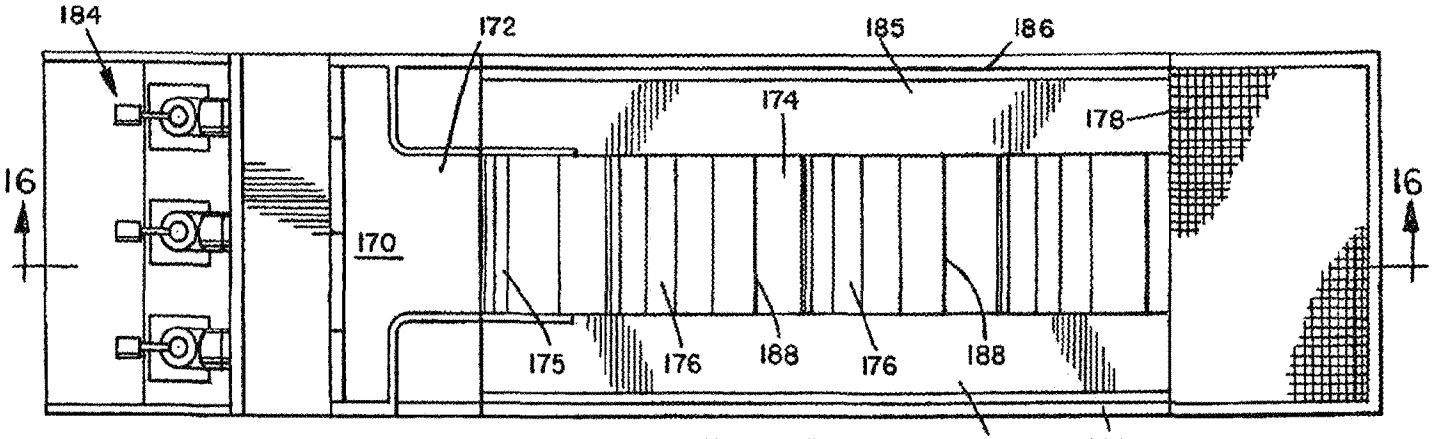
FIG. 15 is a top plan view of a wave forming apparatus according to another embodiment.
Figure 16:
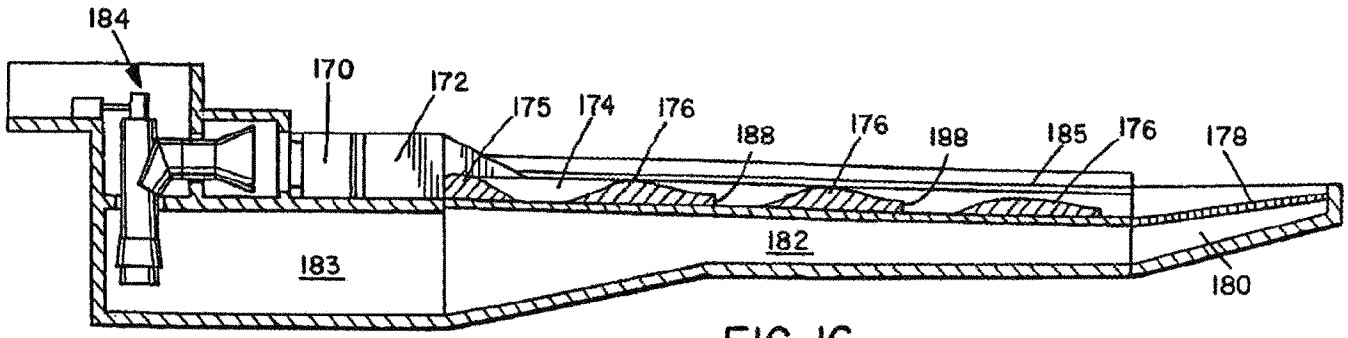
FIG. 16 is a sectional view on lines 16-16 of FIG. 15, illustrating the water re-circulation path.

FIGS. 15 and 16 illustrate a wave forming apparatus similar to that of FIGS. 1, 2 and 5, but showing a possible water re-circulation system for circulating water back to a reservoir at the inlet end of the apparatus. In this embodiment, a raised reservoir 170 at one end of the apparatus supplies water via an elongated inlet 172 to a wave forming channel 174 in which a weir 175 and a series of spaced bed forms 176 are provided. At the end of channel 174, water falls through grating 178 into a chamber 180, and is then re-circulated through a passageway 182 beneath channel 174 back to a chamber 183 beneath the reservoir, where it is re-circulated via pumping system 184.

Other water re-circulation systems may be used, such as passageways around the sides of channel 174, or the outlet end of the wave forming apparatus may be connected to other water rides, and water may then be re-circulated from those rides back to reservoir 170. As in the first embodiment, shallow side portions 185 extend from each side of channel 174 to the outer sides 186 of the apparatus, and this may be inclined slightly upwardly, as in FIG. 5, or may be flat or inclined slightly downwardly. The bed forms 176 of FIG. 16 are solid shaped members similar to those of FIG. 4, without any secondary flow passageways but with an abrupt vertical cut off 188 at the trailing end. However, bed forms 176 may be replaced with any of the other alternative bed forms illustrated in FIGS. 1 to 14. The sides of channel 174 are straight, rather than flaring outwardly as in FIG. 1. However, they may alternatively taper outwardly or inwardly from the leading end to the trailing end of the channel.

In this apparatus, as in the previous embodiments, standing waves are formed downstream of each waveform 176 at the next structure, i.e. the upstream face of the next successive waveform, or, in the case of the last waveform, at the upwardly inclined grating 178. The formation of a standing wave over grating 178 has some advantages. For example, after exiting the wave, the rider can easily stand up in the shallow water over the grafting in order to exit the ride. In another alternative embodiment, a wave forming apparatus may comprise a channel as in the previous embodiments with a series of alternating waveforms and gratings, with each wave being formed over a grating. This separates the riders more effectively. Each successive waveform and grating may be stepped down from the preceding pair, to ensure adequate water flow through the channel.

In each of the above embodiments, water flows over and through a weir at the inlet end of the channel. However, flow may alternatively be provided through side channels extending along opposite sides of the weir, under the control of flap valves.

The wave forming apparatus in each of the above embodiments may create more readily controlled standing waves. A combination of features produces beneficial wave conditions, with some or all of these features being used dependent on the desired form of the standing wave, and what degree of adjustability in the wave formation is required. One key feature is a sequence of two or more shaped bed forms, such that waves tend to be formed at a leading face of the successive bed forms. However, this alone is not sufficient to form a stable standing wave. Another feature which may help to form a standing wave is the provision of secondary flow beneath each bed form, with a vent for flow into or out of the secondary passageway immediately upstream of the desired wave forming location, prior to the leading face of the next bed form. This is believed to provide flow out of or into the space beneath the wave at the wave forming location, enhancing the stability of the wave.

The opposite end of the secondary passageway is provided in most cases at or adjacent the peak or highest point of the bed form, and may comprise a vent across most of the width of the bed form, or two elongated side vents on opposite sides of the bed form centered at the peak. A further feature which produces improved standing waves is the provision of a sharp, vertical cut off at the trailing end of the bed form, so that a trailing end is spaced above the floor of the channel. This alone, without a secondary passage, results in some standing wave formation. However, standing waves are enhanced by providing both a secondary passageway and a sharp cut off, as in some of the embodiments illustrated above. The secondary passageway also provides a convenient means for adjusting the standing wave, by means of height adjusters to vary the height of the trailing end of the waveform, valves to vary the secondary flow, and the like, as illustrated in some of the above embodiments. Adjustment of the size of the trailing end vent across the width of the bed form may be used to create a breaking, curling, or pitching wave. A surge of secondary flow can be created by hinging the bed form so as to first cut off the secondary flow, and then lifting the trailing end of the bed form. By providing a flexible trailing end portion for the bed form, which can lift and lower freely based on flow conditions, an oscillating wave form can be produced.

The bed form shape in each of the above embodiments comprises a concave leading face, a curved peak, and a concave trailing face. This tends to produce a wave at the leading face of the next bed form. In some of the above embodiments, the trailing face continues down to blend smoothly with the floor of the channel. However, wave forming is enhanced by providing a re-curve adjacent the trailing end of the bed form, to produce a substantially horizontal tail portion before an abrupt vertical drop off at a predetermined tail elevation factor, or TEF, as illustrated in FIGS. 2 to 4, 7, 8, 11, 12, and 16. This produces standing waves without the secondary passageway for adding or removing water beneath the formed wave.

The flume cross-sectional profile in each of the above embodiments comprises a deeper central channel containing the weir and bed forms for producing waves, and shallower side portions extending outwardly from opposite sides of the channel. This channels the water over the bed forms and prevents too much water from escaping around the bed forms, while allowing the sides of the top portion of each standing wave to vent sideways. This helps to prevent the wave from decaying and enhances stability. The shallow side portions may be tapered slightly upwardly so as to return water back to the center of the channel, although they may alternatively be horizontal or tapered downwardly.

Figure 28:
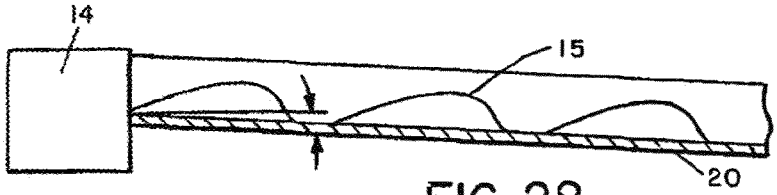
FIG. 28 is a sectional view illustrating a modified wave forming apparatus with a downwardly inclined bed.

In the previous embodiments, the flume or channel is shown as having a substantially flat or even floor 20. However, it may be beneficial in some cases, particularly in channels with a plurality of bed forms for forming multiple standing waves, for the floor 20 to have a slight incline downwards from the channel or flume entrance to the end of the flume, as illustrated in FIG. 28. This inclination may be in the range of 0 to 4 degrees. Rather than a constant inclination along the length of the flume, it may have a shallower portion extending from the entrance and a steeper portion at the lower end, or it may be curved to provide a change in depth along the flume.

Figure 18:
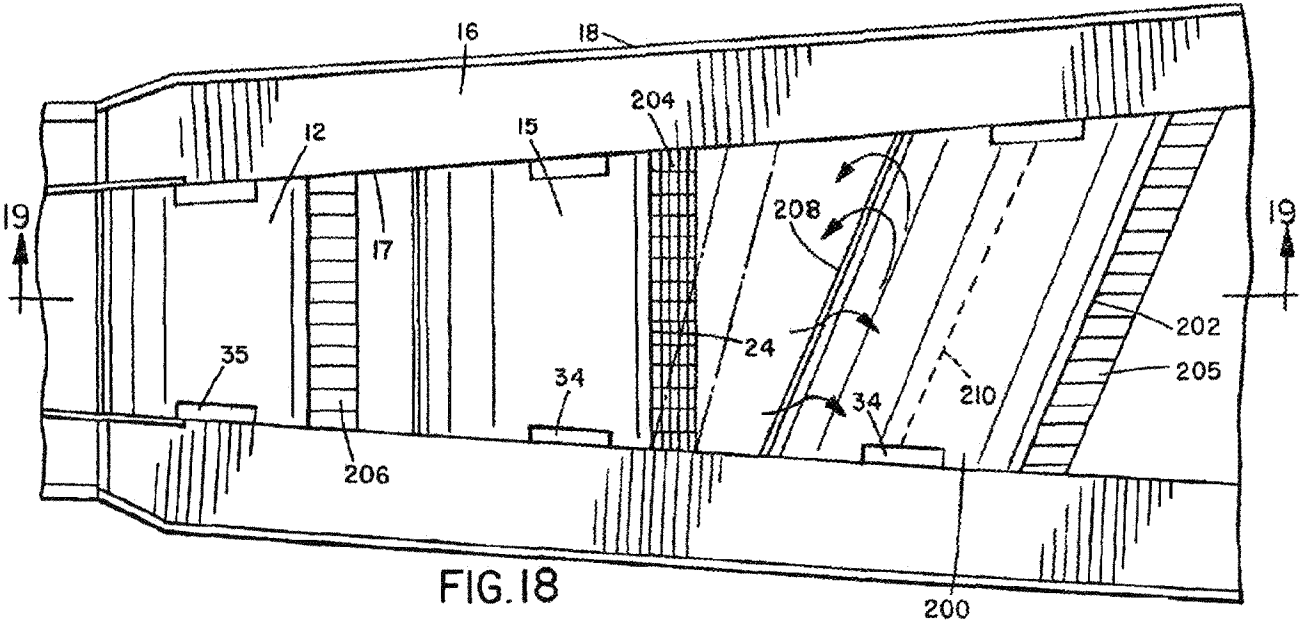
FIG. 18 is a top plan view of a wave forming apparatus according to another embodiment, for forming a standing, curling wave.
Figure 19:
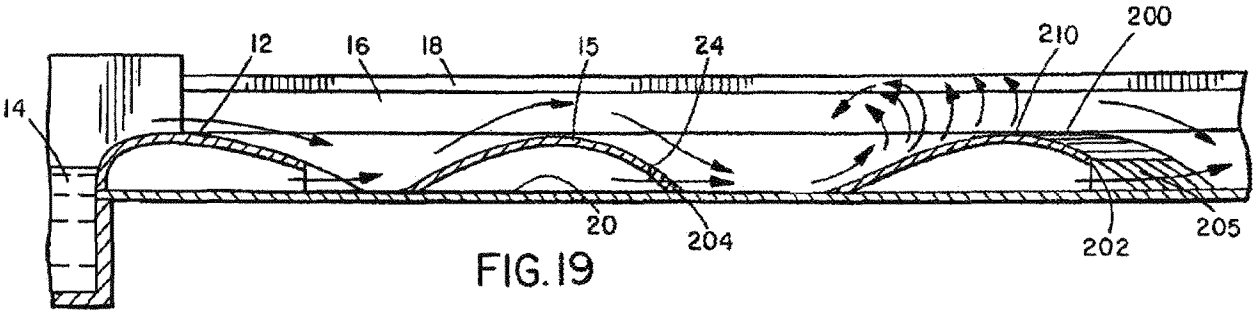
FIG. 19 is a cross-sectional view on the line 19-19 of FIG. 18.

FIGS. 18 and 19 illustrate a wave forming apparatus according to another embodiment. This apparatus is similar to the embodiment of FIGS. 1 and 2, and like reference numerals have been used for like parts, as appropriate. However, instead of a series of bed forms which are each perpendicular to the water flow direction, in this embodiment the last bed form 200 in the channel or flume 10 is oriented at an oblique angle to the water flow. Also, the floor 20 may have a slight declination of the order of 1 to 4 degrees, as in FIG. 28.

As in the previous embodiments, channel 10 has a weir 12 at its inlet end connected to a supply of water in a reservoir 14. A first bed form 15 is positioned downstream of weir 12 in order to create a stable, standing wave. Oblique bed form 200 is positioned downstream of bed form 15. In alternative arrangements, a greater number of bed forms 15 may be provided prior to oblique bed form 200. The channel 10 is of tapering, gradually increasing width along its length, and may be provided with a water re-circulation system at its end as in FIGS. 15 and 16, or may intersect with another channel in other arrangements. Sloping side walls or entry/exit portions 16 extend from the opposite, vertical sides 17 of the wave forming channel or flume 10 to the outer sides 18 of the apparatus.

The weir and bed form 15, as well as the oblique bed form 200, are each of hollow shell construction, although they may be of any of the alternative constructions illustrated in the preceding embodiments. The bed forms 15 and 200 each incline upwardly to a peak, and then incline downwardly to a trailing end 24, 202 which is raised above the floor 20 of the channel. An inclined grating 204, 205 extends from the trailing end of each bed form down to the floor 20. Grating 206 is also provided over the open, trailing end of the weir 12. The bed forms 15 and 200 each have a pair of elongate side vents 34 along opposite sides of the bed form and extending across the peak of the bed form. Similarly, the weir 12 has a pair of elongate side vents 35. The raised trailing end of each bed form and the vents 34 together form a secondary flow passageway for water through the bed form, as described in connection with the previous embodiments.

The oblique bed form 200 in the illustrated embodiment has an oblique or non-perpendicular leading edge 208 and a peak or ridge line 210 which is at the same oblique angle as the leading edge 208. The trailing edge 202 is shown at the same oblique angle as the leading edge and peak, although it may be at a different angle or even perpendicular to the flow. It is the angle of the leading edge and peak which are critical in creating a standing, curling wave or tube, and the orientation of the trailing edge is dependent on what waveforms, if any, are to be provided downstream of the oblique bed form. It may also be advantageous to rake the trailing edge 24 of the bed form 15 immediately upstream of the oblique bed form 200 to provide the ideal hydraulic conditions for standing wave formation, for example as illustrated in dotted outline in FIG. 18. The angle of the leading edge 208 for creating a curling wave is in the range of 15 to 30 degrees from perpendicular to the flow direction, i.e. 105 to 120 degrees to the flow direction. In the exemplary embodiment, as noted above, the peak or ridge line 210 is at the same angle as leading edge 208, but could vary from this angle in order to create different wave effects.

In this embodiment, the first bed form 15 creates a standing wave with a stable wake as described above, while the oblique bed form creates a standing curling wave. The raked leading edge and slant of the bed form 200 gives water a sideways velocity component which induces the more downstream side to break continuously while the more upstream side remains an unbroken standing wave. Thus, the curling wave is created near the downstream end of the bed form and extends across the bed form, as indicated in FIGS. 17 and 18. The water depth across the wave varies from channel flow depth just prior to the wave to depths almost as high as the wave itself when measured under the peak. The standing tube or curling wave is induced to pitch out continuously by the bottom form of the bed and the ventilated shear wake created by the wave forming structure.

All the motion controls applied to the normal standing wave forming apparatus of the previous embodiments may be applied to the oblique bed form for forming the curling standing wave. Thus, the tail elevation, peak height, flow rate, channel depth, and other parameters may be varied in order to vary the wave.

Figure 20:
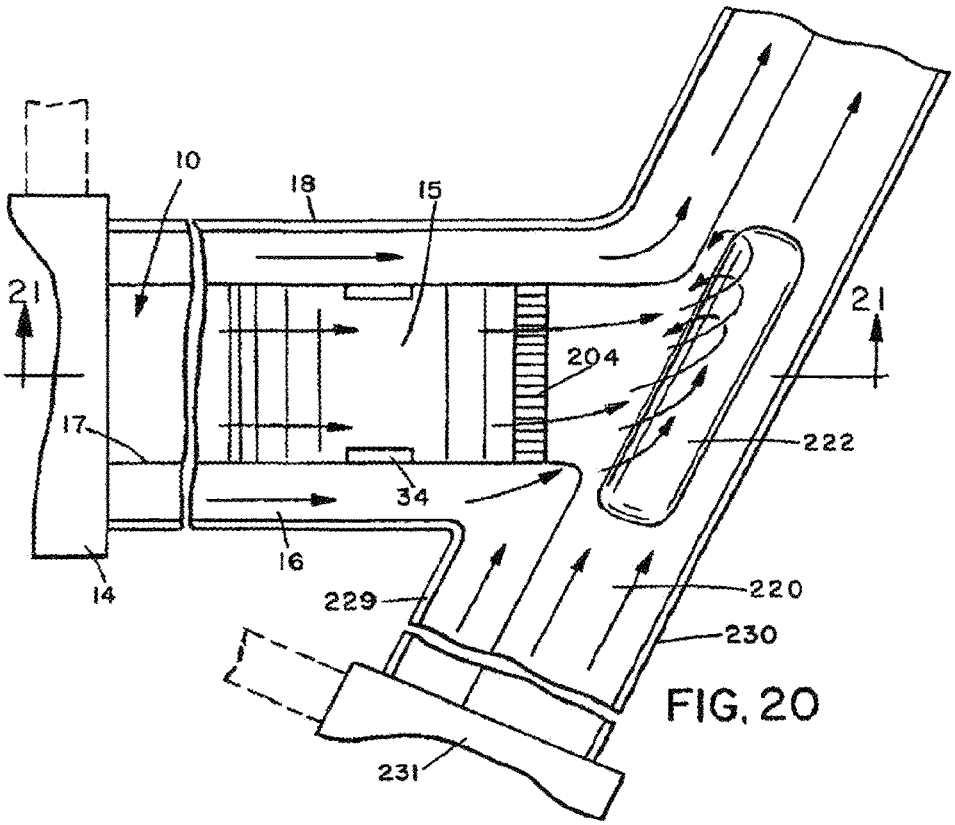
FIG. 20 is a top plan view of an alternative wave forming apparatus for forming a standing, curling wave.
Figure 21:
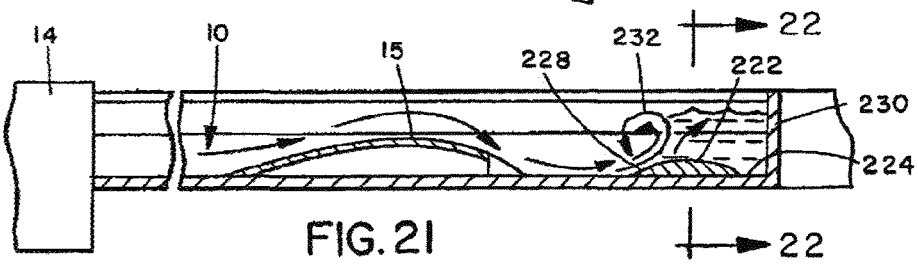
FIG. 21 is a sectional view on the line 21-21 of FIG. 20.
Figure 22:
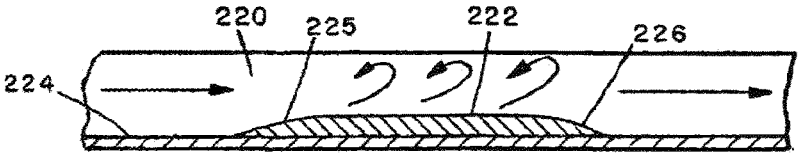
FIG. 22 is a sectional view on the line 22-22 of FIG. 21.

FIGS. 20 to 22 illustrate another embodiment of a wave forming apparatus for creating a standing, curling wave. In this embodiment, instead of providing an oblique bed form in the primary channel 10, another channel 220 is oriented to intersect the end of the primary channel 10 at an oblique angle. The water flowing in the secondary channel 220 is deeper than the water flowing along primary channel 10, as indicated in FIG. 21. The primary channel 10 has a weir and a series of bed forms 15 for creating stable standing waves, as in the first embodiment, with only the last bed form 15 being illustrated in FIGS. 20 and 21. The apparatus would also work with only one bed form 15 in the primary channel or flume 10, if no additional standing waves are desired.

A river bed form 222 is provided in the bed 224 of secondary channel 220. Secondary channel 220 has an inner side wall 229 and an outer wall 230. The river is fed from a suitable water supply such as a reservoir 231. The bed form 222 in secondary channel 220 may be a solid or hollow bed form, and does not require any secondary flow channels. The bed form 222 is of generally rounded shape and is elongated in the river flow direction, as indicated in FIG. 22, with gradually tapering or smoothly contoured ends 225, 226 merging smoothly with the river bed 224. The leading surface 228 of the bed form 222 facing the primary channel 10 is of convex, rounded shape, as best illustrated in FIG. 21. The leading surface 228 is similar in shape to the flume bed forms 15, and the height of the bed form 222 is less than that of the flume bed forms. The trailing surface shape is not critical and no tail elevation is required, because no downstream wave is created after the curling wave. The bed form shape and length in the river flow direction are not critical. Overall height, position, and leading surface shape are the most critical factors. The ideal position for bed form 222 is at the confluence of the two water flows, but it may be adjusted upstream or downstream slightly for different effects. As noted above, the leading surface shape is approximately the same as the leading surface shape of flume bed forms 15, but the peak is of lower height.

In this embodiment, a curling wave 232 is created at the confluence of the faster flume flow exiting channel 10 with the deeper and slower river flow along channel 222. A stable wake is induced between bed form 15 and bed form 222. The combination of the stable wake and confluence of the two water flows creates a hollow curling wave suitable for riding in the tube of the wave. This wave can be controlled to advance or recede using the motion controls of the bed form apparatus, as described in detail in the previous embodiments, as well as by changing the flow rates and depths of the primary flume and/or river flow. The two reservoir sources 14 and 231 provide a suitable flow rate and velocity to be selected for each flow in order to create the standing, curling wave, and may be adjusted as needed. The curling wave can also be induced to break, advance, and recede by introducing traveling waves into the primary channel or the river flows.

The curling wave 232 is created in part by the depth of the water in the river behind the curling wave, or pooled water level, and partly by the oblique angle of the intersecting flow. Typical hydraulic jumps can be created by introducing faster moving water into slower moving water. The ideal level for the pooled water or intersecting river behind the curling wave 232 is a factor of 1.5 greater than the overall elevation drop from the channel floor 20 at the entrance to channel 10 down to the flume bottom at the wave location. Adjusting the pooled water level behind curling wave 232 changes the size and characteristics of the curling wave. If the pooled water level is too high, say a factor of 2 greater than the flume elevation drop, the pooled water may cause the wave to decay. If the pooled water level falls to a factor of 0.7 or less of the flume elevation drop, the wave is eliminated.

In one embodiment, the angle of intersection between the water flows in the primary flume or channel 10 and the secondary channel 220 was approximately 75 degrees (i.e. the angle between channel 10 and secondary channel 220, but it may be in the range from 30 degrees to 90 degrees. The range of suitable angles depends in part on the velocities of the two flows. For example, two sheet flows (flows with Froude numbers substantially in excess of 5, and approximately 35 and higher in current sheet flow technology practice) can be directed at each other to produce a water effect with the appearance of a curling wave. Any practical angles other than parallel can produce the effect. For standing wave formation, the river flow is typically slower, at subcritical (Froude number less than 1) or faster speeds, producing a hydraulic resistance to the faster flume flow. This, together with the oblique angle of intersection, tends to produce the standing curling wave, with the wave breaking continuously at the downstream end of the intersecting flows and the more upstream end forming an unbroken standing wave. Bed form 222 enhances the standing, curling wave formation. Flume water Froude numbers in the trough just ahead of the standing wave have Froude values in the 1 to 5 range. With standing waves, Froude numbers vary at every location in the flow and are subcritical (less than 1) at the standing wave peak. The river bed form 222 helps to control the position and formation of the standing curling wave.

Figure 23:
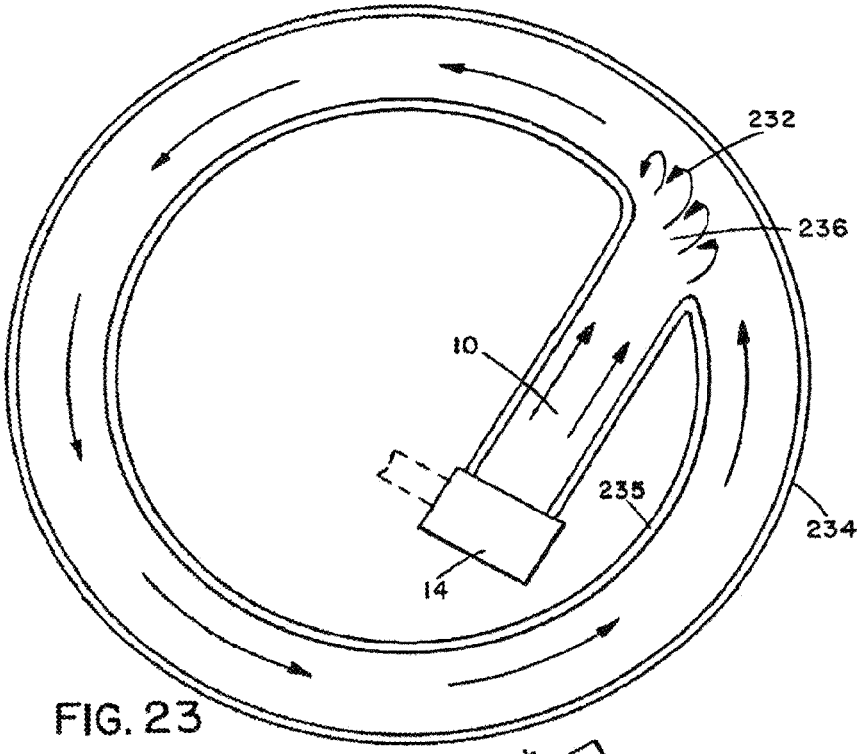
FIG. 23 is a top plan view of a modified wave forming apparatus which is self-circulating.

FIG. 23 illustrates a modification in which, rather than having an independently fed intersecting river flow, as in FIGS. 20 to 22, a continuous loop 234 is provided, with the primary channel 10 intersection the inner wall 235 of the loop at the desired oblique angle. This is a more efficient layout where the river flow is created by the inertia of the flume flow driving the combined flows in a continuous loop. For simplicity, the bed forms in primary channel 10 and in the loop at the intersection 236 between the primary channel and river flow are not shown, but may be identical to those illustrated in FIGS. 20 to 22 in order to create the standing curling wave 232, as well as one or more standing waves in the primary channel 10.

Figure 24:
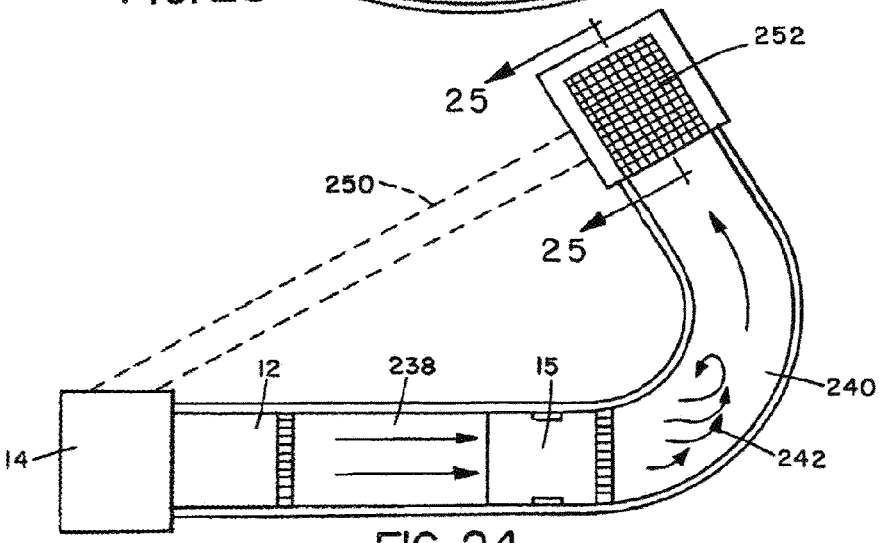
FIG. 24 is a top plan view of a wave forming apparatus according to another embodiment, in which the primary flume is curved to create a standing, curling wave.
Figure 25:
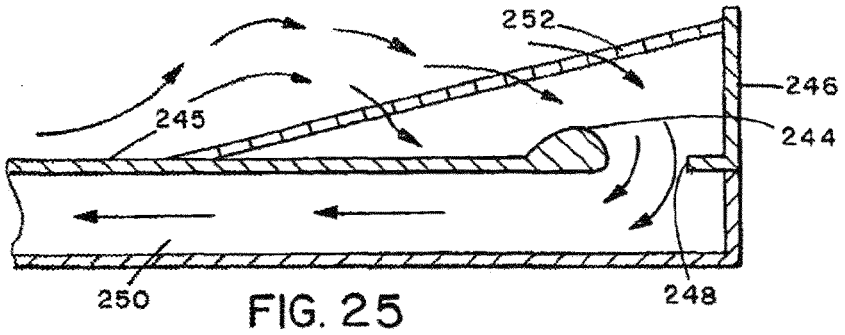
FIG. 25 is a sectional view on the line 25-25 of FIG. 24, illustrating the exit area of the apparatus of FIG. 24.

FIGS. 24 and 25 illustrate another alternative arrangement for creating a standing, curling wave. Instead of a secondary channel or river loop intersecting the primary channel 10, in this embodiment a primary channel 238 has a curve 240 immediately after a standing wave producing bed form 15, inducing a sideways flow component which creates a standing tubing wave 242. The water depth is changed at the curve 240 by providing a weir 244 at the outlet end of the channel which tends to back up water ahead of the tubing wave 242, as indicated in FIG. 25. The weir 244 is provided in the bottom or bed 245 of the channel 238 adjacent the end wall 246, and an outlet opening 248 allows water exiting the channel to flow back along water return passage 250. An inclined safety grille 252 covers the weir 244 and exit opening 248. The weir 244 causes the water to back up, increasing the water depth and slowing the flow rate, which enhances the tubing wave formation.

Figure 26:
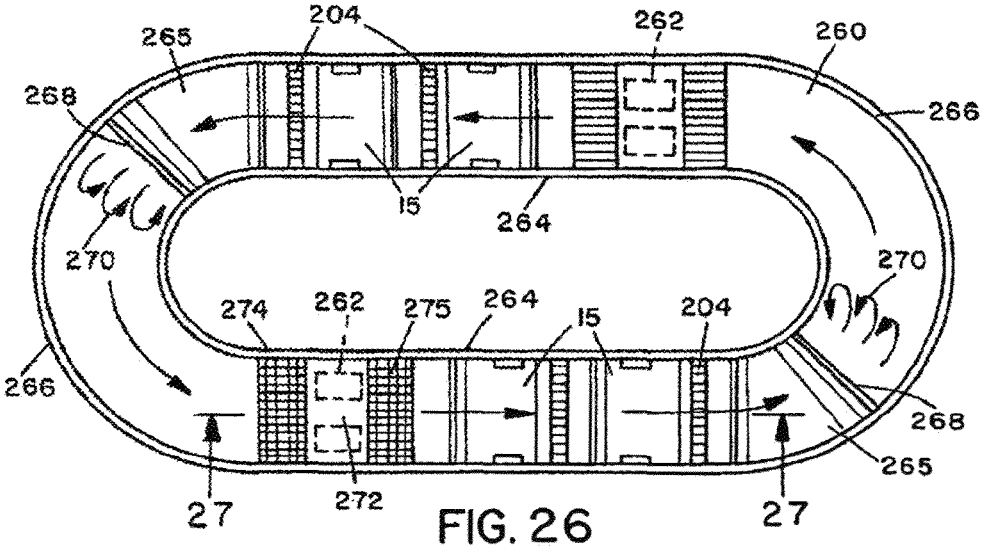
FIG. 26 is a top plan view of a river type wave forming apparatus according to another embodiment.
Figure 27:
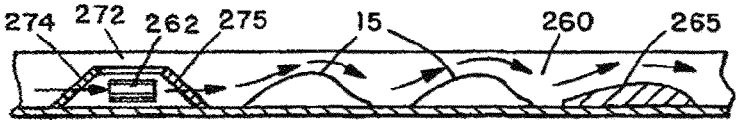
FIG. 27 is a sectional view on the line 27-27 of FIG. 26.

FIGS. 26 and 27 illustrate another alternative wave forming apparatus in which jet pumps replace the reservoir in creating the primary flume flow ahead of the bed forms. In this embodiment, the flume or channel 260 is in the form of an elongated river loop, with jet pumps 262 provided at the start of each straight side portion 264 of the loop in the flow direction. One or more standing wave forming bed forms 15 are provided in each straight side portion 264, and these have venting as in the previous embodiments for creating standing waves. A second type of bed form 265 is provided at the start of each curled end 266 of the loop. This has no venting and is shaped at its trailing end 268 to conform with the bend in the channel, as indicated in FIG. 26. The bed forms 265 are lower in height than the bed forms 15. With this arrangement, one or more standing waves are produced at bed forms 15, while a curling standing wave 270 is produced at each curve or bend in the river loop.

The jet pump arrangement is illustrated in more detail in FIG. 27. As illustrated, jet pumps 262 are arranged in pairs inside a housing having a flat upper wall 272, an inclined inlet grille 274, and an inclined outlet grille 275. Water is drawn through the inlet grille and out through the exit grille, as indicated, in order to circulate water at the desired flow rate. The river loop 260 may be elongated if a greater number of standing wave bed forms 15 is desired.

Figure 29:
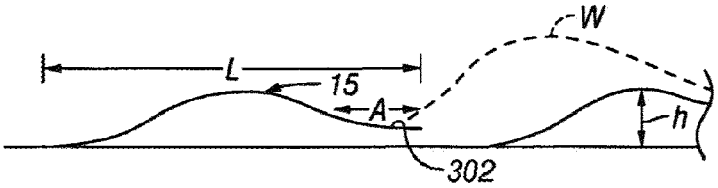
FIG. 29 is a schematic side elevational view of a bed form with a first tail length, as well as the standing wave formed after the bed form.
Figure 30:
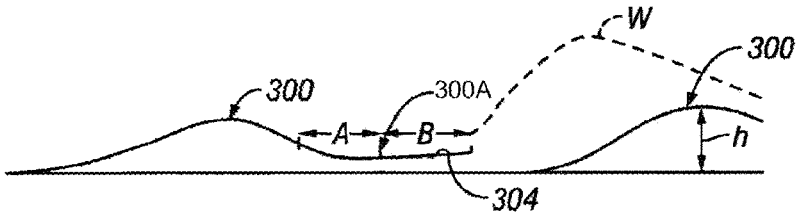
FIG. 30 is a side elevational view similar to FIG. 29, illustrating an extended tail to provide more room for surfboards to maneuver in front of the face of the wave.

FIG. 30 illustrates a bed form 300 with a modified, extended tail 301 which may be provided on the weir and additional bed forms of any of the preceding embodiments, while FIG. 29 illustrates a tail 302 of the same general extent as in FIG. 3, 4, or 8, for example. The tail 302 has a length A, while the tail 300A has an extended, flat or generally horizontal end portion 304 of length B. If the overall length of the bed form from the leading end to the end of the tail in FIG. 29 is L, and the length of the extended portion 304 in FIG. 30 is B, then the length B in an exemplary embodiment is of the order of 25% to 50% of length L, and the overall bed form length L' is L+B, in other words 25% to 50% longer than in FIG. 29. The extended tail portion is at least three feet in length and may be up to ten feet in length in an exemplary embodiment. In the exemplary embodiment, the length is arranged to be at least equal to the approximate length of a surfboard to allow room for maneuvering.

The advantage of having an extended, generally flat tail portion is that it provides more room for maneuvering a surfboard in front of the face of the wave W formed downstream of the bed form, as indicated in FIG. 30. This is particularly useful for riders with longer surfboards.

Figure 31:
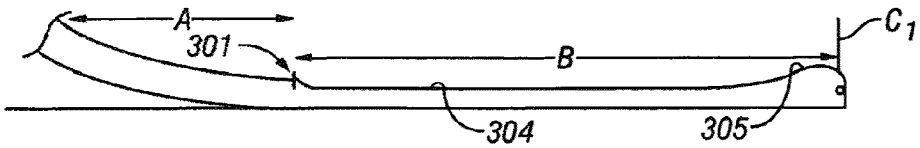
FIG. 31 is an expanded partial side elevational view illustrating a spoiler formed near the end of the tail of FIG. 30.

A raised bump or spoiler 305 may be formed at the end of the extended tail portion 304 of FIG. 30, as indicated in the enlarged view of FIG. 31. A spoiler is an abrupt rise near the end of a bed form tail. The spoiler has a smooth, upwardly inclined leading face with a rounded top for safety. The height of the spoiler may be in the range from about 5% to about 30% of the height h of the bed form peak.

Figure 32A:
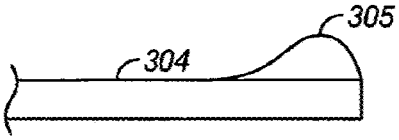
FIGS. 32A to 32D are partial side elevational views similar to FIG. 31 illustrating alternative spoiler shapes.
Figure 32B:
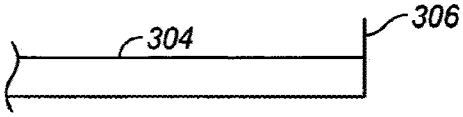
Figure 32C:
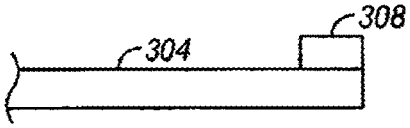
Figure 32D:
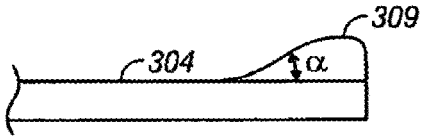

FIGS. 32A to 32D illustrate some alternative spoiler shapes. FIG. 32A illustrates a spoiler 305 of similar shape to FIG. 31. FIG. 32B illustrates a straight vertical spoiler 306 at the end of the tail portion 304. FIG. 32C illustrates an alternative square or rectangular spoiler 308. FIG. 32D illustrates a spoiler 309 having an extended peak and a leading end ramp at an angle which may be between 30 and 60 degrees.

The advantage of a spoiler at the end of the tail is that it allows the wave to form over a wider range of flow rates, which improves efficiency and allows for a wider range of wave heights in a given arrangement of bed forms. Without such a spoiler, an equivalent bed form creates a wave which is not as high, or more water can be supplied into the channel to make the wave as high. The bump or spoiler creates turbulence which helps to support the standing wave, and also forms a higher wave for a given flow rate. Although the spoiler is shown at the end of extended tail section 304 in the illustrated embodiment, it may also be provided on the end of a shorter tail as in the previous embodiments, or at the trailing end of a bed form with no tail.

Figure 33:
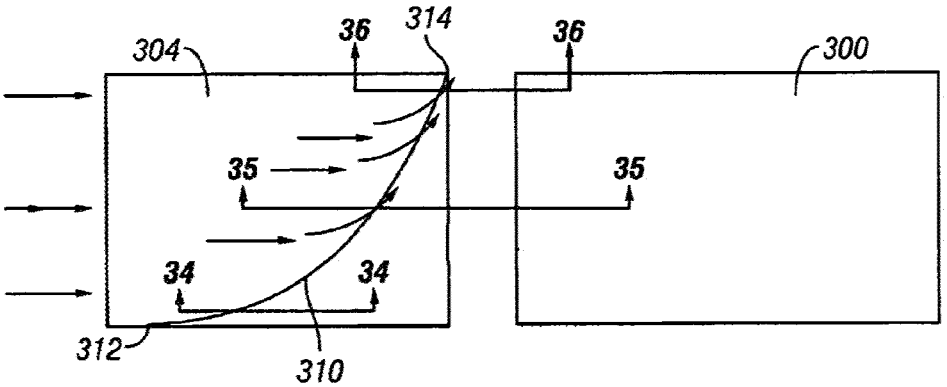
FIG. 33 is a schematic top plan view of the tail of FIG. 31, illustrating an optional curved spoiler.
Figure 34:
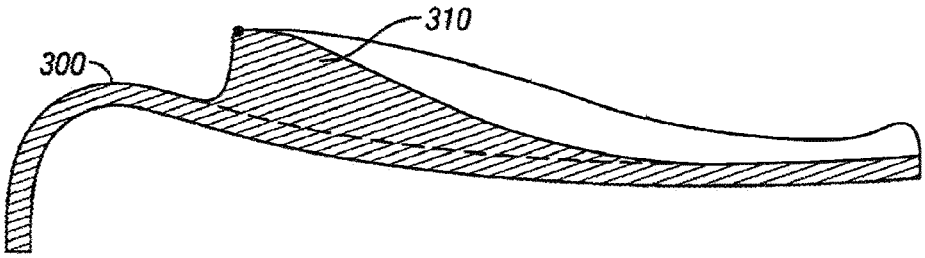
FIG. 34 is a cross-section on the lines 34-34 of FIG. 33.
Figure 35:
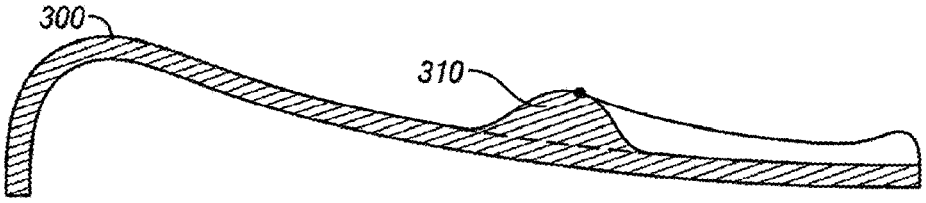
FIG. 35 is a cross-section on the lines 35-35 of FIG. 33.
Figure 36:
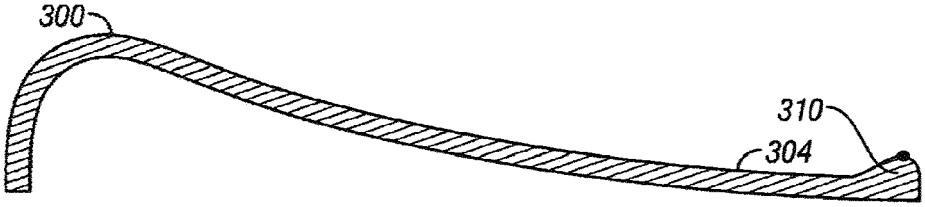
FIG. 36 is a cross-section on the lines 36-36 of FIG. 33.

The spoiler may extend straight across the end of the tail in a direction transverse to the flow direction. FIG. 33 illustrates an alternative spoiler 310 which has a ridge line which is curved across the width of the spoiler from one side of the tail to the other. This is a current deflecting or flow redirecting spoiler, and begins at a point 312 which is upstream of the tail on one side of the wave form and blends into the standard spoiler shape at the end of the tail on the other side 314 of the wave form. The spoiler 310 is tallest at its leading edge and is reduced in height as it curves around and blends into the end of the tail, as illustrated in FIGS. 34 to 36. FIG. 34 illustrates the cross-sectional shape of the spoiler 310 at a location close to the point 312, where it is at its tallest elevation. As illustrated in FIG. 35, the spoiler is reduced in height as it extends across the width of the bed form, and is at its lowest elevation when it blends into the tail, as illustrated in FIG. 36.

The curved or flow shearing spoiler 310 of FIGS. 33 to 36 creates a current of water running from the upstream end of the spoiler towards the downstream end 314 of the spoiler. This oblique or crosswise flow component, combined with the direct downstream flow, creates a peak wave offset from the centerline of the bed form. This standing wave has a component of flow moving laterally towards the peak which creates a unique wave riding experience of predominantly angled riding. This may also help to create a curling or tubing standing wave.

Figure 37:
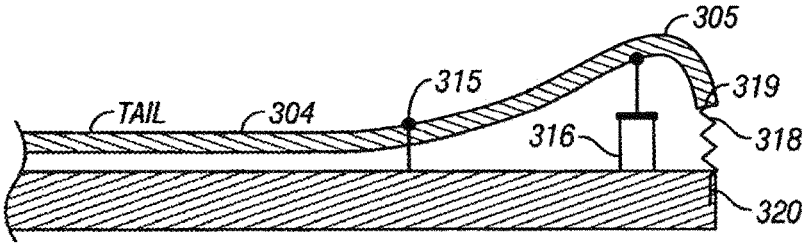
FIG. 37 is a side view of an adjustable spoiler.

The spoiler may be adjustable in height so that it can be optimized for a particular flow rate, as illustrated schematically in FIG. 37. The spoiler 305 is hinged to the end of the tail portion 304 via hinge 315 or may alternatively be made of flexible material. A suitable actuator 316 such as a pneumatic or hydraulic ram or the like is mounted beneath the spoiler to act between the floor and the spoiler, so that extension of the actuator increases the height of the spoiler. An expandable safety cover or enclosure 318 is positioned between the end 319 of the spoiler and the floor 320 of the channel.

The spoiler 305 may be segmented across the width of the tail portion 304, with each segment being independently adjustable in height. Alternatively, a single piece spoiler may have different portions at varying elevations across the width of the tail.

Figure 38:
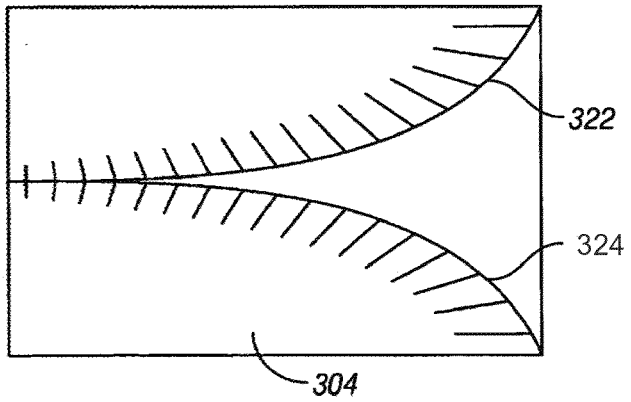
FIG. 38 is a top plan view of the tail of a bed form illustrating a modified, segmented spoiler.

More than one spoiler may be used to create multiple wave peaks in a given width of flow. FIG. 38 illustrates one example of a spoiler which splits into two spoiler sections 322, 324 which curve outwardly in opposite directions towards opposite sides of the tail portion 304. This creates two standing wave peaks.

Figure 41:
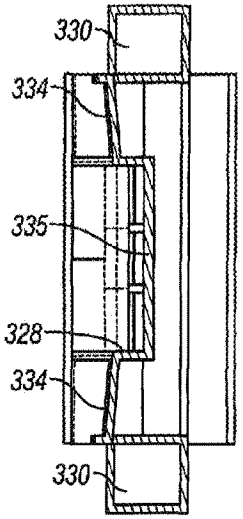
FIG. 41 is a sectional view taken along lines 41-41 of FIG. 40.
Figure 39:
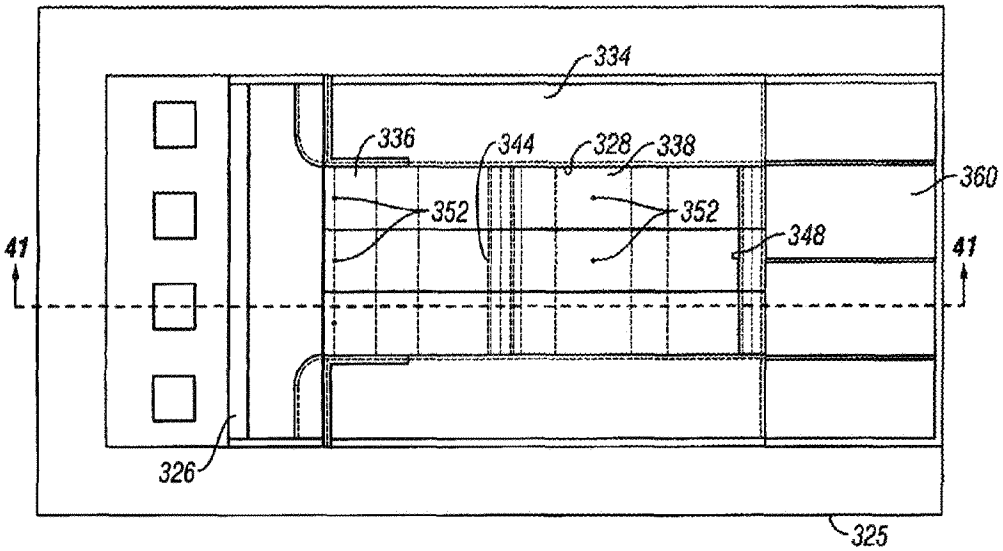
FIG. 39 is a top plan view illustrating a modified spoiler arrangement with two curved segments for splitting the flow.
Figure 40:
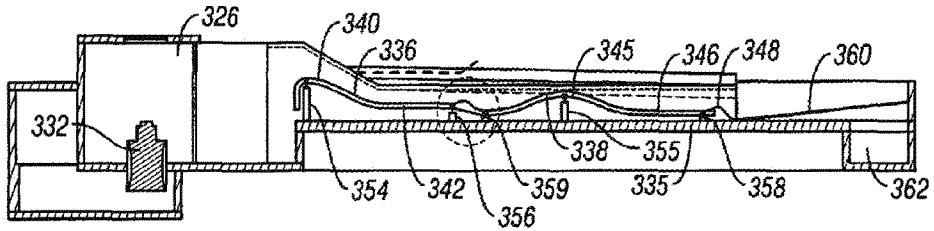
FIG. 40 is a top plan view of a modified wave forming apparatus incorporating the extended tail and spoiler arrangement of FIGS. 30 and 31 at the end of each bed form.

FIGS. 39 to 43 illustrate a wave forming apparatus according to another embodiment which incorporates the extended tail of FIG. 30 as well as the spoiler of FIG. 31. The apparatus basically comprises an outer housing 325 having a water supply or reservoir 326 at one end and a channel 328 extending from the reservoir to the exit end of the ride for containing a flow of water. Water is re-circulated from the exit end of the ride along side channels 330 back to the reservoir, under the action of one or more pumps 332. As in previous embodiments, side river banks or beaches 334 extend outwardly from opposite sides of the channel to provide for ride entry and exit. These may be completely horizontal in the transverse direction, as illustrated in FIG. 17, or have a slight downward slope, rather than being inclined upwardly as illustrated in FIG. 41. Regardless of the transverse angle of the side beaches 334, each beach has a slight downward slope in the longitudinal direction from the inlet end or reservoir end to the exit end, as illustrated in FIG. 16 and FIG. 40. The slope is sufficient to allow water to drain, so that wave control is maintained. The slope of the side beaches 185 in FIG. 16 is around 2.5%, but a slope of 1% is sufficient in most cases.

As best illustrated in FIGS. 40 and 41, channel 328 has a floor 335. A weir bed form or first bed form 336 is formed at the exit from the reservoir 326, and at least one additional bed form 338 is spaced downstream from the weir bed form. Weir bed form 336 has a peak 340 at its leading end and then slopes downwardly to an extended, generally flat or horizontal tail 342, with a spoiler 344 formed at the trailing end of tail 342. The additional bed form 338 has an upwardly inclined upstream face, a peak or upper portion 345, and a downwardly inclined downstream face extending into an extended flat tail 346 with a spoiler or bump 348 at its trailing end. Spoilers 344 and 348 are substantially identical in shape and dimensions.

Figure 42:
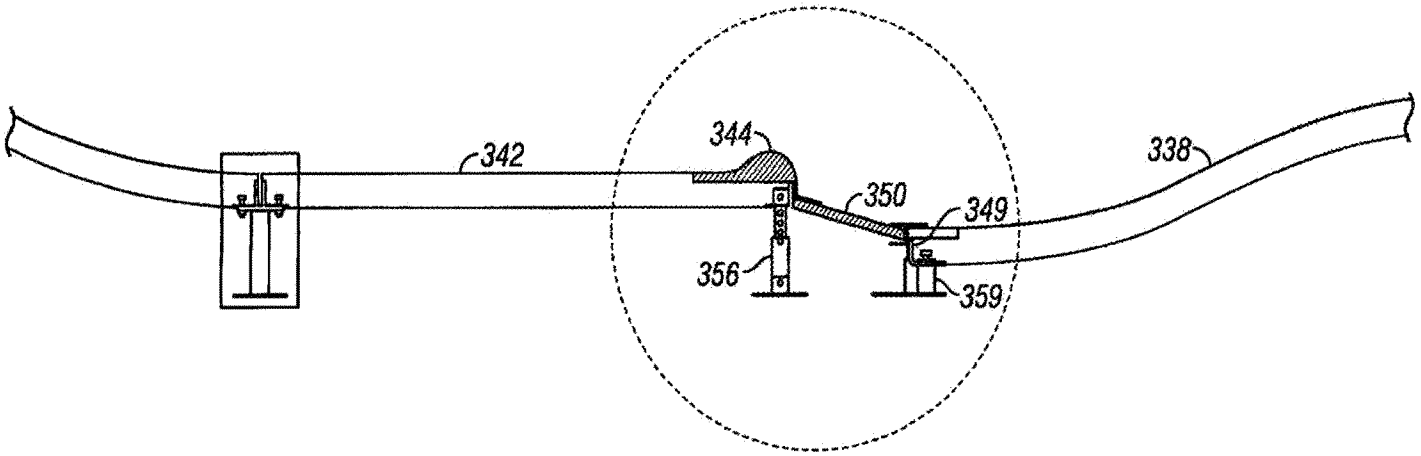
FIG. 42 is an enlargement of the circled region of FIG. 41, illustrating the transition or bridge between the spoiler and the leading edge of the next wave form.

The bed forms 336, 338 of this embodiment are of hollow construction, similar to the embodiments described above, and have vents for providing a secondary flow path. They may alternatively be of solid construction as in some of the other embodiments described above. As illustrated in FIG. 42, the end of the first spoiler 344 is connected to the leading end of the next bed form 338 via a bridge 350 which may be a grating or have vents forming one end of the secondary flow path. Spaced vents 352 across the peak form the other end of the secondary flow path. These smaller vents replace the side vents of the previous embodiment. A similar secondary flow passageway is associated with the additional bed form 338, which also has vents 352 across its peak, and also has a grating at its exit end.

A first peak adjuster 354 is located under the peak of the weir bed form 336 for adjusting the height of the peak. A similar peak adjuster 355 is provided under the peak of the additional bed form 338. Separator plate 349 (see FIG. 42) separates the flow under the weir bed form from the water flow under the additional bed form 338. A tail adjuster 356 for adjusting the height of spoiler 344 is provided under the end of the tail 342, adjacent the spoiler, while a second tail adjuster 358 is located adjacent spoiler 348. Adjusters 356 and 358 adjusts the height of the two spoilers. A leading edge adjuster 359 is located under the leading edge of the additional bed form 338, as best illustrated in FIG. 42. The adjusters allow flexibility in varying various parameters of the apparatus to adjust the wave conditions.

An upwardly inclined exit grating or beach 360 extends from the end of the channel to the end of the housing. Water draining through the grating 360 is returned to the side channels 330 via drain chamber 362 and flows back to the reservoir.

Figure 43:
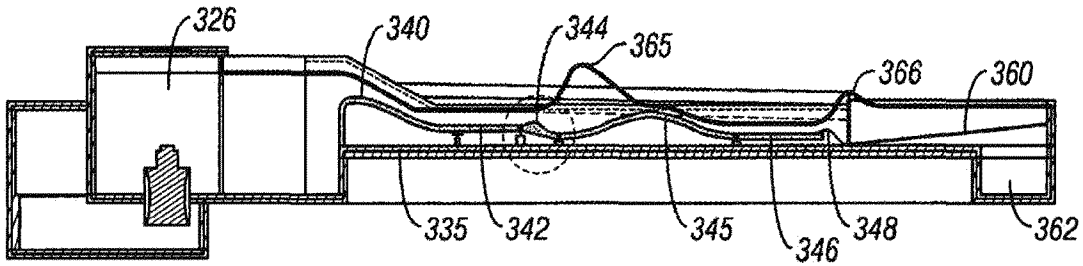
FIG. 43 is a sectional view similar to FIG. 41 illustrating the waves formed by the apparatus.

FIG. 43 illustrates an approximate operating water surface profile 364 in the apparatus of FIGS. 39 to 42 when the apparatus is operated in a critical flow or stream rate. As illustrated, a first standing wave 365 forms downstream of the first spoiler 344, and a second, smaller standing wave 366 forms downstream of the second spoiler 348. Adjustment of the flow rate varies the height of the waves, and waves form over a larger range of flow rates than in the previous embodiments, due to the addition of the spoilers.

Figure 44A:
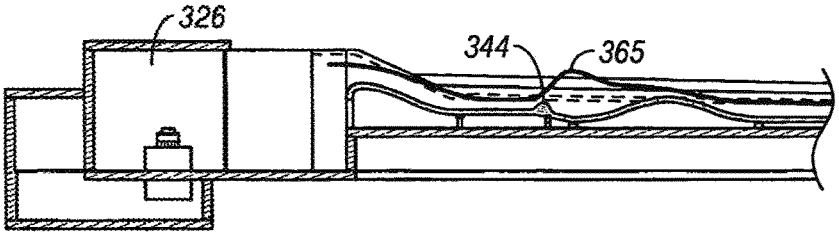
FIG. 44A is a sectional view similar to FIG. 43 illustrating one type of wave formed by the apparatus at a first flow rate.
Figure 44B:
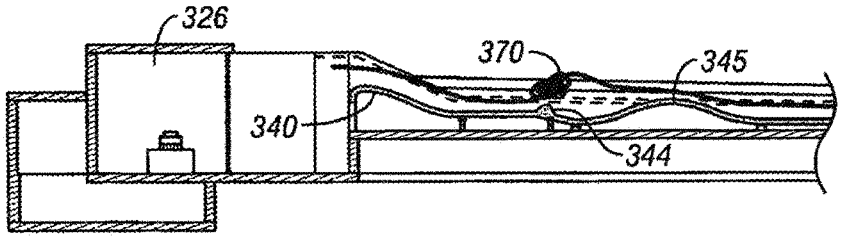
FIG. 44B is a sectional view similar to FIG. 44A illustrating another type of wave formed at a lower flow rate.

FIGS. 44A and 44B illustrate two different types of wave formed with the apparatus of FIGS. 39 to 43 at different flow rates. FIG. 44A illustrates a stable standing wave which is formed at the critical flow rate or stream rate. If the flow rate is decreased sufficiently, a breaking roller 370 is formed, as illustrated in FIG. 44B. This may be desirable for some riders. The Froude number at which a rideable standing wave is formed in the apparatus of FIGS. 39 to 43 is generally around 2.3 to 4.3, with the wave starting to break at the higher number. This range may be extended to 1 to 5 in some cases.

Figure 45A:
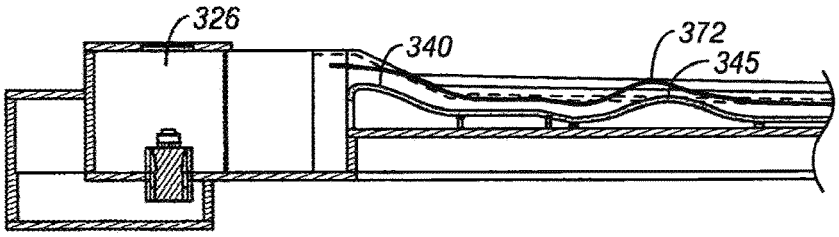
FIG. 45A is a sectional view of a wave forming apparatus similar to that of FIGS. 39 to 44 but with no spoiler, illustrating a first type of wave formed at a first flow rate.
Figure 45B:
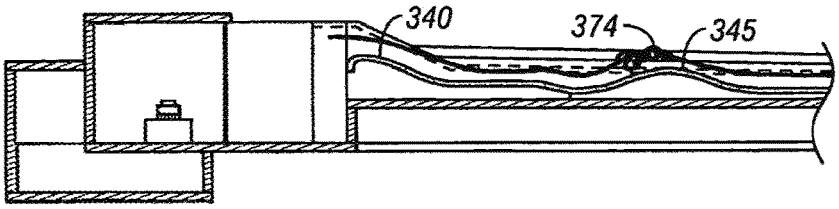
FIG. 45B is a sectional view of the apparatus of FIG. 45A illustrating a second type of wave formed at a second, lower flow rate.

FIGS. 45A and 45B illustrate different types of waves which can be formed with an apparatus similar to that of FIGS. 44A and 44B, having an extended tail on each wave form but without the spoiler 344. FIG. 2 illustrates a stable standing, deep water wave 56 which is similar to the standing wave formed in the apparatus of FIGS. 45A and 45B at the critical flow rate. If this flow rate is reduced, the wave is lowered, until a green face, tapered stream wave 372 is formed. This wave is more shallow than wave 56 and tends to follow the shape of bed form 345, but is deeper at its peak than the water depth at other locations in the channel. If the flow rate is reduced even further, a breaking roller tapered stream wave 374 is formed. Such waves may be desirable in some circumstances. The useful range of Froude number for the apparatus of FIGS. 45A and 45B to form a stable standing wave is lower than that for the apparatus of FIGS. 39 to 44, and is in the range of around 1 to 2.3.

The extended horizontal tail portions of the bed forms in FIGS. 39 to 45 provide an increased distance between wave peaks and also allow more room for surfboards to maneuver in front of the face of a wave. The spoiler or raised formation at or close to the end of the tail allows waves to form over a wider range of flow rates and thus provides a wider operating range for the apparatus. The spoiler creates turbulence which tends to support the wave over a wider range of conditions. As noted above, such a spoiler improves operating efficiency whether used in conjunction with an extended tail, as in FIGS. 39 to 42, or at the end of a wave form with a shorter tail, as in the embodiments of FIGS. 1 to 28.

The enhanced, stable, stationary wave formation, as well as the standing curling wave formation of FIGS. 18 to 27, may have applications outside the field of water amusement parks. For example, suitably shaped bed forms may be provided at the spillway of a dam. This would allow for standing wave creation which would spread energy more quietly and reduce the mist that is produced in standard dam spillways. In turn, this would reduce erosion. In another related application, this bed form and flume technology can be provided in aqueducts and sumps to remove sediment and prevent sediment accumulation. Another possible application would be as a water-based arcade attraction of the type using radio controlled boats or surfers. In this case, the apparatus would be made at around one quarter of the normal water ride scale. It may also be used in a stand-alone water toy. The apparatus may also be used for a purely ornamental water attraction in parks and the like.

Figure 46:
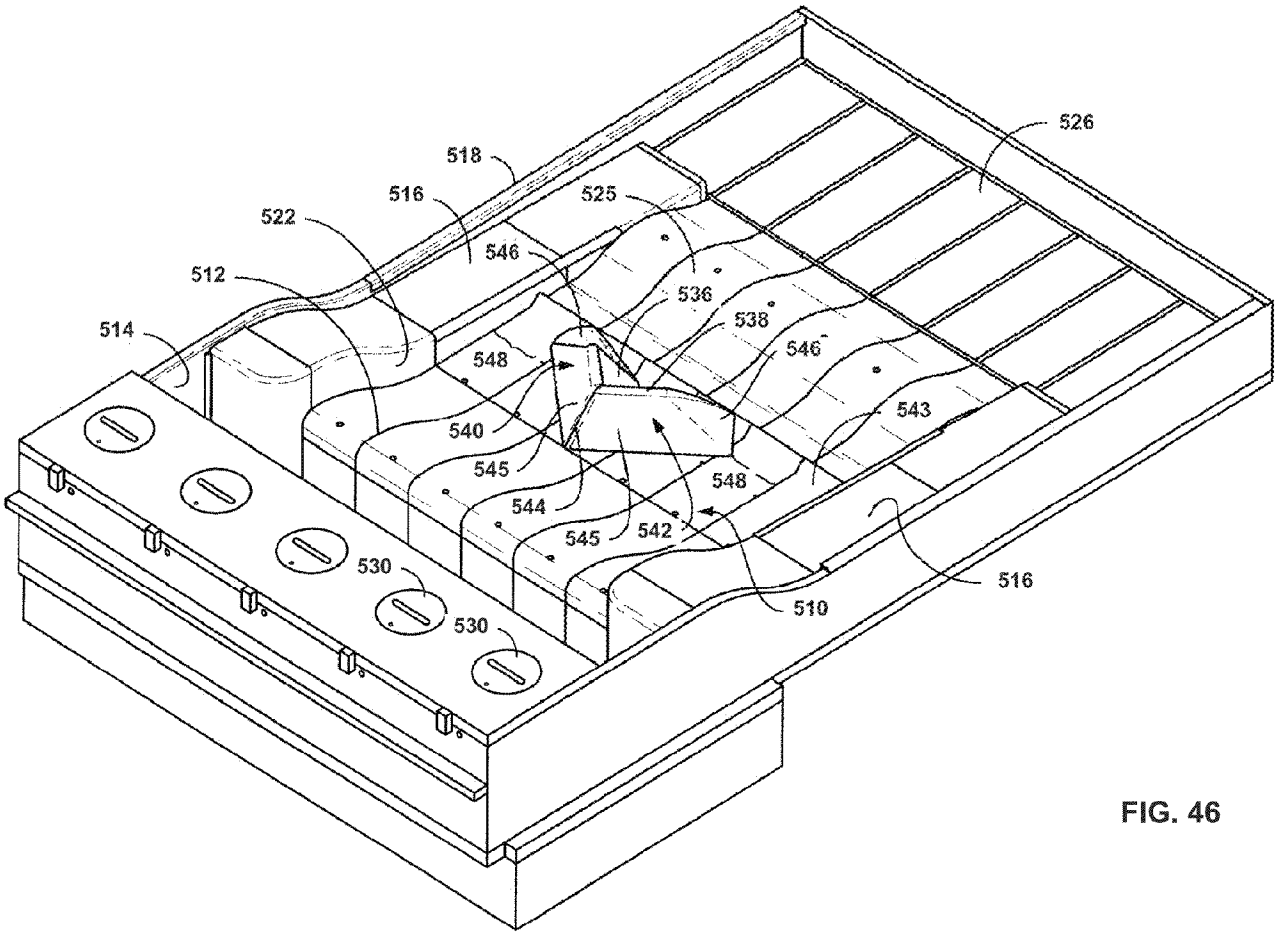
FIG. 46 is a perspective view of a wave forming apparatus having a double barreling wave forming foil.

FIGS. 46, 47, 48A and 48B illustrate another embodiment of a wave forming apparatus 500 designed to form barreling waves. The apparatus basically comprises a channel 510 for containing a flow of water, the channel having a weir 512 at its inlet end connected to a supply of water in a reservoir 514. Reservoir 514 has a smooth radius throat section guiding water over weir 512 and into the channel 510. River banks or entry/exit portions 516 extend outwardly from opposite side walls 522 of the wave forming channel 510 to the outer sides 518 of the apparatus, which are spaced outwardly from the outer sides of channel 510, as best illustrated in FIGS. 46 and 48. The outer side walls 518 may be eliminated in alternative embodiments. The river banks may be inclined downwardly at a small angle towards the trailing or exit end of the channel. Two barreling wave forming foils 540, 542 are mounted in the channel in a generally V-shaped formation with an apex 544 facing upstream. The foils 540, 542 face opposite side walls 522 of the channel at an oblique angle to the flow direction of water along the channel. Apart from foils 540, 542, the wave forming apparatus is similar to the apparatus described in my U.S. Pat. Nos. 6,629,803 and 6,932,541 and pending application Ser. No. 11/248,380 filed Oct. 11, 2005, and the contents of each of these documents are incorporated herein by reference.

Figure 47:
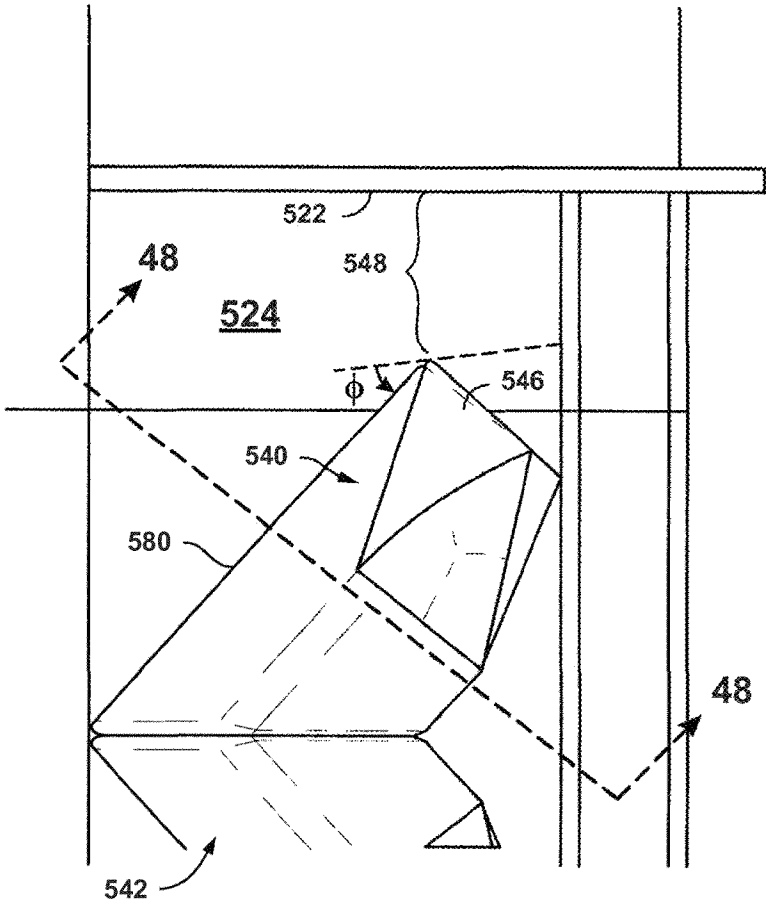
FIG. 47 is a top plan view, partly cut away, of the barreling wave forming foil of FIG. 46.

As best illustrated in FIGS. 47 and 48, the channel 510 has a floor 524 and the weir or alpha foil 512 is formed in the floor at the inlet end of the channel so as to direct water from reservoir 514 into a flowing stream of relatively deep water along channel 510, as described in my prior patents and application referenced above. One or more bed forms or beta foils 525 for forming a standing wave may be located downstream of alpha foil 512 and oblique foils 540, 542, with a spoiler or small bump 543 in the floor prior to secondary or beta foil 525, but this is not essential and no additional foils may be provided downstream of oblique or barreling wave forming foils in other embodiments. A grating 526 or the like is provided at the outlet end of the channel in this embodiment, and water is returned via a passageway 528 extending under floor 524 and pumped by pumps 530 back into the reservoir 514. In an alternative embodiment, water could be returned by running out of the channel into a river or pool.

Although a weir or alpha foil is used in the illustrated embodiments to direct a stream of water along channel 510, in alternative embodiments the desired stream condition could be created with a tank and sluice gate or nozzle. The opposite side walls 522 of the channel may be straight, as illustrated, or may taper outwardly from the inlet end to the outlet end of the channel, and define a primary flow path for water through the channel.

Weir or alpha foil 512 curves downwardly from its peak to the floor 524 of the channel. Oblique foils 540, 542 each have a base which is mounted in the floor 524 of the channel, a generally flat or slightly convex, inclined leading face 545, a venturi face 546 extending from the leading face 545 and forming a venturi pass 548 with the adjacent side wall 522 of the channel, and a rear face 536. In the illustrated embodiment, each leading face 545 is at a sweep angle Φ of around 40 degrees to the direction of oncoming water flow in the channel, as best seen in FIG. 47.

Figure 48A:
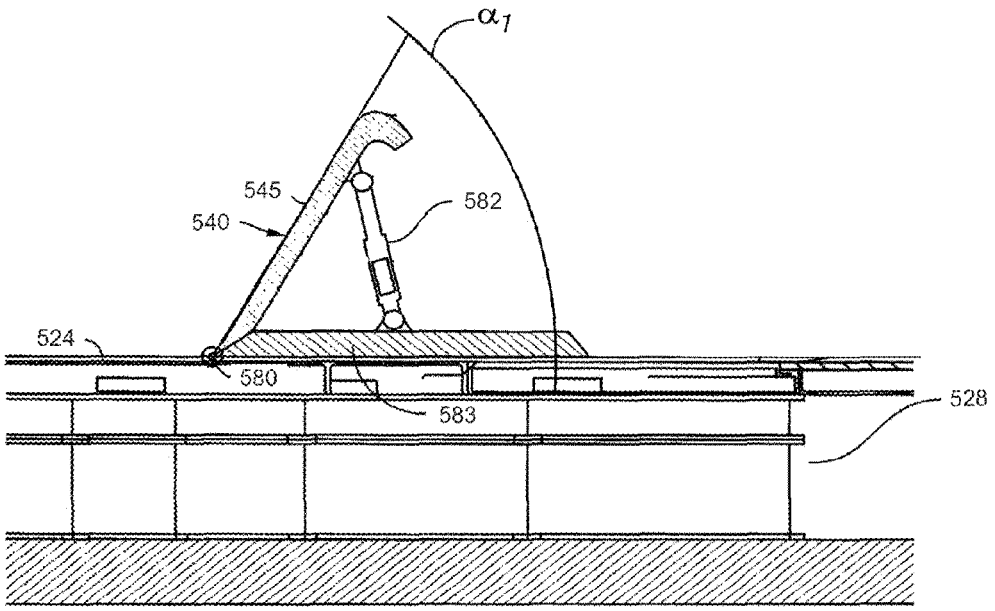
FIG. 48A is a cross sectional view on the lines 48-48 of FIG. 47, showing the leading face of the foil at a first pitch angle.
Figure 48B:
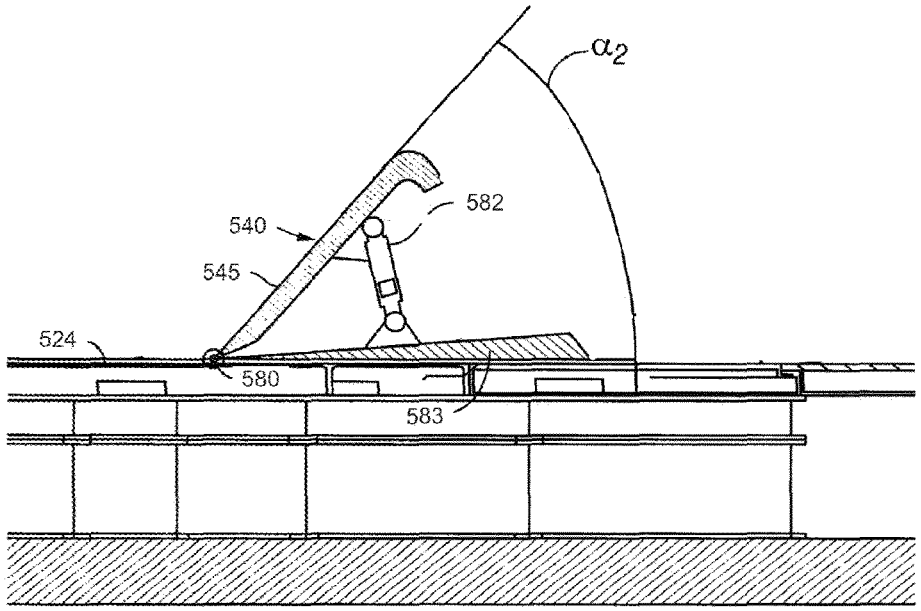
FIG. 48B is a cross sectional view similar to FIG. 48A, but showing the leading face of the foil at an adjusted, different pitch angle.

Leading face 545 is also inclined at an adjustable vertical tilt or pitch angle α relative to the floor 524 of the channel, as seen in FIGS. 48A and 48B. The arrangement and shape of the barreling wave forming foils 540, 542 is similar to the foils described in my application Ser. No. 11/550,239 filed Oct. 17, 2006 for a Barreling Wave Generating Device, the entire contents of which are incorporated herein by reference. In that application, one or more oblique or barreling wave forming foils are formed in the floor of the channel or may be a modular component for securing in the floor of the channel as desired. As stated in the prior application, the barreling wave forming foil or foils may be built flush in the flat tail portion extending from the alpha foil 512 and raised by means of actuators into the position shown in the drawings, or may be an inflatable device that can be raised and lowered. This allows the channel to be used to produce only a standing wave at beta foil 525, as described in my prior patents and pending application referenced above, or to be used to produce one or two standing barreling waves by raising one or both of the oblique foils 540, 542. In the prior application, foils 540, 542 positioned in a V-configuration were formed integrally or secured together at apex 544. In the embodiment of FIGS. 46 to 49, foils 540, 542 may be separate from one another to allow them to be adjusted independently, or may be secured together and adjusted with a single actuator.

Figure 49:
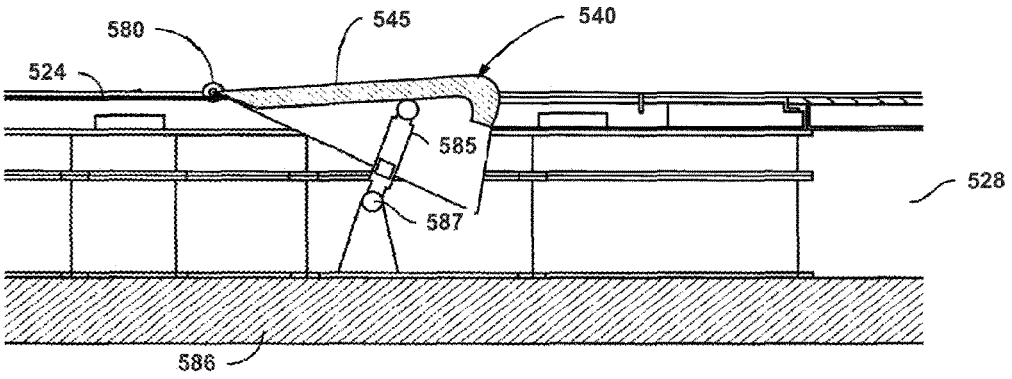
FIG. 49 is a cross sectional view similar to FIG. 48A but showing an alternative adjustment mechanism allowing the foil to be retracted substantially flush with the floor.

In this embodiment, as illustrated in FIGS. 47 and 48, each barreling wave forming foil 540, 542 is adjustably mounted in the floor 524 of the channel by a hinge or pivot 580 at its leading edge which faces the oncoming water flow in the channel, and one or more hydraulic or pneumatic ram actuators 582 or the like extends between an inner side of the front face 545 of the foil and a fixed base part 583 to allow the front face 545, or the entire foil, to be adjusted through a range of different pitch angles, including pitch angle α1 as illustrated in FIG. 48A and pitch angle α2 as illustrated in FIG. 48B. The adjustment can take place continuously so as to move a barreling wave across the front face 545, as described in more detail below. In the illustrated embodiment, angle α1 is around 70 degrees while α2 is around 30 degrees. The angular range provided by the adjustment mechanism may be in the range from 0 to 90 degrees in alternative embodiments. FIG. 49 illustrates an alternative adjustment mechanism which allows the adjustable foil 540 and 542 to be retracted into a position substantially flush with the floor 524 of the channel. In this embodiment, a hydraulic or pneumatic actuator 585 is pivoted at one end on a pivot mount 587 in the bottom wall 586 of the passageway 528 beneath the floor of the channel and pivoted at the other end on an inner side of the front face or wall 540 of the foil. The foil is retracted down through an opening in the floor 524 when the actuator is fully retracted, as seen in FIG. 49, and tilts up through the opening as the actuator is extended.

The upper edge 538 of each foil 545 is convex or curved to reduce the risk of injury. The foil height in the illustrated embodiment is about equal to the height of the outer side walls 518 and greater than the height of channel side walls 522. This height difference is to ensure that at least part of a wave forming in the venturi pass is above the height of the channel walls, so that water can drain away from the venturi area and along the river banks 516 to avoid choking or backing up the flow. In one embodiment, the height of the channel wall 522 is around eleven inches below the peak 538 of the foil, and the channel wall height is around 30 inches. These dimensions are suitable for a 2.5 foot wave, but may be scaled up or down in alternative embodiments, depending on the overall size of the wave forming apparatus. The trailing or rear face 536 is also generally flat and inclined downwardly.

The venturi face 546 starts off facing the opposing channel side wall 522 and has a convex curvature leading from the trailing end of the relatively flat leading face 545, then curves rearwardly back towards trailing or rear face 536 and downwardly towards the floor of the channel, as best illustrated in FIG. 46. Venturi face 546 has a curved apex which is rounded for safety to avoid a sharp corner, and also helps to reduce turbulence in the water flowing around the apex. The venturi pass 548 is defined between the leading, convex end of venturi face 546 and the opposing channel side wall, as indicated in FIG. 47. The leading end of face 546 is inclined away from the channel side wall in a direction upwardly from the floor at a "yaw" angle so that the venturi pass increases in width in a direction upwardly from the floor of the channel, as best illustrated in FIG. 46. In the illustrated embodiment, the yaw angle is around 30 degrees, but this angle may range from 90 degrees to 20 degrees in alternative embodiments, dependent on the desired width of the venturi pass.

In this apparatus, an initial smooth and streamlined flow of relatively deep water enters the channel at foil 512. In one embodiment, the water velocity at the inlet end of the channel is around 12 feet per second while the water depth is around 0.7 feet. In alternative embodiments, the velocity may be in the range of around 8 to 25 fps, and the water depth may be in the range from 0.5 to 3.5 feet. Part of the water in the left hand half of the channel as viewed in FIG. 48 rises up the leading face 545 and bends laterally towards the venturi pass 548. The water moving over the leading face is of sufficient depth and velocity to support surfing maneuvers on various types of surfing equipment such as surfboards, bodyboards, and small kayaks known as playboats. At the same time, water moving towards the venturi face 546 of foil 540 or 542 combines with deflected water from leading face 545 to create a standing barreling wave in front of the leading face and venturi face extending laterally into the venturi pass 548. Riders can therefore ride in the barrel wave on a surfboard or bodyboard, where the apparatus is used as a water park attraction or ride. Alternatively, the apparatus on a smaller scale can be used for a visual or ornamental water feature (like a fountain) in parks, gardens, and other locations. The opposing channel wall 522 contains some of the water and allows some to spill onto the river bank 516 and run downstream to the grating or drain.

As described above, the leading surface 545 of each foil in this embodiment is hinged about the leading edge via hinge 580 at a pitch angle which can be varied by changing the extension of actuator 582. The actuator 582 can be a manual active adjuster that changes the pitch angle of the face, or may be adjusted automatically by a control system in order to vary the barreling wave formation in a desired manner. The effect of this angle change is to change the shape of the standing barreling wave. If the angle a is increased, the barreling area of the wave advances along the face of the foil, parallel to the hinge in a direction away from the venturi area. This produces the visual and functional effect of a naturally occurring ocean wave that is peeling as it travels. In this case it is a standing wave that peels across limited to the width of the stream. The effect is reversed by reducing the pitch angle. The rider has the advantage of a dynamic characteristic more closely simulating ocean surfing.

The practical angles of adjustment include the range from 0 (flat) to 90 (vertical) degrees. When flat, the foil is not functional, preventing any oblique wave from forming. As the angle increases, the stream redirected by the foil begins to interact with the foil and venturi to produce an oblique wave. At an optimum angle, which may be around 45 to 55 degrees, a hollow barreling section is formed. As the angle increases past optimum, for example in the range from around 55 degrees to 65 degrees, the barrel advances across the leading face 545 as described, until the wave ultimately collapses and the stream becomes overly obstructed by the foil face. As the angle is decreased from 65 degrees, the wave moves back in the opposite direction. By suitable control of the pitch angle, a barreling wave can be formed and caused to move back and forth across the barreling wave forming foil as a rider is surfing in the wave, producing a more natural effect and a longer ride.

The stream or flow rate of water arriving at the venturi pass is related to the size of the barreling wave formed at the pass. The faster the incoming rate, the bigger the wave. The venturi pass 548 and venturi face 546 are shaped to impede the flow of water so that the barrel is supported by deeper water through the pass. If the pass is too constricted, the barrel wave drowns and collapses. If the pass is not restricted enough, the barrel is smaller or non-existent, although there is still a surfable wave face in front of the foil 540 or 542. The venturi face is positioned close enough to the channel side wall 522 for the water flow to be impeded sufficiently to form a standing barreling wave. In the illustrated embodiment, the width of the venturi pass at the floor of the channel is of the order of 37 inches and the overall channel width is around 20 feet. The venturi pass width is varied depending on the size of the channel and foil and the water stream rate characteristics. In general, the venturi pass width is approximately the same as the height of foil 520, and the maximum height of the foil is approximately the same as the desired wave height.

On arriving at the venturi pass 548, the water transitions from its initial shallower, higher speed condition ahead of leading edge of venturi face 545 to a substantially deeper stream above the venturi face and into the venturi pass. After pitching out and forming the barrel, the water lands primarily in the venturi pass area on top of the primary stream. This is a safety advantage, since riders can land in water. The primary stream serves to force the low energy water continuously through the venturi pass and over beta foil 525.

As noted above, the peak or top of the oblique foil is convex, and the peak and inclined downstream or rear face 536 of the foil allow water to stream freely over the foil in this area. The foil peak and downstream foil trailing surface 536 together allow a relatively smooth and safe transition for riders down into the downstream portion of the channel. Although the leading face of the foil has an abrupt or angled intersection with the floor 524 of the channel, as seen in FIG. 47, it may alternatively be smoothly blended into the floor at the pivot connection 580 for a smooth, curved transition from floor to foil.

The river banks 516 allow drainage around the foils 540, 542 without allowing water to leave the outer containment walls, and also allow for entry and exit of the ride. The channel may alternatively be made wider and deeper, but this is not practical for entry and might require more water flow and expense to operate.

In the embodiment illustrated in FIGS. 48A and 48B, each barreling wave forming foil 540, 542, or the front face of the foil, is designed to pivot through a selected range of angles of around 30 degrees to 70 degrees. In an alternative embodiment, as illustrated in FIG. 49, the entire foil is designed to pivot between a position flush with the floor 524 and a position in which the front face is at a desired maximum angle, which may be substantially vertical. In this case, sliding floor sections may be actuated to ensure that there are no gaps in the floor between the opening into which the foil retracts and the flush portions of the foil. In another alternative embodiment, the rigid, hinged foil with actuator 582 may be replaced by an inflatable foil of similar shape when fully inflated, along with a pressurized fluid supply which supplies fluid such as pressurized gas or a liquid to the foil for inflation purposes, and the foil may be designed to be inflated in sections to provide different leading face pitch angles.

Figure 50:
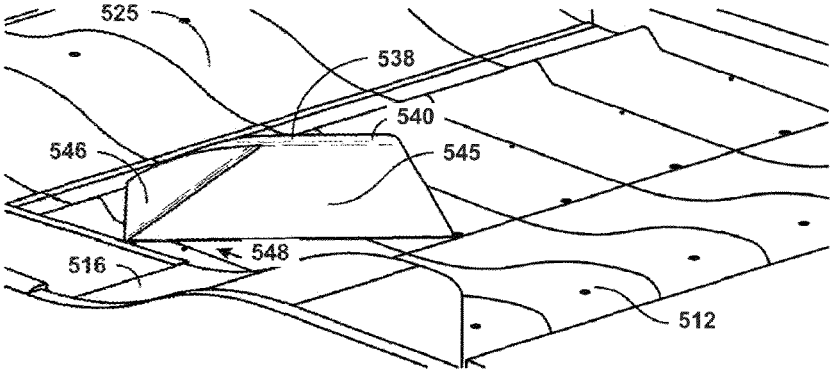
FIG. 50 is a perspective view of part of the channel of a wave forming apparatus similar to FIG. 46 but with a single barreling wave forming foil.
Figure 51:
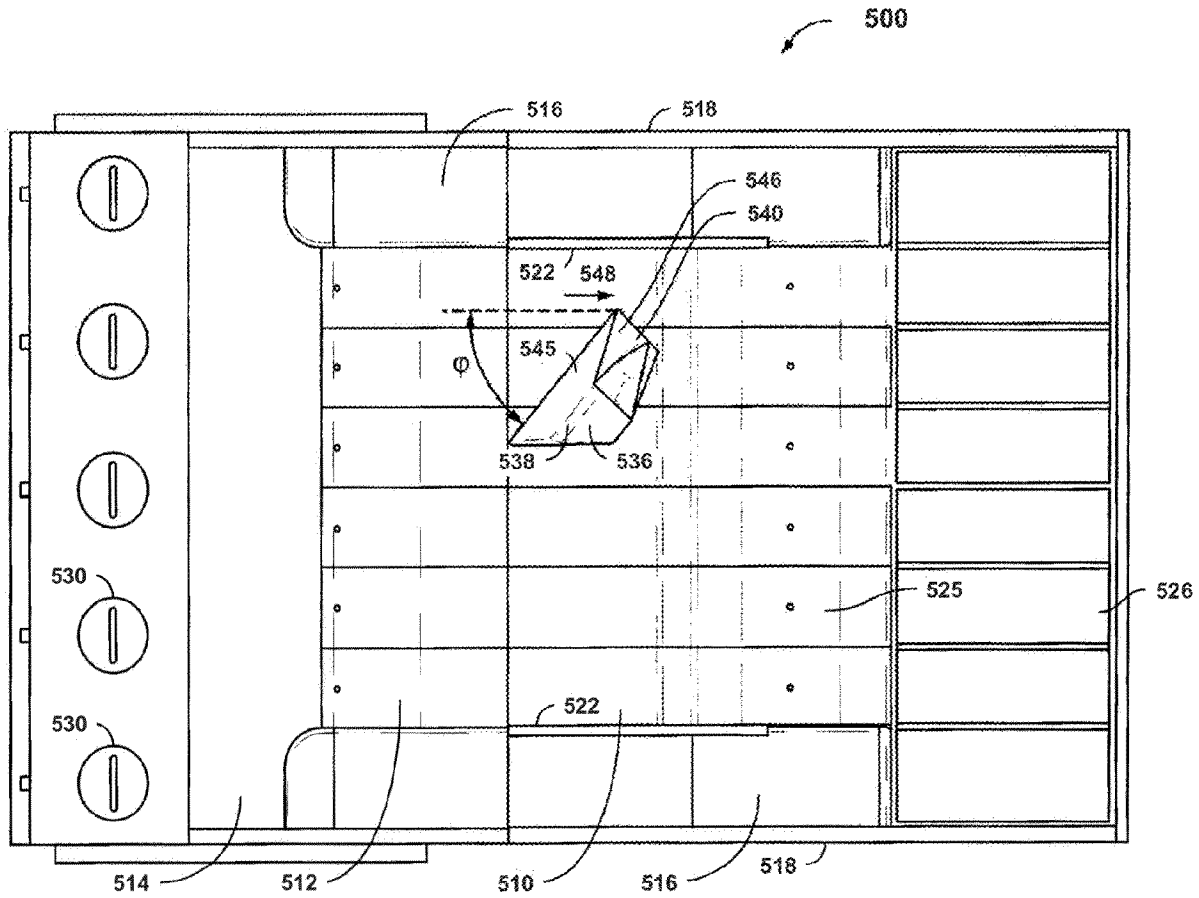
FIG. 51 is a top plan view of the apparatus of FIG. 50 which has a single barreling wave forming foil in one half of the channel.

In the embodiment of FIGS. 46 to 48, two barreling wave forming foils 540, 542 are provided in a V-configuration to produce barreling waves on each side of the channel. In an alternative embodiment, as illustrated in FIGS. 50 and 51, only one barreling wave forming foil 540 is provided on one side of the channel. This foil is exactly the same as one of the foils in the previous embodiment and is adjustable in the same manner to vary the pitch angle of the leading face 545, and like reference numbers are used for like parts as appropriate. In this embodiment, the foil 540 and venturi pass take up half or less than half of the width of the channel. Another type of wave may be formed in the other half of the channel, such as a wave of the type formed by shaped bed forms in the channel, as described in my prior patents and application referenced above.

Figure 52:
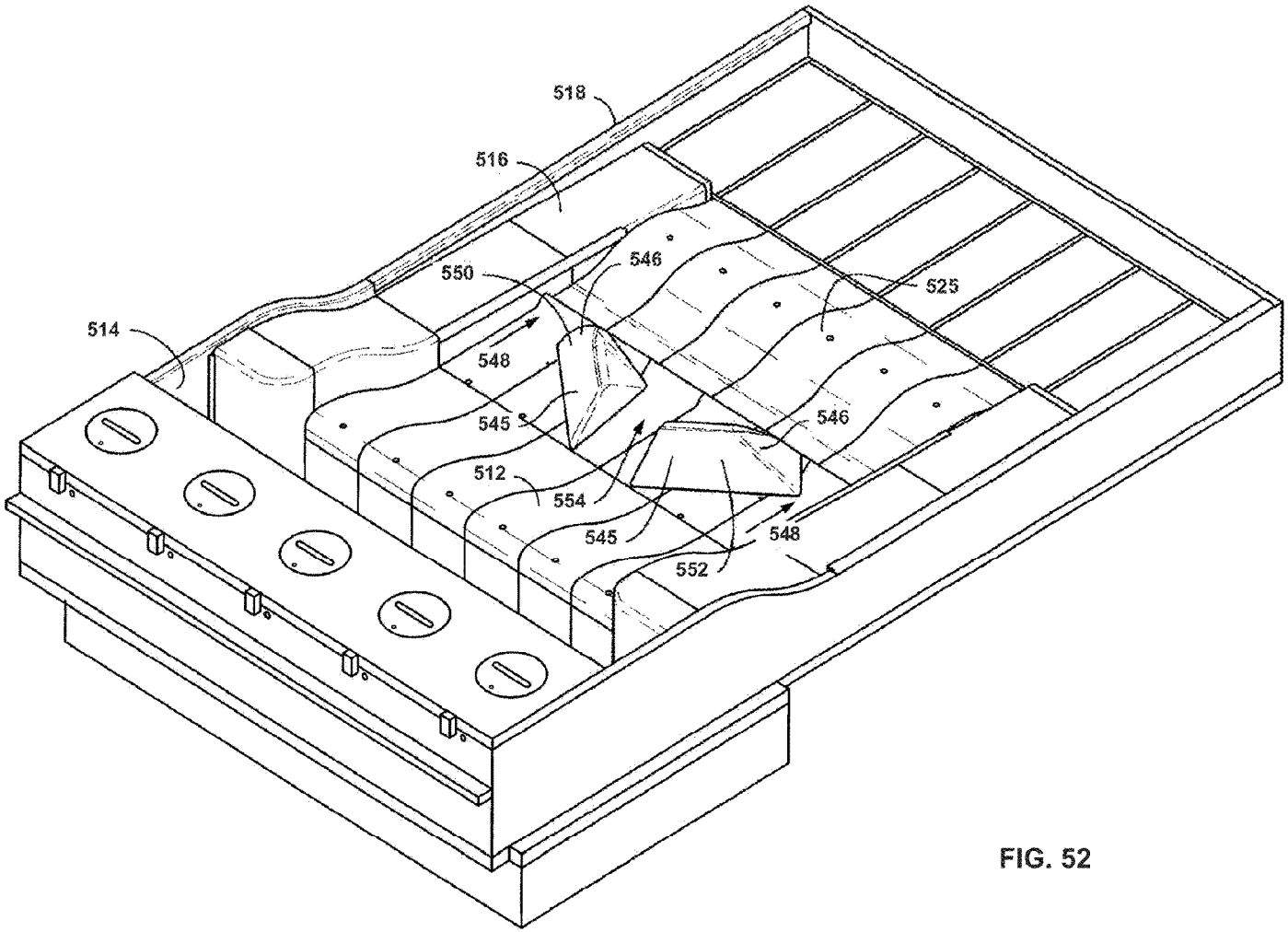
FIG. 52 is a perspective view of a wave forming apparatus of another embodiment having two separate barreling wave forming foils mounted in the channel.

FIG. 52 illustrates another embodiment which is similar to that of FIGS. 46 to 48 in that two barreling wave forming foils 550, 552 are used, but the foils in this case are separate, with a pass 554 formed along the center of the channel 510 between the foils. This apparatus is otherwise identical to that of the previous embodiments, and like reference numbers have been used for like parts as appropriate. As in FIGS. 46 to 48, each foil 550, 552 has a generally flat, inclined leading face 545 and a rearwardly curved venturi face 546 leading from the trailing end of the leading face and defining a venturi pass 548 between the leading edge of face 546 and the opposing channel side wall 522. Also as in the previous embodiments, each barreling wave forming foil is adjustably mounted in the floor of the channel at its leading edge via a pivot mount and can be tilted up and down to vary the pitch angle and move the barreling wave across the face of the foil.

In each of the above embodiments, the barreling wave forming foils may be separate modules having bases adapted for mounting in the channel with suitable actuators for varying the pitch angle as desired, for example using an actuator 582 as illustrated in FIGS. 48A and 48B or an actuator 585 as illustrated in FIG. 49. They may be designed to tilt back flush into the floor of the channel and raised into position by actuators when a barreling wave action is desired, and they may be pivoted up and down through a range of pitch angles so as to vary or move the barreling wave. The foil or foils may be rigid devices as shown or may be hollow, inflatable devices that can be inflated or deflated as desired by a ride operator. If the latter, separate wedge-shaped sections may be pivoted at their vertices and inflated in sequence to produce different pitch angles.

In the embodiment of FIG. 52 two separate standing barreling waves are formed, one at each venturi pass 548. The pass 554 between the foils in FIG. 52 improves stream conditions downstream and behind the foils 550, 552 and also helps to separate riders if necessary.

Figure 53:
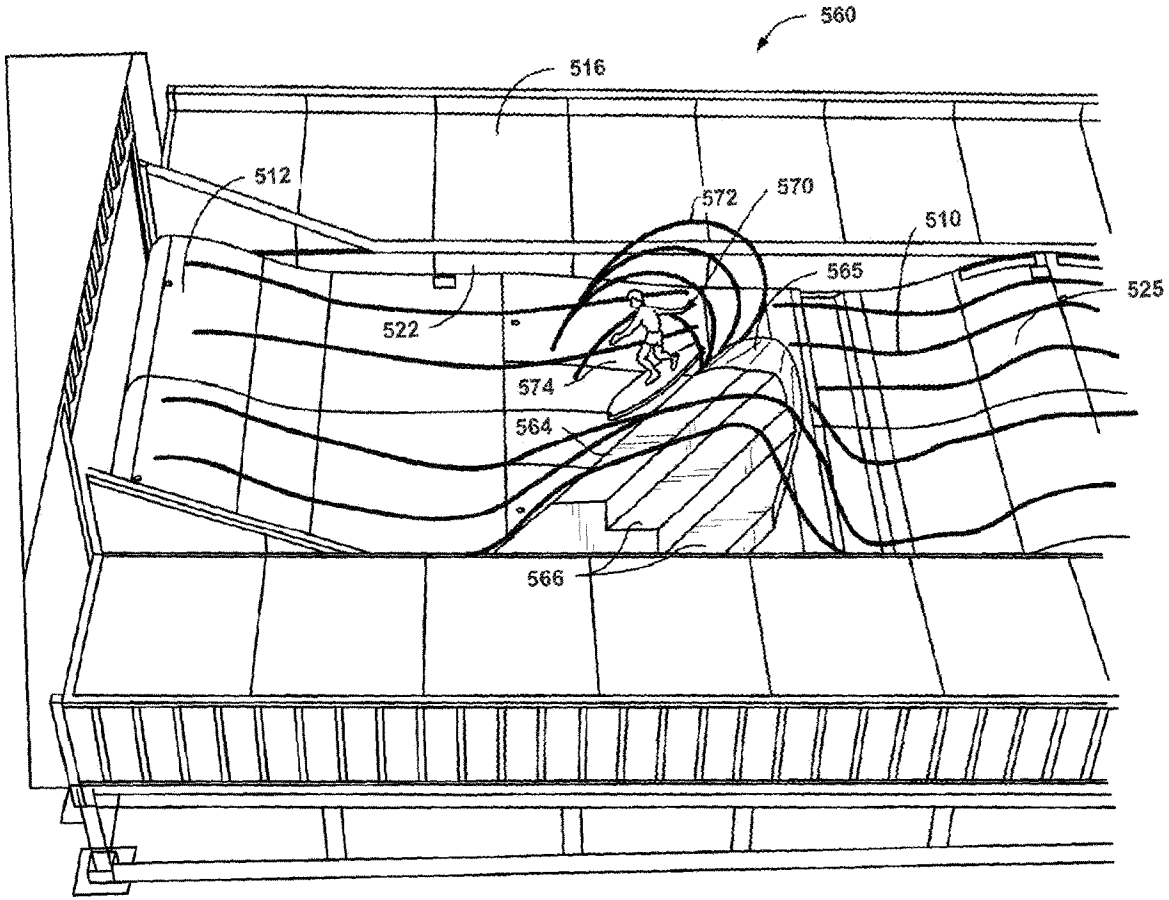
FIG. 53 is a perspective view of a wave forming apparatus of another embodiment having a single barreling wave forming foil mounted across a larger portion of the width of the channel, schematically illustrating formation of a barreling wave.

FIG. 53 illustrates a wave forming apparatus 560 of another embodiment which has an oblique or barreling wave generating foil 562 which extends across a larger portion of the channel 510 than in the previous embodiments. In this embodiment, a single barreling wave generating foil and venturi gap span the entire width of the channel, rather than only around half of the channel as in the previous embodiments, and the shape of the rear wall of the foil is modified. The remainder of the apparatus in FIG. 53 is the same as in the previous embodiments, and like reference numerals have been used for like parts as appropriate. As in the previous embodiments, the larger barreling wave generating foil 560 can be pivotally mounted in the floor of the channel at its forward edge so that the pitch angle of the leading face 564 can be adjusted throughout the barreling wave formation. This embodiment is more appropriate for a dedicated barreling wave machine, whereas the previous embodiments are appropriate for a channel in which a barreling wave is one of several water attractions or rideable waves.

As in the previous embodiments, foil 562 is mounted in the floor 524 of the channel downstream of alpha foil or weir 512. Foil 562 extends from one side wall 522 across the channel at an oblique angle to the water flow direction. Foil 562 has a generally flat, inclined leading face 564 and venturi face 565 extending from the leading face, as in the previous embodiments. However, the trailing or rear face of the foil is modified. The trailing face is formed with a series of steps 566 leading up to the peak 568 of foil 562. These steps can be used as a possible entry point for the ride.

The shapes and angles of the leading and venturi faces 564, 565 in this embodiment are the same as in the previous embodiments, with the leading face 564 inclined both to the flow direction and the floor of the channel. The venturi face is convex and the leading edge or portion forms a venturi pass 570 with the adjacent, opposing side wall 522 of the channel. Venturi face 565 then curves back away from the side wall, as in the previous embodiments.

Figure 54:
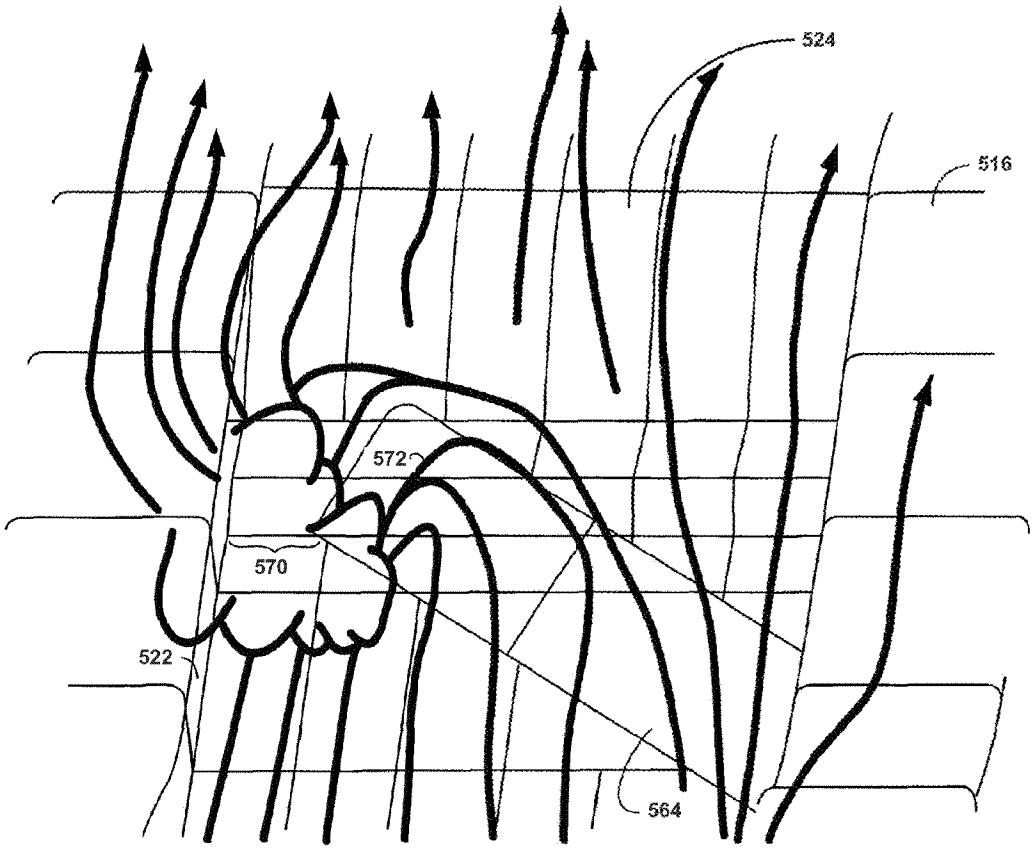
FIG. 54 is a perspective view of part of the channel in FIG. 53, taken from a different direction, showing the front face of the foil at a first pitch angle and schematically illustrating the location of the barreling wave.
Figure 55:
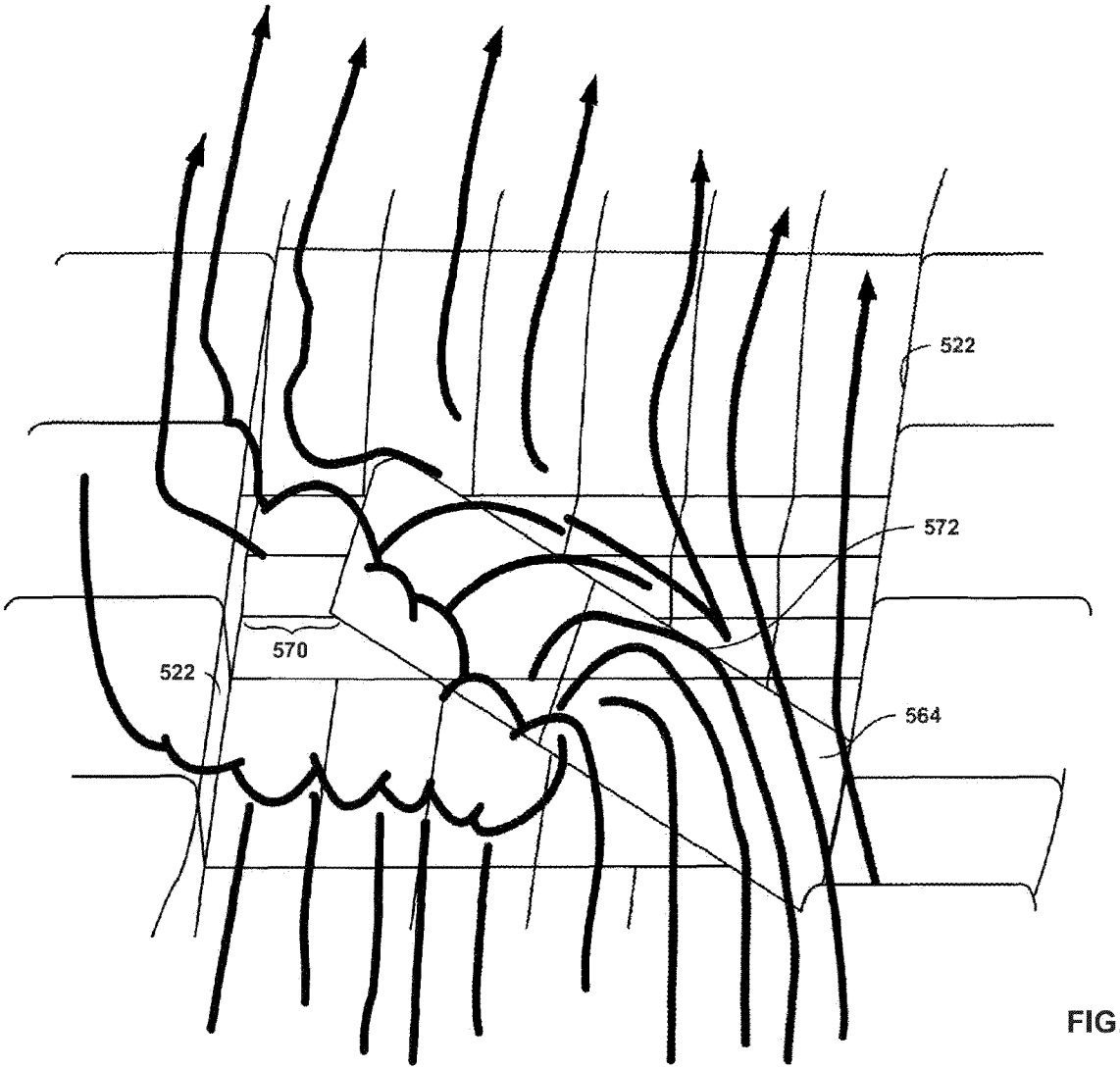
FIG. 55 is a view similar to FIG. 54 showing the front face of the foil at a different pitch angle and schematically illustrating the movement of the barreling wave when the foil angle is changed between the orientation of FIG. 54 and that of FIG. 55.

FIG. 53 schematically illustrates the water flow through channel 510, as indicated by the darker lines. As can be seen, water flowing on the right hand side of the channel as viewed from alpha foil 512 flows up and over the leading face 564 of the foil. Water moving towards the venturi face 565 of foil 562 in the left hand part of the channel combines with deflected water from leading face 564 to create a standing barreling wave 572 in front of the venturi face extending laterally into the venturi pass 570. FIG. 53 illustrates surfer 574 riding in the wave. The opposing channel wall 522 contains some of the water and allows some to spill onto the river bank 516 and run downstream to the grating or drain. Water also spills off the leading face of the foil onto the other river bank 516. Alternatively, the channel wall on this side could be raised to prevent spilling, or the foil could be extended widthwise over the inner channel side wall and onto the river bank to prevent water spilling on this side. Adjustment of the pitch angle of leading face 564 moves the barreling wave 572 back and forth across face 564 to produce a more natural appearance and ride. FIGS. 54 and 55 schematically illustrate the different positions of the barreling wave 572 when the angle of face 564 is adjusted. FIG. 54 illustrates the location of barreling wave 572 when the face 564 is at an angle of around 55 degrees, while FIG. 55 illustrates that the wave 572 has moved across face 64 to the right when the angle is increased to around 70 degrees. The dark arrows represent the water flow.

Figure 56:
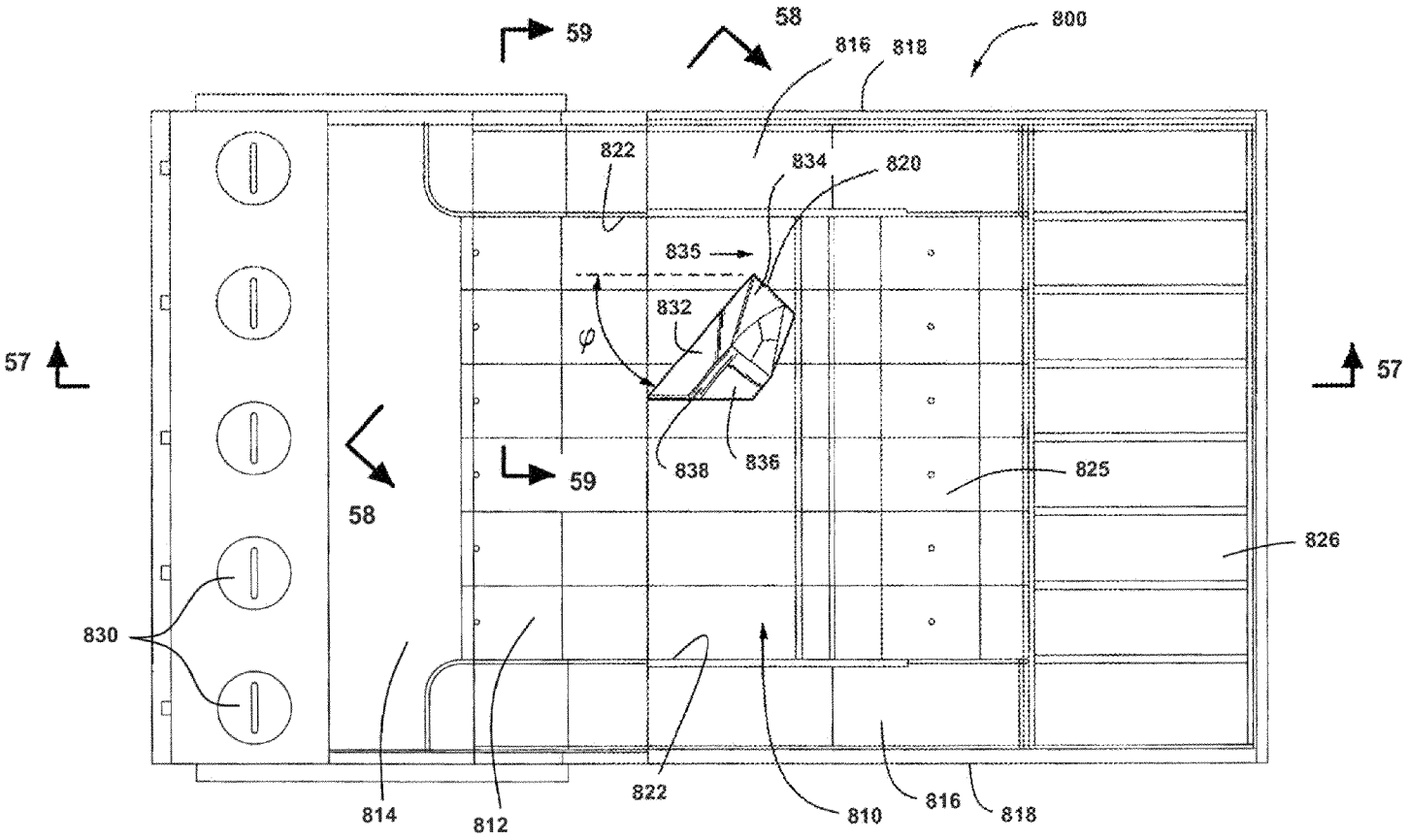
FIG. 56 is a top plan view of a wave forming apparatus having a barreling wave forming foil.
Figure 57:
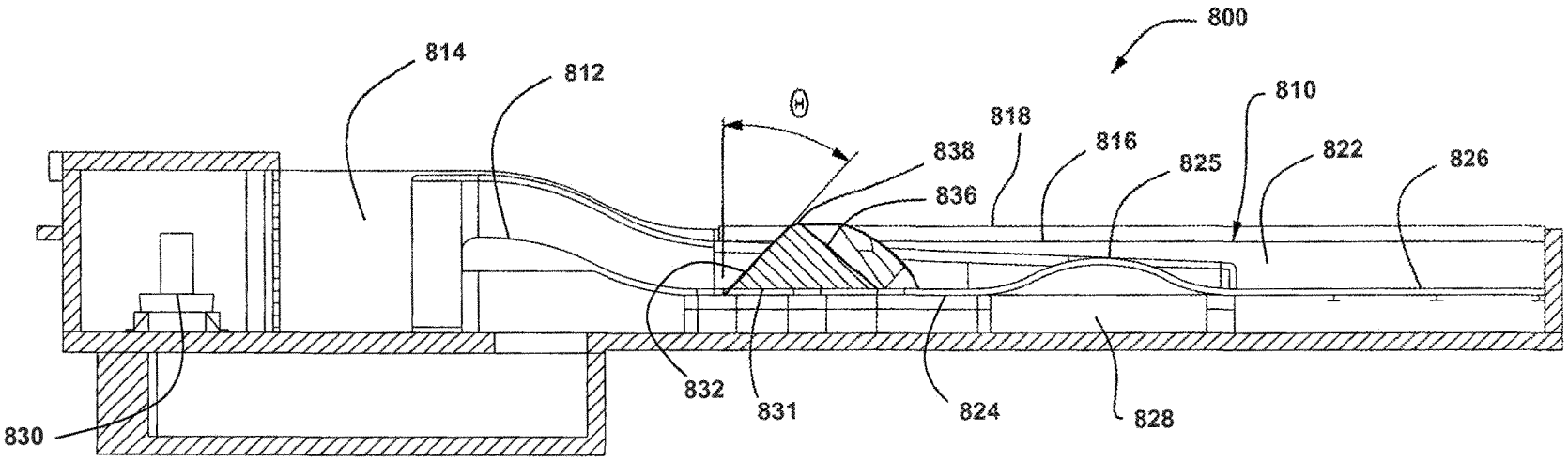
FIG. 57 is a cross-sectional view on the lines 57-57 of FIG. 56.
Figure 58:
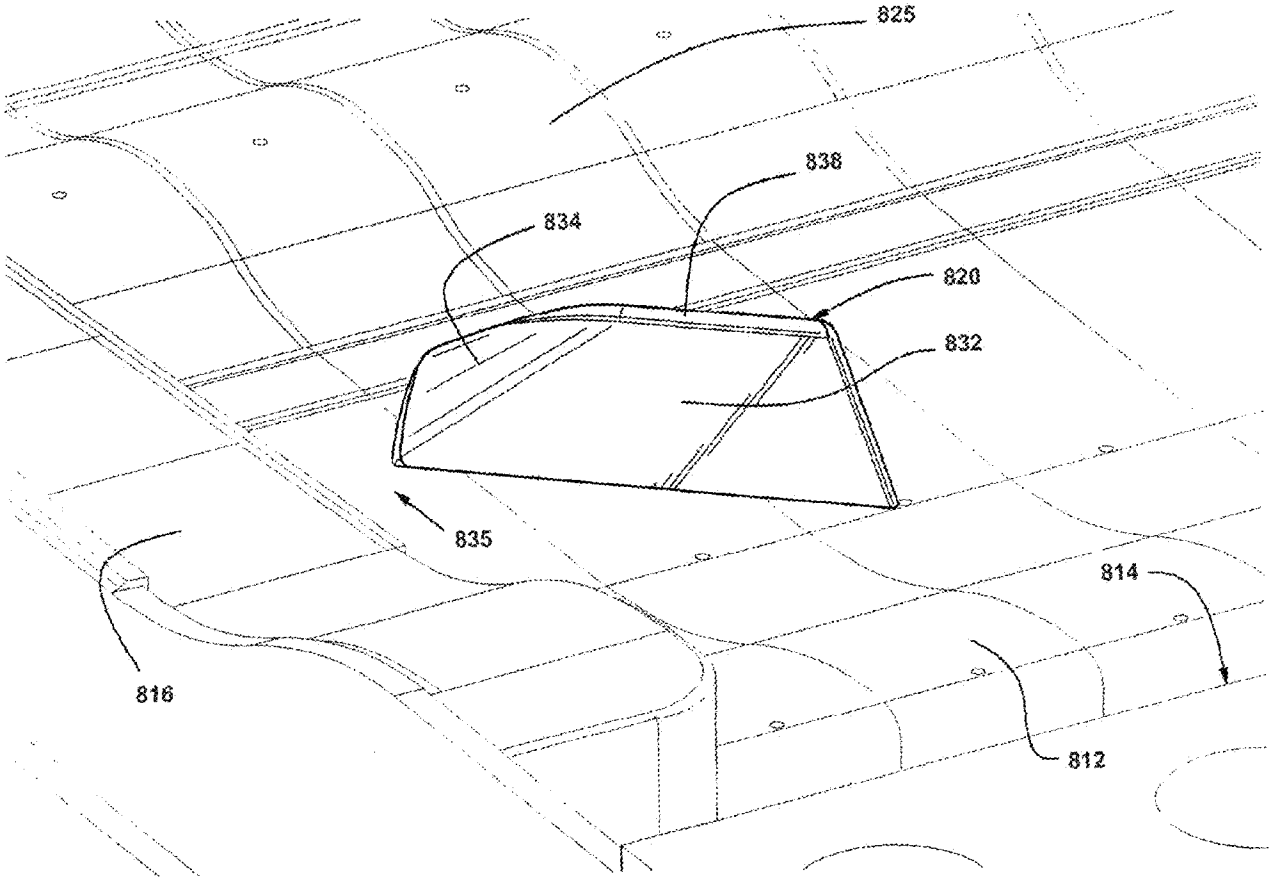
FIG. 58 is a perspective view of the wave forming foil in the direction of arrows 58-58 of FIG. 56.

FIGS. 56 to 59 illustrate another embodiment of a wave forming apparatus 800 designed to form barreling waves. The apparatus basically comprises a channel 810 for containing a flow of water, the channel having a weir 812 at its inlet end connected to a supply of water in a reservoir 814. Reservoir 814 has a smooth radius throat section guiding water over weir 812 and into the channel 810. River banks or entry/exit portions 816 extend outwardly from opposite side walls 822 of the wave forming channel 810 to the outer sides 818 of the apparatus, which are spaced outwardly from the outer sides of channel 810, as best illustrated in FIGS. 56 and 58. The outer side walls 818 may be eliminated in alternative embodiments. The river banks may be inclined downwardly at a small angle towards the trailing or exit end of the channel. A barreling wave forming foil 820 is mounted in the channel facing one side wall 822 of the channel at an oblique angle to the flow direction of water along the channel. Apart from foil 820, the wave forming apparatus is similar to the apparatus described in my U.S. Pat. Nos. 6,629,803 and 6,932,541 and application Ser. No. 11/248,380 filed Oct. 11, 2005, and the contents of each of these documents are incorporated herein by reference.

As best illustrated in FIG. 57, the channel 810 has a floor 824 and the weir or alpha foil 812 is formed in the floor at the inlet end of the channel so as to direct water from reservoir 814 into a flowing stream of relatively deep water along channel 810, as described in my prior patents and application referenced above. One or more bed forms or beta foils 825 for forming a standing wave may be located downstream of alpha foil 812 and oblique foil 820, but this is not essential and no additional foils may be provided downstream of oblique or barreling wave forming foil 820 in other embodiments. A grating 826 or the like is provided at the outlet end of the channel in this embodiment, and water is returned via a passageway 828 extending under floor 824 and pumped by pumps 830 back into the reservoir 814. In an alternative embodiment, water could be returned by running out of the channel into a river or pool.

Although a weir or alpha foil is used in the illustrated embodiments to direct a stream of water along channel 810, in alternative embodiments the desired stream condition could be created with a tank and sluice gate or nozzle. The opposite side walls 822 of the channel may be straight, as illustrated, or may taper outwardly from the inlet end to the outlet end of the channel, and define a primary flow path for water through the channel.

Weir or alpha foil 812 curves downwardly from its peak to the floor 824 of the channel. The oblique or barreling wave forming foil 820 may be formed in the floor of the channel or may be a modular component for securing in the floor of the channel as desired. It may be built flush in the flat tail portion extending from the alpha foil 812 and raised by means of actuators into the position shown in the drawings, or may be an inflatable device that can be raised and lowered. This allows the channel to be used to produce only a standing wave at beta foil 825, as described in my prior patents and pending application referenced above, or to be used to produce standing barreling waves by raising the oblique foil 820.

Oblique foil 820 has a base 831 for mounting in the floor 824 of the channel, a generally flat or slightly convex, inclined leading face 832, a venturi face 834 extending from the leading face 832 and forming a venturi pass 835 with the adjacent side wall 822 of the channel, and a rear face 836. In the illustrated embodiment, the leading face 832 is at a sweep angle Φ of around 40 degrees to the direction of oncoming water flow in the channel, as best seen in FIG. 56. Angle Φ may be in the range from 10 degrees to 70 degrees in alternative embodiments. Leading face 832 is also inclined at a vertical tilt or pitch angle Θ, as seen in FIG. 57. In the illustrated embodiment, angle Θ is 35 degrees from vertical, but may be in the range from 25 to 70 degrees in alternative embodiments. The upper edge 838 of the foil is convex or curved to reduce the risk of injury. The foil height in the illustrated embodiment is about equal to the height of the outer side walls 818 and greater than the height of channel side walls 822. This height difference is to ensure that at least part of a wave forming in the venturi pass is above the height of the channel walls, so that water can drain away from the venturi area and along the river banks 816 to avoid choking or backing up the flow. In one embodiment, the height of the channel wall 822 is around eleven inches below the peak 838 of the foil, and the channel wall height is around 30 inches. These dimensions are suitable for a 2.5 foot wave, but may be scaled up or down in alternative embodiments, depending on the overall size of the wave forming apparatus. The trailing or rear face 836 is also generally flat and inclined downwardly.

Figure 59:
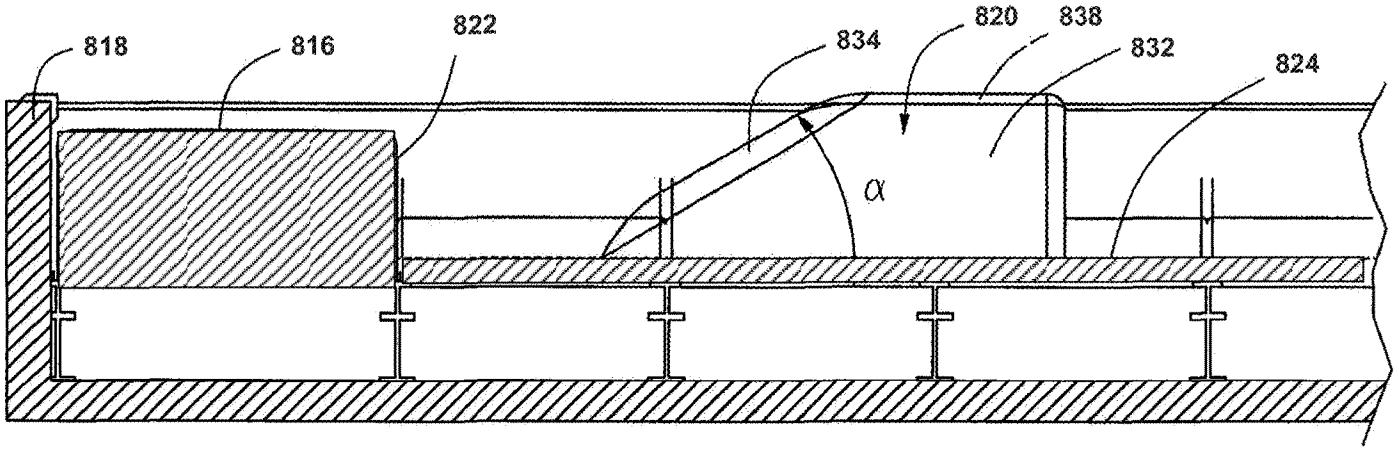
FIG. 59 is a front elevation view of the foil in the channel in the direction of arrows 59-59 of FIG. 56.

The venturi face 834 starts off facing the opposing channel side wall 822 and has a convex curvature leading from the trailing end of the relatively flat leading face 832, then curves rearwardly back towards trailing or rear face 836 and downwardly towards the floor of the channel, as best illustrated in FIG. 58. The curved apex of the venturi face is rounded for safety to avoid a sharp corner, and also helps to reduce turbulence in the water flowing around the apex. The venturi pass 835 is defined between the leading, convex end of venturi face 834 and the opposing channel side wall. The leading end of face 834 is inclined away from the channel side wall at a "yaw" angle α so that the venturi pass increases in width in a direction upwardly from the floor of the channel, as best illustrated in FIG. 59. In the illustrated embodiment, yaw angle α is around 31 degrees, but this angle may range from 90 degrees to 20 degrees in alternative embodiments, dependent on the desired width of the venturi pass.

In this apparatus, an initial smooth and streamlined flow of relatively deep water enters the channel at foil 812. In one embodiment, the water velocity at the inlet end of the channel is around 12 feet per second while the water depth is around 0.7 feet. In alternative embodiments, the velocity may be in the range of around 8 to 25 fps, and the water depth may be in the range from 0.5 to 3.5 feet. Part of the water in the left hand half of the channel as viewed in FIG. 58 rises up the leading face 832 and bends laterally towards the venturi pass 835. The water moving over the leading face is of sufficient depth and velocity to support surfing maneuvers on various types of surfing equipment such as surfboards, bodyboards, and small kayaks known as playboats. At the same time, water moving towards the venturi face 834 of foil 820 combines with deflected water from leading face 832 to create a standing barreling wave in front of the venturi face extending laterally into the venturi pass 835. Riders can therefore ride in the barrel wave on a surfboard or bodyboard, where the apparatus is used as a water park attraction or ride. Alternatively, the apparatus on a smaller scale can be used for a visual or ornamental water feature (like a fountain) in parks, gardens, and other locations. The opposing channel wall 822 contains some of the water and allows some to spill onto the river bank 816 and run downstream to the grating or drain.

The stream or flow rate of water arriving at the venturi pass is related to the size of the barreling wave formed at the pass. The faster the incoming rate, the bigger the wave. The venturi pass 835 and venturi face 834 are shaped to impede the flow of water so that the barrel is supported by deeper water through the pass. If the pass is too constricted, the barrel wave drowns and collapses. If the pass is not restricted enough, the barrel is smaller or non-existent, although there is still a surfable wave face in front of the foil 820. The venturi face is positioned close enough to the channel side wall 822 for the water flow to be impeded sufficiently to form a standing barreling wave. In the illustrated embodiment, the width of the venturi pass at the floor of the channel is of the order of 37 inches and the overall channel width is around 20 feet. The venturi pass width is varied depending on the size of the channel and foil and the water stream rate characteristics. In general, the venturi pass width is approximately the same as the height of foil 820, and the maximum height of the foil is approximately the same as the desired wave height.

On arriving at the venturi pass 835, the water transitions from its initial shallower, higher speed condition ahead of leading edge of venturi face 834 to a substantially deeper stream above the venturi face and into the venturi pass. After pitching out and forming the barrel, the water lands primarily in the venturi pass area on top of the primary stream. This is a safety advantage, since riders can land in water. The primary stream serves to force the low energy water continuously through the venturi pass and over beta foil 825.

As noted above, the peak or top of the oblique foil 820 is convex, and the peak and inclined downstream or rear face 836 of the foil allow water to stream freely over the foil in this area. The foil peak and downstream foil trailing surface 836 together allow a relatively smooth and safe transition for riders down into the downstream portion of the channel. Although the leading face of the foil has an abrupt or angled intersection with the floor 831 of the channel, as seen in FIG. 57, it may alternatively be smoothly blended into the floor for a smooth, curved transition from floor to foil.

The river banks 816 allow drainage around the foil 820 without allowing water to leave the outer containment walls, and also allow for entry and exit of the ride. The channel may alternatively be made wider and deeper, but this is not practical for entry and might require more water flow and expense to operate.

In the embodiment of FIGS. 56 to 59, the barreling wave forming foil and venturi pass take up half or less than half of the width of the channel. Another type of wave may be formed in the other half of the channel, such as a wave of the type formed by shaped bed forms in the channel, as described in my prior patents and application referenced above. Alternatively, a second barreling wave forming foil may be mounted in the other half of the channel, as described below in connection with FIGS. 60 and 61.

Figure 60:
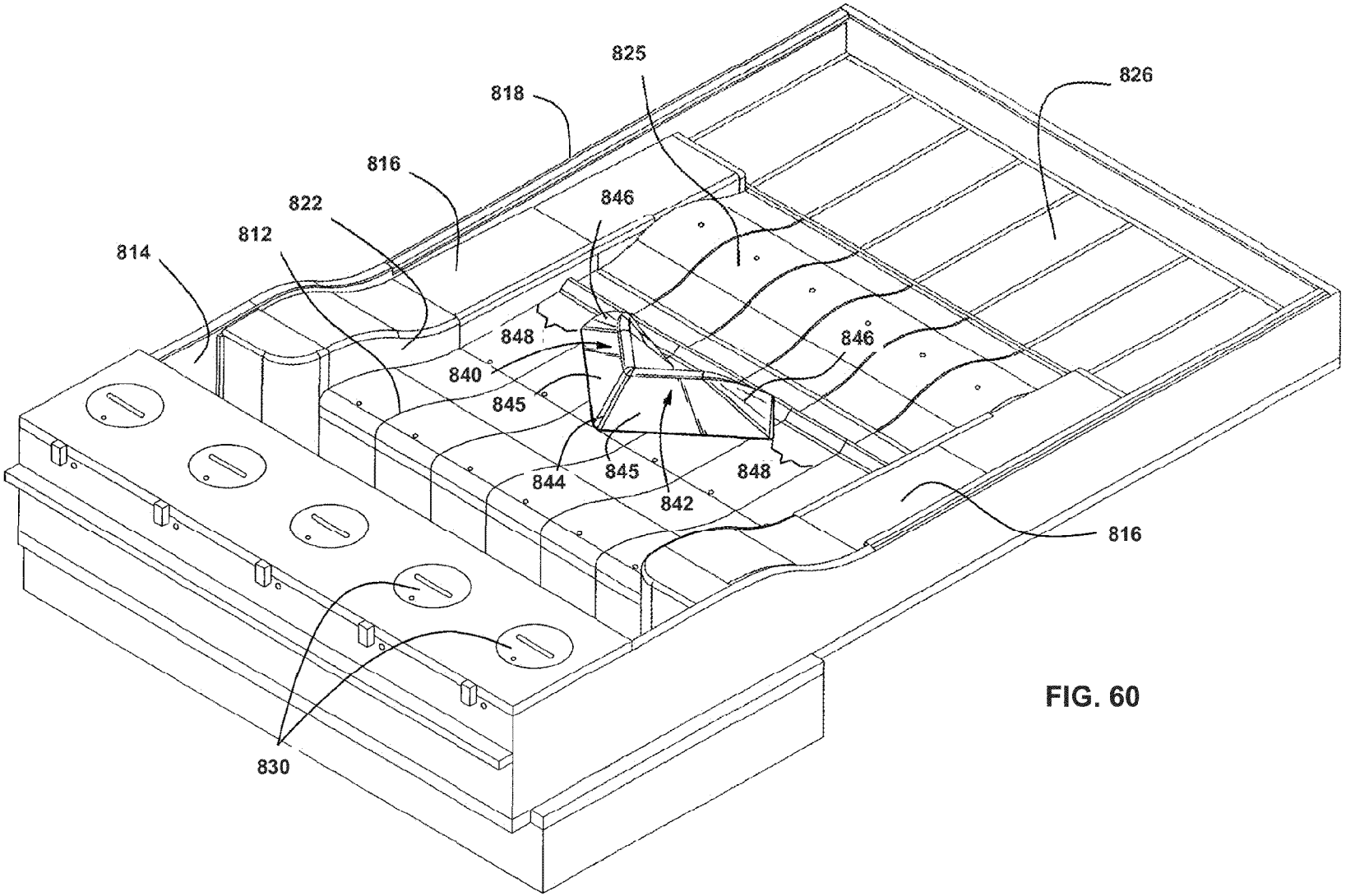
FIG. 60 is a perspective view of a wave forming apparatus of another embodiment having a double barreling wave forming foil for forming two barrel or tubing waves.

FIG. 60 illustrates a modified embodiment where the single oblique foil 820 of FIGS. 56 to 59 is replaced with two oblique foils 840,842 in a V-shaped arrangement, with the apex 844 of the V facing upstream and located approximately at the center of the channel. The apparatus in this embodiment is otherwise the same as the previous embodiment, and like reference numbers have been used for like parts as appropriate. In this embodiment, two barreling waves are formed on opposite sides of the channel, as described in more detail below.

Oblique foils 840,842 may be formed integrally as indicated in FIG. 60, or may be formed separately and then suitably attached together at their apex. As in the previous embodiment, each foil has an oblique, generally flat, inclined leading face 845 and a rearwardly curved venturi face 846 defining a venturi pass 848 between the leading edge of face 846 and the opposing side wall 822 of the channel. The shape and dimensions of each foil is substantially the same as that of the foil 820 of FIGS. 56 to 59, except that the second foil 842 is a mirror image of the first. In this apparatus, two standing barreling waves are formed, one in each venturi pass, allowing two riders to ride the waves simultaneously.

Figure 61:
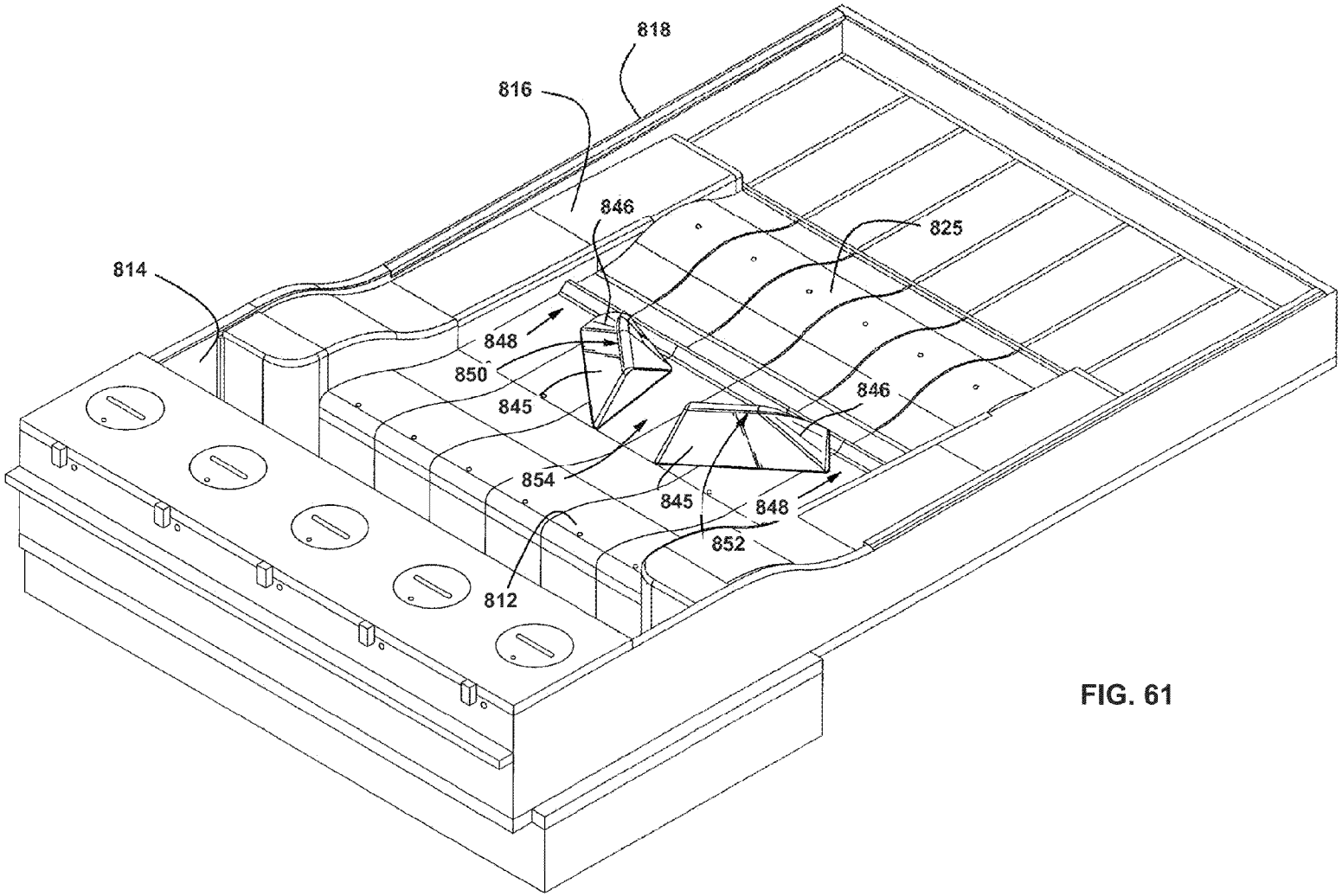
FIG. 61 is a perspective view similar to FIG. 60 illustrating another embodiment in which two separate barreling wave forming foils are mounted in the channel.

FIG. 61 illustrates another embodiment which is similar to that of FIG. 60 in that two barreling wave forming foils 850, 852 are used, but the foils in this case are separate, with a pass 854 formed along the center of the channel 810 between the foils. This apparatus is otherwise identical to that of the previous embodiments, and like reference numbers have been used for like parts as appropriate. As in FIG. 60, each foil 850, 852 has a generally flat, inclined leading face 845 and a rearwardly curved venturi face 846 leading from the trailing end of the leading face and defining a venturi pass 848 between the leading edge of face 846 and the opposing channel side wall 822.

In each of the above embodiments, the barreling wave forming foils can be formed integrally in the floor of the channel or may be separate modules having bases adapted for mounting in the channel as desired. They may be built flush in the floor of the channel and raised into position by actuators when a barreling wave action is desired. Alternatively, they may be inflatable devices that can be inflated or deflated as desired by a ride operator.

In the embodiment of FIG. 61, as in the previous embodiment, two separate standing barreling waves are formed, one at each venturi pass 848. The pass 854 between the foils in FIG. 61 improves stream conditions downstream and behind the foils 850, 852 and also helps to separate riders if necessary.

Figure 62:
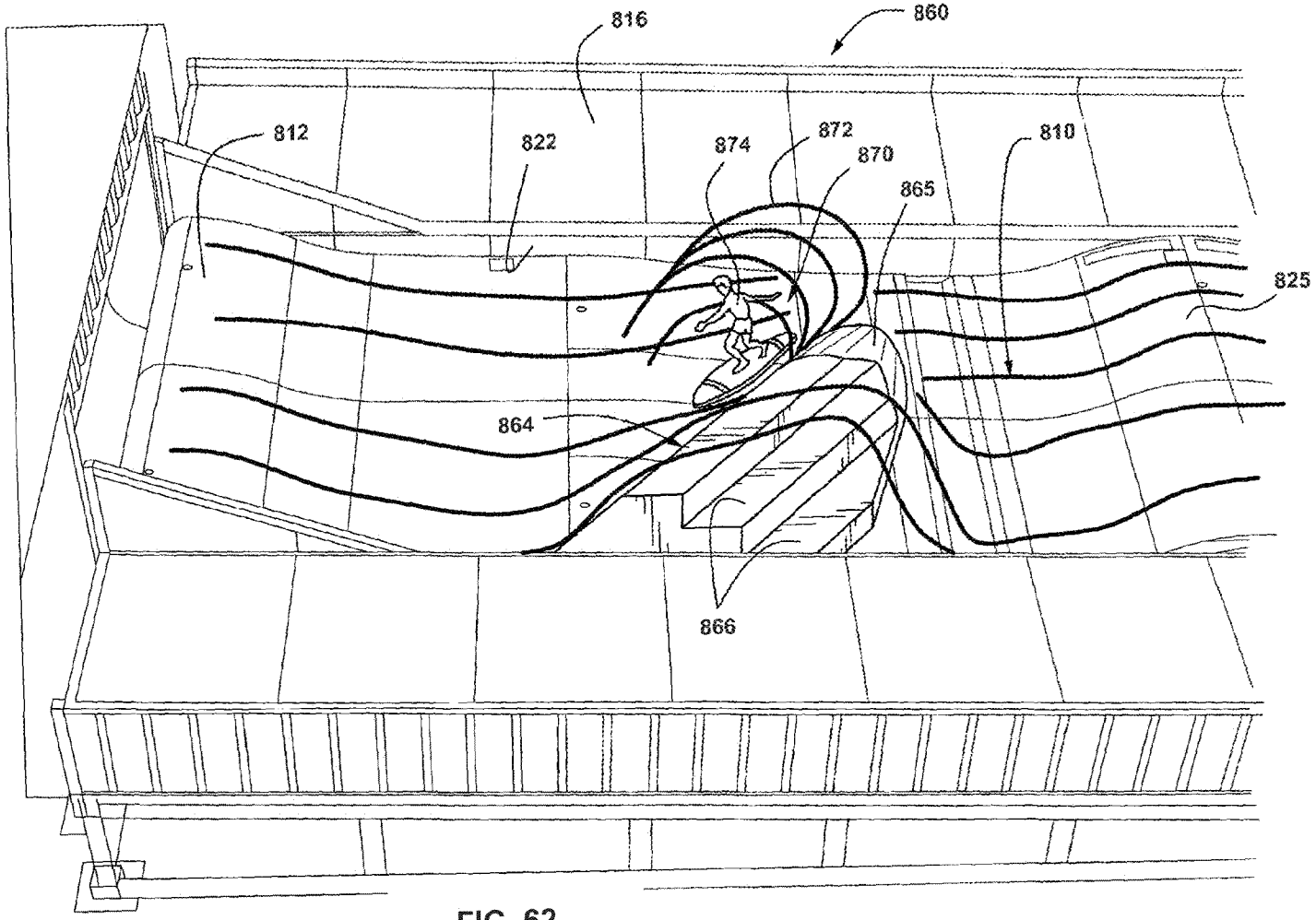
FIG. 62 is a perspective view of a wave forming apparatus similar to FIG. 56 but with a modified barreling wave forming foil, schematically illustrating the formation of a barreling wave and a rider riding in the wave.
Figure 63:
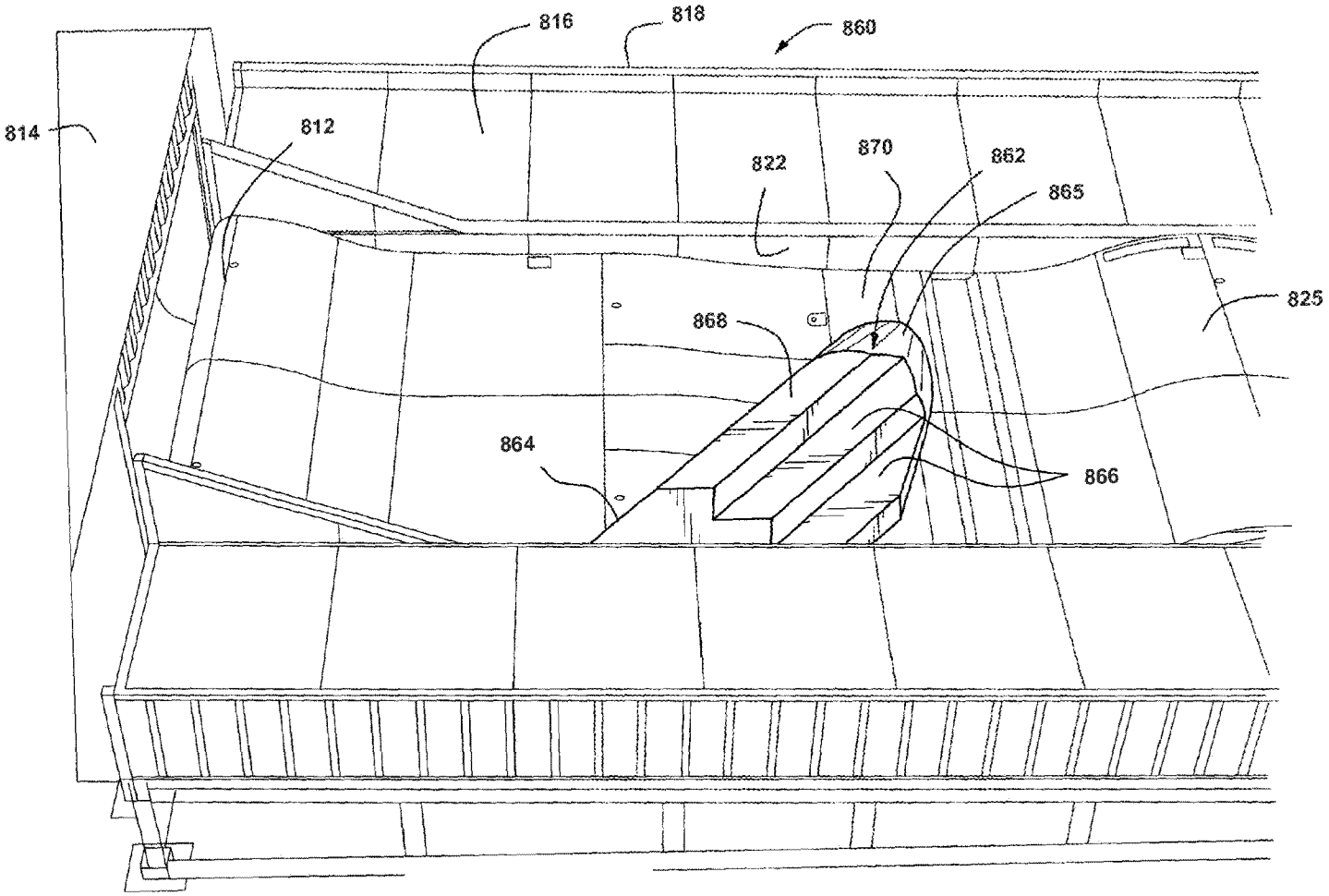
FIG. 63 is a perspective view similar to FIG. 62 but without any water or waves shown in the channel.

FIGS. 62 and 63 illustrate a wave forming apparatus 860 of another embodiment which has an oblique or barreling wave generating foil 862 which extends across a larger portion of the channel 810 than in the previous embodiments. In this embodiment, a single barreling wave generating foil and venturi gap span the entire width of the channel, rather than only around half of the channel as in the previous embodiments, and the shape of the rear wall of the channel is modified. The remainder of the apparatus in FIGS. 62 and 63 is the same as in the previous embodiments, and like reference numerals have been used for like parts as appropriate. This embodiment is more appropriate for a dedicated barreling wave machine, whereas the previous embodiments are appropriate for a channel in which a barreling wave is one of several water attractions or rideable waves.

As in the previous embodiments, foil 862 is mounted in the floor 824 of the channel downstream of alpha foil or weir 812. Foil 862 extends from one side wall 822 across the channel at an oblique angle to the water flow direction. Foil 862 has a generally flat, inclined leading face 864 and venturi face 865 extending from the leading face, as in the previous embodiments. However, the trailing or rear face of the foil is modified. The trailing face is formed with a series of steps 866 leading up to the peak 868 of foil 862. These steps can be used as a possible entry point for the ride.

The shapes and angles of the leading and venturi faces 864, 865 in this embodiment are the same as in the previous embodiments, with the leading face 864 inclined both to the flow direction and the floor of the channel. The venturi face is convex and the leading edge or portion forms a venturi pass 870 with the adjacent, opposing side wall 822 of the channel. Venturi face 865 then curves back away from the side wall, as in the previous embodiments.

FIG. 62 schematically illustrates the water flow through channel 810, as indicated by the darker lines. As can be seen, water flowing on the right hand side of the channel as viewed from alpha foil 812 flows up and over the leading face 864 of the foil. Water moving towards the venturi face 865 of foil 862 in the left hand part of the channel combines with deflected water from leading face 864 to create a standing barreling wave 872 in front of the venturi face extending laterally into the venturi pass 870. FIG. 62 illustrates surfer 874 riding in the wave. The opposing channel wall 822 contains some of the water and allows some to spill onto the river bank 816 and run downstream to the grating or drain. Water will also spill off the leading face of the foil onto the other river bank 816. Alternatively, the channel wall on this side could be raised to prevent spilling, or the foil could be extended widthwise over the inner channel side wall and onto the river bank to prevent water spilling on this side.

The apparatus illustrated in each of the above embodiments may be scaled up or down depending on the type of water attraction desired. At a smaller scale it is suitable for inner tubing rather than surfing, and at an even smaller scale it may be used for a visual, fountain-like water feature rather than a ride. Larger scales of the apparatus may be used for surfing sports parks and events.

The outer side walls in any of the above embodiments could be eliminated so that water could flow off opposite sides of the apparatus, for example into an adjacent pool or river. In this case, the adjacent pool or river may be at or close to the same elevation as the river bank.

The standing barrel wave created by the above embodiments is like a river wave created at a narrows. The venturi gap simulates a narrows, with the shape of the leading face and venturi face of the barrel wave forming foil enhancing the formation of the standing wave. The tilting away of the leading end of the venturi face from the channel wall provides a bottom contour at which water piles up on top of the foil in a controlled way. The venturi pass dimensions together with the design of the venturi face impedes water flow and supports the barrel through the pass. The deflection of some of the water flow by the oblique angle and shape of the leading face of the foil creates streamlines with a lateral velocity component towards the venturi gap which collide with streamlines flowing substantially downstream into the venturi pass zone, creating a wave shaped face and a barreling section in the venturi pass. Adjustment of the angle of the leading face causes the barreling wave to move across the face and this can take place while a rider is riding in the barrel. At the same time, excess water is allowed to spill out onto the adjacent river bank and run downstream.

The combination of the oblique foil shape and opposing channel side wall together form a standing barrel wave which is like a river wave formed at a narrows. The part of the water stream which flows into the leading face of the oblique foil tends to rise up the tilted face and bend laterally towards the venturi pass. The part of the water stream which moves towards and up the venturi face and into the venturi pass combines with the deflected water from the leading face of the oblique foil, the two streams of water together forming a barreling wave in front of the venturi face and extending laterally into the venturi pass. After pitching out and forming the barrel, the water lands primarily in the venturi pass area on top of the primary stream of water through the pass.

By locating the barreling wave generating foil upstream of a spoiler and bed form designed to create a standing wave, two or more different waves may be created in the channel under some flow conditions, or the barreling wave forming foil or foils may be retracted into the floor when only a standing wave is desired. Where there are two separate barreling wave forming foils, only one may be deployed so that a barreling wave is formed in one half of the channel with a standing wave downstream extending across at least the other half of the channel. Alternatively, both foils may be deployed simultaneously or alternately, and may be at different angles to create different barreling wave effects. This allows for a number of different wave variations to increase participants' interest in the ride.

Figure 64:
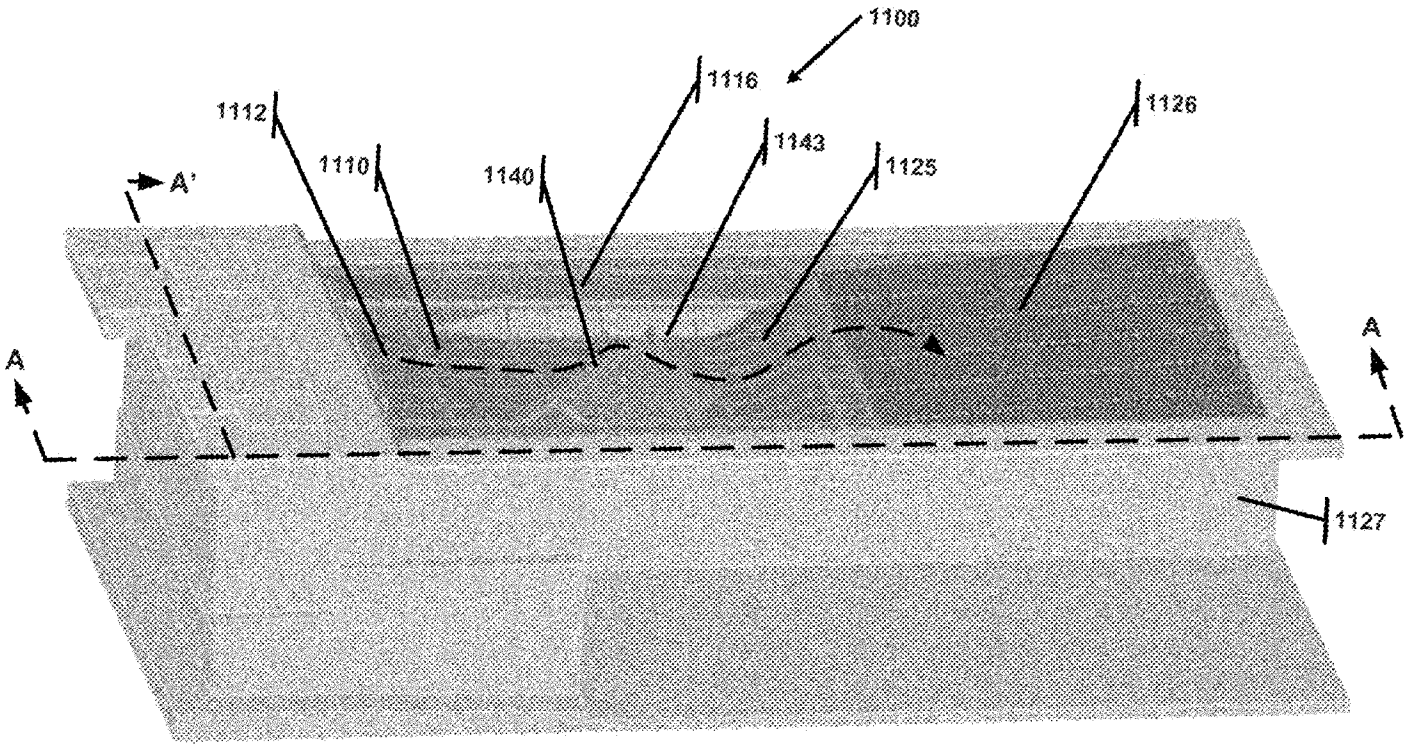
FIG. 64 is a perspective view of a wave forming apparatus of an example embodiment having a single oblique foil.
Figure 65:
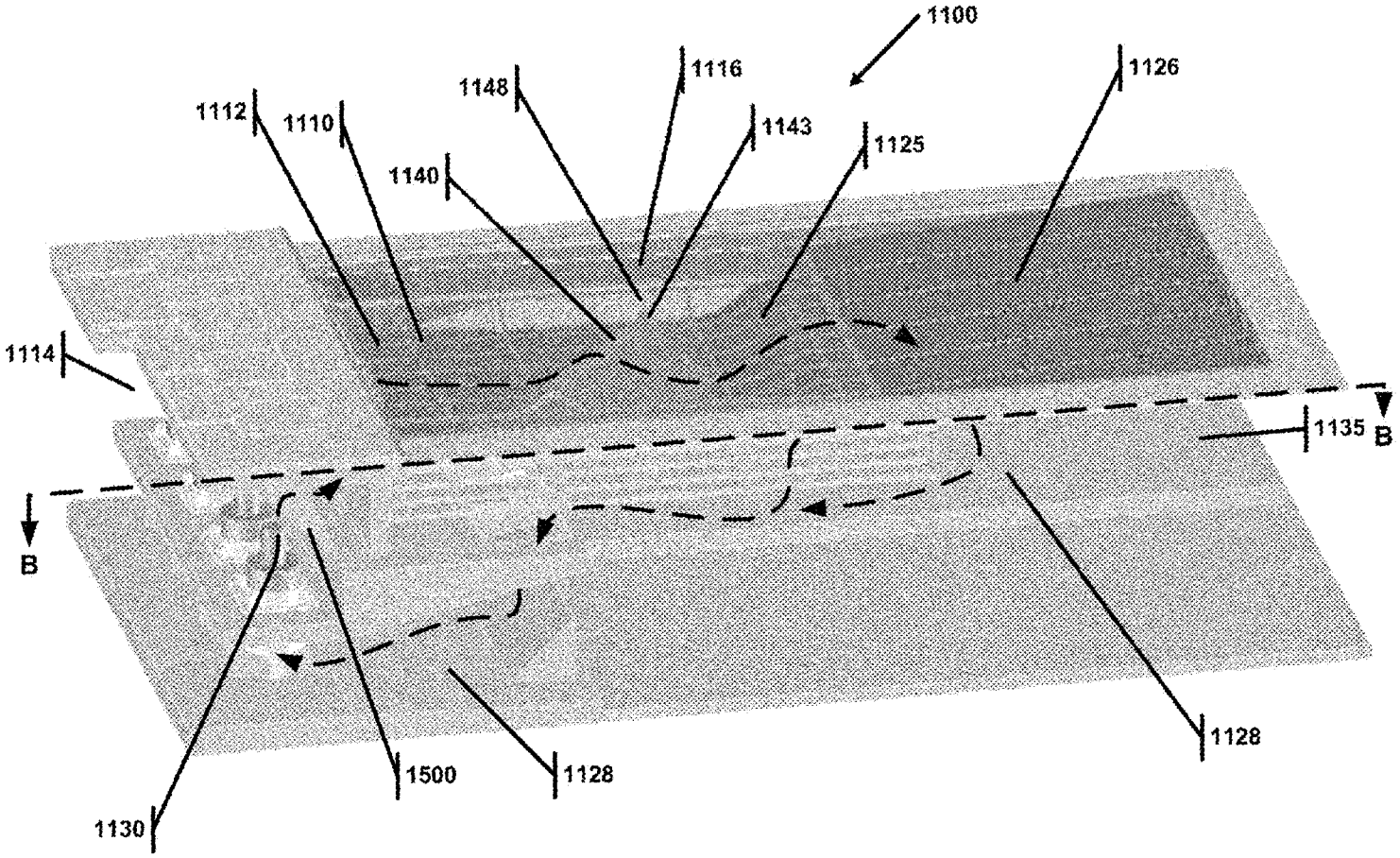
FIG. 65 is a cross-sectional perspective view along the line A'-A of FIG. 64, showing pumps and flow of water in that embodiment.

Now modular bedforms/foils/weirs and water smotheners for use in wave forming apparatus will be discussed. FIGS. 64,65, 66, 67, 70, 71, 72A and 74 illustrate a first example embodiment of an improved wave forming apparatus 1100 designed to form barreling waves. An apparatus 1100 may comprise an outer housing 1127 having a water supply or reservoir 1114 at one end and channels 1128 extending from the reservoir 1114 to the opposite or exit end of the ride for containing a flow of water. As best illustrated in FIG. 65, channel(s) 1128 may have at least one base or lower wall 1135. Water is re-circulated from the exit end of the ride along channels 1128 back to the reservoir 1114, under the action of one or more pumps 1130. Except as otherwise provided herein, an example wave forming apparatus 1100 may be similar to the apparatus described with respect to FIGS. 39-41 in application Ser. No. 11/958,785 filed Dec. 18, 2007, the contents of which is incorporated herein by reference.

Figure 72A:
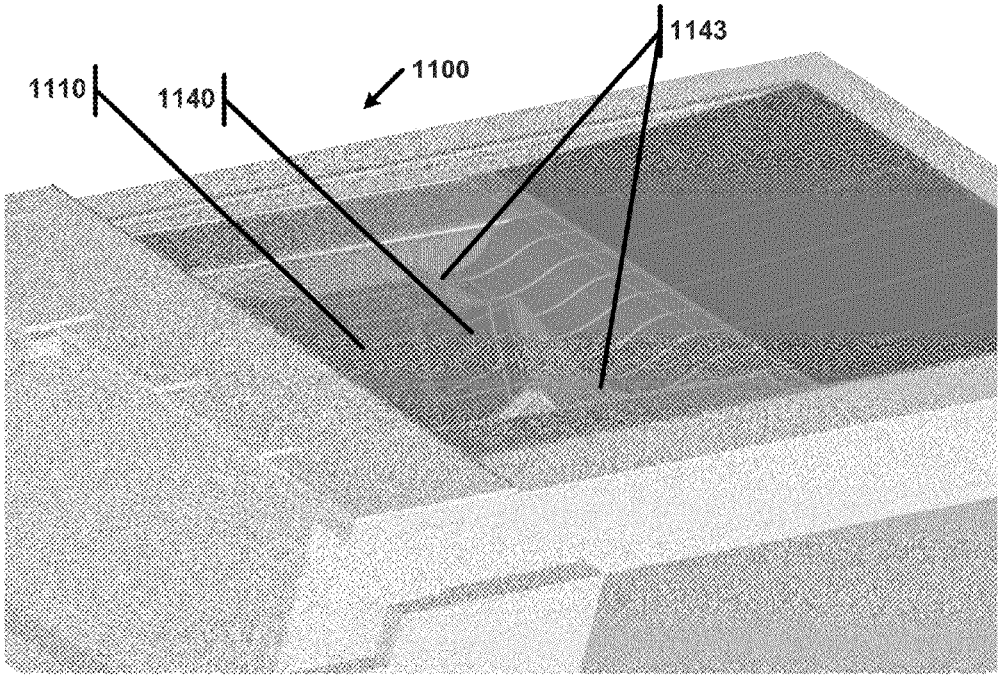
FIG. 72A is a perspective view, partly cut away, of the top of a wave forming apparatus with an example modular foil positioned in a first position and orientation partially overlapping an example modular spoiler ridge.
Figure 74:
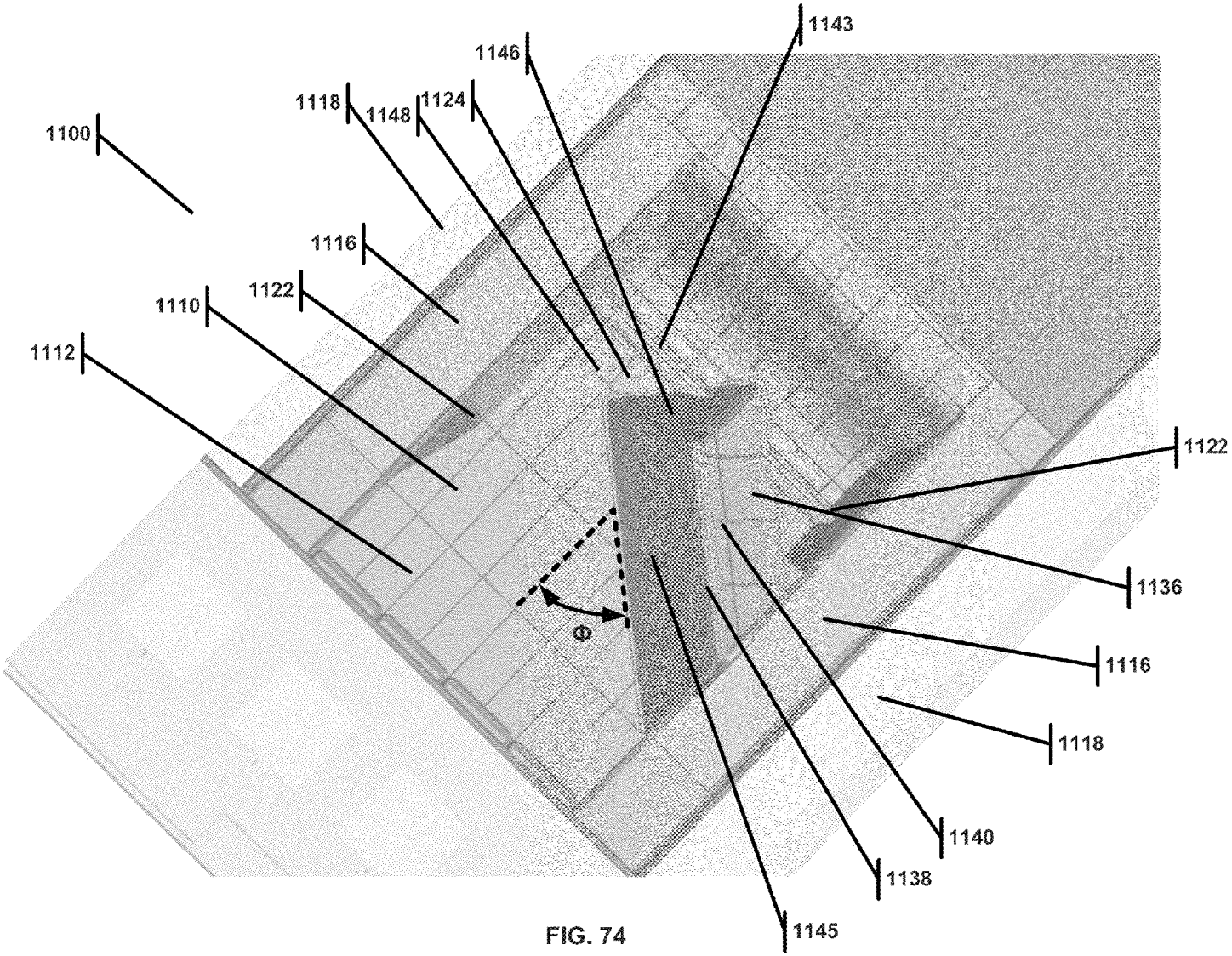
FIG. 74 is a top view, partly cut away, of a wave forming apparatus with an example modular foil positioned in a first position and orientation partially overlapping an example modular spoiler ridge.

Optional river banks or entry/exit portions 1116 may extend outwardly from opposite side walls 1122 of the wave forming channel 1110 to the outer sides 1118 of the apparatus, which may be spaced outwardly from the outer sides of channel 1110, as illustrated for example in FIG. 74. The outer side walls 1118 in any of the above embodiments could be eliminated so that water could flow off opposite sides of the apparatus, for example into an adjacent pool or river. In that case, the adjacent pool or river may be at or close to the same elevation as the river bank. Side river banks or beaches 16 may extend outwardly from opposite sides of the channel 1110 to provide for ride entry and exit. These may be completely horizontal in the transverse direction, or have a slight downward slope, rather than being inclined upwardly, as illustrated in FIGS. 17 and 41, respectively, of my U.S. patent application Ser. No. 11/958,785 filed Dec. 18, 2007, which is incorporated herein by reference. Regardless of the transverse angle of the side beaches 1116, each beach may have a slight downward slope in the longitudinal direction from the inlet end or reservoir end to the exit end, as illustrated in FIGS. 64, 65 and 72A. The slope may be sufficient to allow water to drain, so that wave control is maintained. The slope of the side beaches 1116 may be around 2.5%, but a slope of 1% is sufficient in most cases. The side beaches 1116 may also include drains for providing a secondary flow path for the water to drain into channels 1128, as indicated in FIG. 65. Not only do river banks 1116 allow drainage around the foil 1140 while containing water within outer containment walls 1118, they also facilitate entry and exit of the ride. A drainage-capable river bank 16 may only be needed on the side of apparatus 1100 adjacent the venturi 1148, where the large barrel wave tends to form. However, example apparatus 1100 is adapted to locate the oblique foil 1140, and thus the venture 1148, on either side of the channel 1110. Accordingly, example apparatus 1100 includes drainage-capable river banks 1116 on both sides of the channel 1110, as shown in FIG. 74. In one embodiment the channel 1110 is sixteen feet wide between the walls 1122, while the river banks 1116 are each an additional four feet wide. The channel 1110 may alternatively be made wider and deeper, but this might not be practical for entry and might require more water flow and expense to operate.

A weir bed form or first bed form 1112 may be formed at the exit from the reservoir 1114, and at least one additional bed form, such as one or more aerofoils or foils 1140, one or more spoilers 1143, and/or a secondary or beta foil 1125, may be spaced downstream from the weir bed form 1112, as shown in FIG. 74. The example bed forms 1112, 1140, 1143 and 1125 of this embodiment may be of hollow construction, and may have vents for providing additional flow paths for the water to drain into channels 1128. The bed forms may alternatively be of solid or any other appropriate construction. Weir bed form 1112 may have a peak at its leading end and then slope downwardly, for instance at a one or two percent decline, to an extended, generally flat or horizontal floor 1124, with an optional spoiler 1143 located at the trailing end of floor 1124. The secondary or beta foil 1125 may have an upwardly inclined upstream face extending into an extended flat tail drain section 1126. Extended flat tail drain section 1126 may comprise an upwardly inclined exit grating or beach that extends from the end of the channel 1110 toward the end of the housing 1127. Water draining through the grating 1126 may be returned to the channels 1128 and flow back to the reservoir 14.

In addition to the bed forms described above, one or more barreling wave forming foils 1140 may be mounted in the channel 1110 in, for instance, a generally oblique formation with a leading face 1145 facing upstream. As shown with respect to one embodiment depicted in FIGS. 64,65, 66, 67, 70, 71, 72A and 74, a foil 1140 may face opposite side walls 1122 of the channel 1110 at an oblique angle to the flow direction of water along the channel 1110.

As best illustrated in FIG. 74, the channel 1110 may have a base or lower wall 1124 and the weir or alpha foil 12 is formed in the base wall at the inlet end of the channel 1110 so as to direct water from reservoir 1114 into a flowing stream of relatively deep water along channel 1110, as described in my prior patents and application referenced above. One or more beta foils 1125 for forming a standing wave may be located downstream of alpha foil 1112 and oblique foil 1140, with a spoiler or small bump 1143 in the floor prior to secondary or beta foil 1125, but this is not essential and no additional foils may be provided downstream of oblique or barreling wave forming foils in other embodiments. A grating 1126 or the like is provided at the outlet end of the channel in this embodiment, and water is returned via a passageway 1128 extending under floor 1124 and pumped by pumps 1130 back into the reservoir 1114. In an alternative embodiment, water could be returned by running out of the channel into a river or pool.

Although a weir or alpha foil 1112 is used in the illustrated embodiments to direct a stream of water along channel 1110, in alternative embodiments the desired stream condition could be created with a tank and sluice gate or nozzle. The opposite side walls 1122 of the channel may be straight, as illustrated, or may taper outwardly from the inlet end to the outlet end of the channel, and define a primary flow path for water through the channel, as described in my prior patents and application referenced above.

While bed form shapes have been permanently formed into the profile of channels, according to the present invention bed forms may also comprise separate modular components that can be removably secured in the channel in various locations and positions as desired. For instance, the weir bed forms may be separately constructed modular components adapted to be attached to, removed from, repositioned in and reoriented in channel. While any appropriate fastening or restraint means may be used, in one embodiment an array of fastener couplings may be provided under removable covers recessed in the floor and/or side walls of channel corresponding to potentially desirable locations and positions of one or more of the bed forms. The bed forms can then be removably attached to the floor and/or side walls with corresponding removable fasteners, such as threaded fasteners. Alternatively, modular bed forms can be removably attached to actuators or other mechanisms adapted to adjust the position or shape of the bed forms during or between uses of the apparatus as discussed in my prior applications incorporated herein.

Figure 72B:
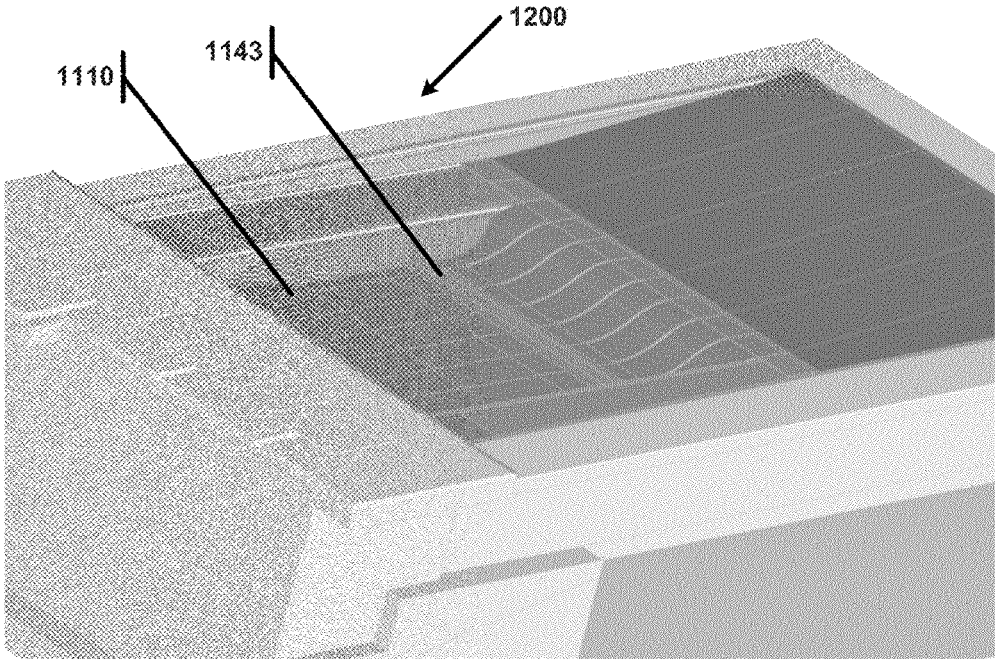
FIG. 72B is a perspective view, partly cut away, of the top of the wave forming apparatus of FIG. 72A with the example modular foil removed.
Figure 72C:
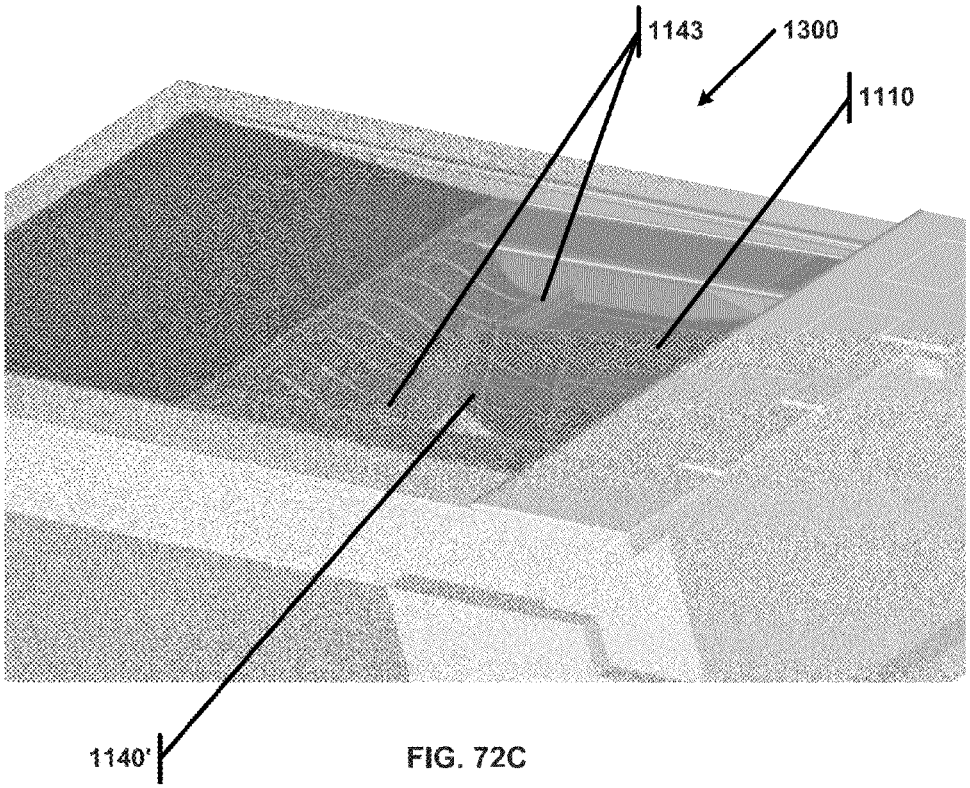
FIG. 72C is a perspective view, partly cut away, of the top of the wave forming apparatus of FIG. 72A with the example modular foil positioned in a second position and orientation.

By way of example, FIGS. 72A, 72B and 72C depict three different applications utilizing a modular bed form. In FIG. 72A apparatus 1100 is shown with modular foil s140 and 1143 attached to the floor of the channel at a first oblique angle and abutting left-side wall. FIG. 72B depicts apparatus 1200, which is apparatus 1100 with modular foil 1140 optionally removed from channel. FIG. 72C shows apparatus 1300, which is apparatus 1100 with modular foil 1140' attached to the floor of the channel at a second oblique angle and abutting right-side wall. It is understood that modularity of bed forms permits not only addition, removal, replacement and repositioning of bed forms as shown in FIGS. 72A-72C, but also stacking and/or intermixing of bed forms to create, for instance, longer or shorter foils, weirs and spoilers, as well as differently-sized and shaped foils, weirs and spoilers, among other options that would become apparent to one of skill in the art. Modular bed forms may be rigid devices or may be hollow, inflatable devices that can be inflated or deflated as desired by a ride operator.

Figure 73:
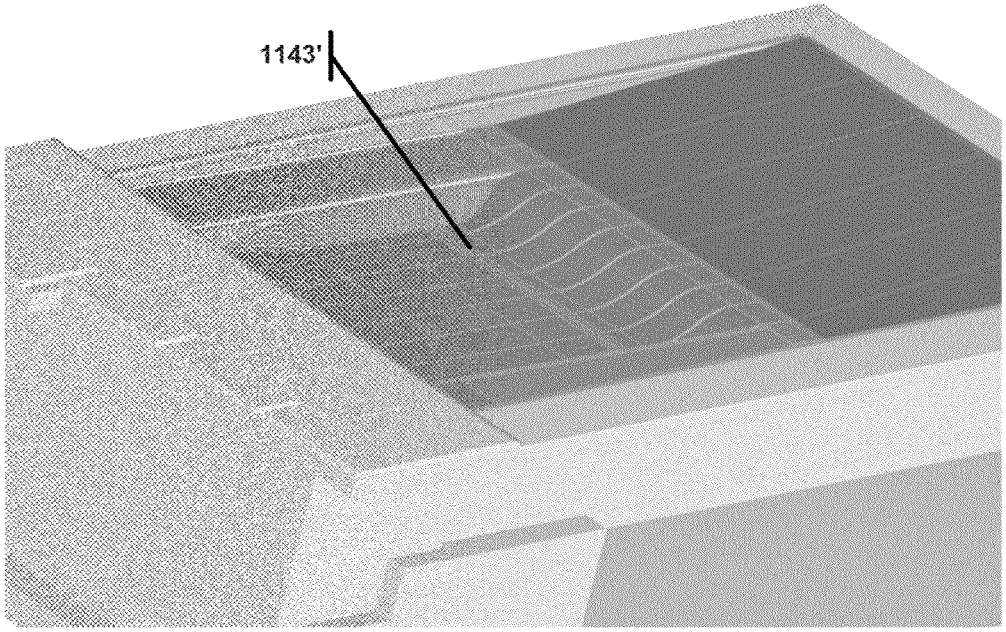
FIG. 73 is a perspective view, partly cut away, of the top of the wave forming apparatus of FIG. 72A with the example modular foil removed and the example modular spoiler ridge removed.

In addition to the modular foils 1140, 1140', any other bed forms may also be modular. For example, FIG. 73 depicts apparatus 1200 further modified by optionally removing foil 1143 from location 1143'. Foil 1143 may optionally be replaced at location 1143' or a different modular feature may be placed at location 1143', or foil 1143 may be moved or reoriented at some other location in the channel.

In the example apparatus 1100 shown in FIG. 74, obliquely-oriented modular foil 1140 has a base which is removably and adjustably mounted in the base 1124 of the channel, as well as a generally flat or slightly convex inclined leading face 1145, a venturi face 1146 extending from the leading face 1145 and forming a venturi pass 1148 with the adjacent side wall 1122 of the channel, and a rear face 1136. In the illustrated embodiment, each leading face 1145 is oriented at a sweep angle $\Phi$ of around 40 degrees to the direction of oncoming water flow in the channel, as best seen in FIG. 74. Leading face 1145 is also inclined at a vertical tilt or pitch angle $\alpha$, relative to the floor 1124 of the channel, as seen in FIGS. 3A and 3B application Ser. No. 12/356,666 filed Jan. 21, 2009, the entire contents of which are incorporated herein by reference. The arrangement and shape of the barreling wave forming modular foil 1140 may be similar to the foils described in my prior patents and application referenced above.

The upper edge 1138 of each foil 1140 may be convex or curved to reduce the risk of injury. The foil height in the illustrated embodiment may be about equal to the height of the outer side walls 1118 and greater than the height of channel side walls 1122. This height difference helps ensure that at least part of a wave forming in the venturi pass 1148 is above the height of the channel walls 1122, so that water can drain away from the venturi area 1148 and along the river banks 1116 to avoid choking or backing up the flow. In one embodiment, the height of the channel wall 1122 is around eleven inches below the peak 1138 of the modular foil 1140, and the channel wall height is around 30 inches. These dimensions are suitable for a 2.5 foot wave, but may be scaled up or down in alternative embodiments, depending on the overall size of the wave forming apparatus. The trailing or rear face 1136 is also generally flat and inclined downwardly.

The venturi face 1146 may start off facing the opposing channel side wall 1122 and have a convex curvature leading from the trailing end of the relatively flat leading face 1145, then curve rearwardly back towards trailing or rear face 1136 and downwardly towards the base of the channel, as shown in the example in FIG. 74. Venturi face 1146 may have a curved apex that is rounded for safety to avoid a sharp corner, and also to help reduce turbulence in the water flowing around the apex. The optional venturi pass 1148 is defined between the leading, convex end of venturi facell 46 and the opposing channel side wall, as indicated in FIG. 74. The leading end of face 1146 may be inclined away from the channel side wall in a direction upwardly from the floor at a "yaw" angle so that the venturi pass increases in width in a direction upwardly from the base of the channel, as shown in FIG. 74. In the illustrated embodiment, the yaw angle is around 30 degrees, but this angle may range from 90 degrees to 20 degrees in alternative embodiments, dependent on the desired width of the venturi pass, which can be adjusted by moving or repositioning modular foil 1140 or adding or subtracting modules of which modular foil 40 is comprised.

As noted above, the peak or top 1138 of the modular foil 1140 may be convex, such that the peak and inclined downstream or rear face 1136 of the foil allow water to stream freely over the foil in this area. The foil peak 1138 and downstream foil trailing surface 1136 together may allow a relatively smooth and safe transition for riders down into the downstream portion of the channel 1110. Although the leading face of the modular foil 1140 may have an abrupt or angled intersection with the floor 1124 of the channel 1110, as seen in FIG. 74, the geometry may alternatively be smoothly blended into the floor for a smooth, curved transition from floor to foil.

FIG. 8 of application Ser. No. 12/356,666 filed Jan. 21, 2009 and incorporated herein, schematically illustrates the water flow through a similar channel 10, as indicated by the darker lines, and a surfer 74 riding in the wave. With reference to that figure, water flowing on the right hand side of the channel as viewed from alpha foil 12 flows up and over the leading face 64 of the foil. Water moving towards the venturi face 65 of foil 62 in the left hand part of the channel combines with deflected water from leading face 64 to create a standing barreling wave 72 in front of the venturi face extending laterally into the venturi pass 70. To provide a favorable surfing or wave riding experience for the user and to maintain a well-formed barrel or tube-shaped wave, it is desirable for the water flow through the channel 10 up to the breaking of the wave to be smooth and laminar—"glassy" if possible, not turbulent. However, by their very nature pumps 30 create pressure variations and pulsations in the reservoir 14, which result in turbulent eddy currents in the water that, if not remedied, will flow from reservoir 14 into the channel 10 creating choppy, turbulent water and a resultant poor surfing/wave-riding experience. The occurrence of turbulent eddy currents 1199 is depicted in present FIGS. 66, 68 and 70.

Figure 66:
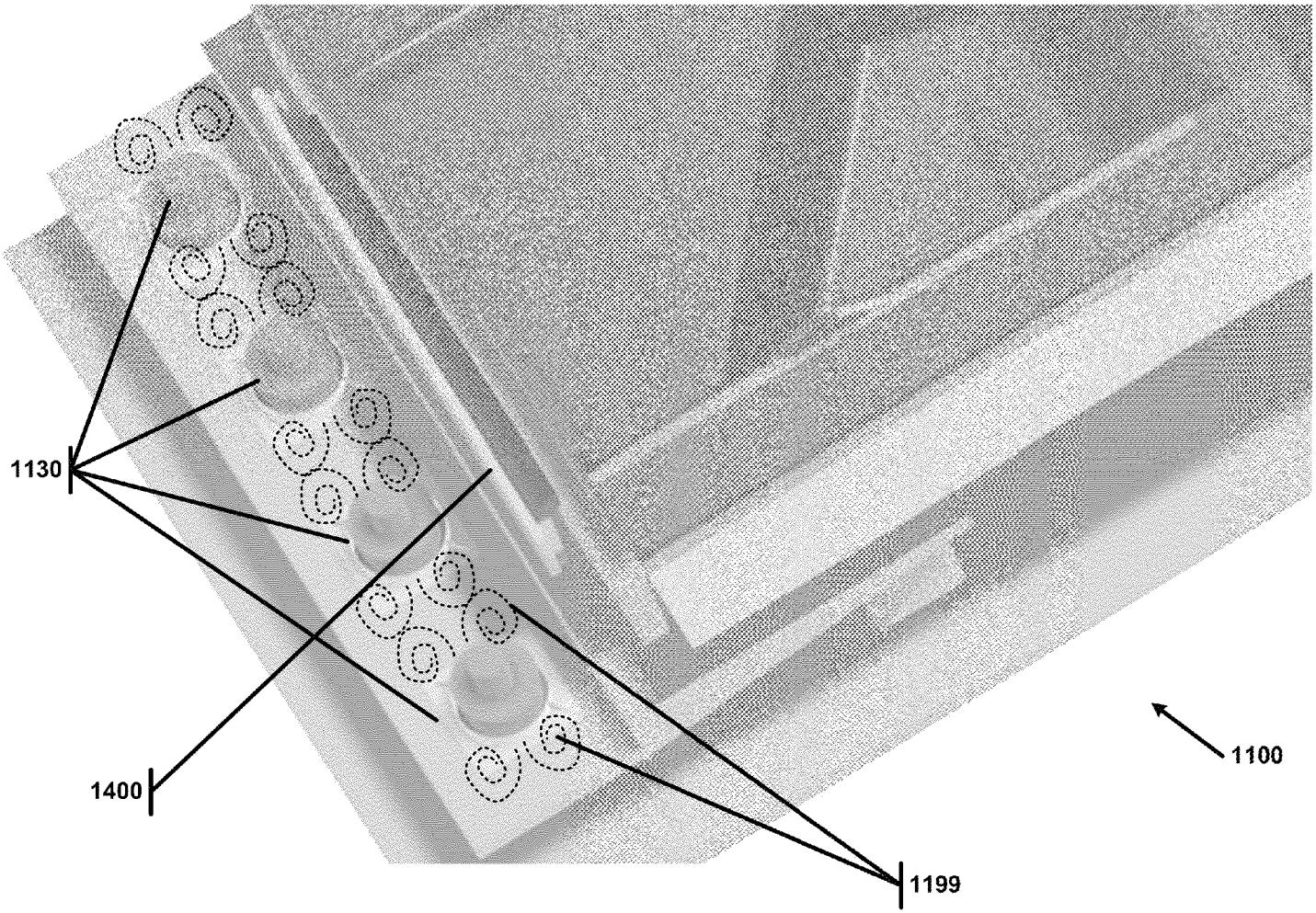
FIG. 66 is a top plan cross-sectional view along the line B-B of FIG. 64, partly cut away, showing pumps and certain areas of turbulent water flow in that embodiment.
Figure 68:
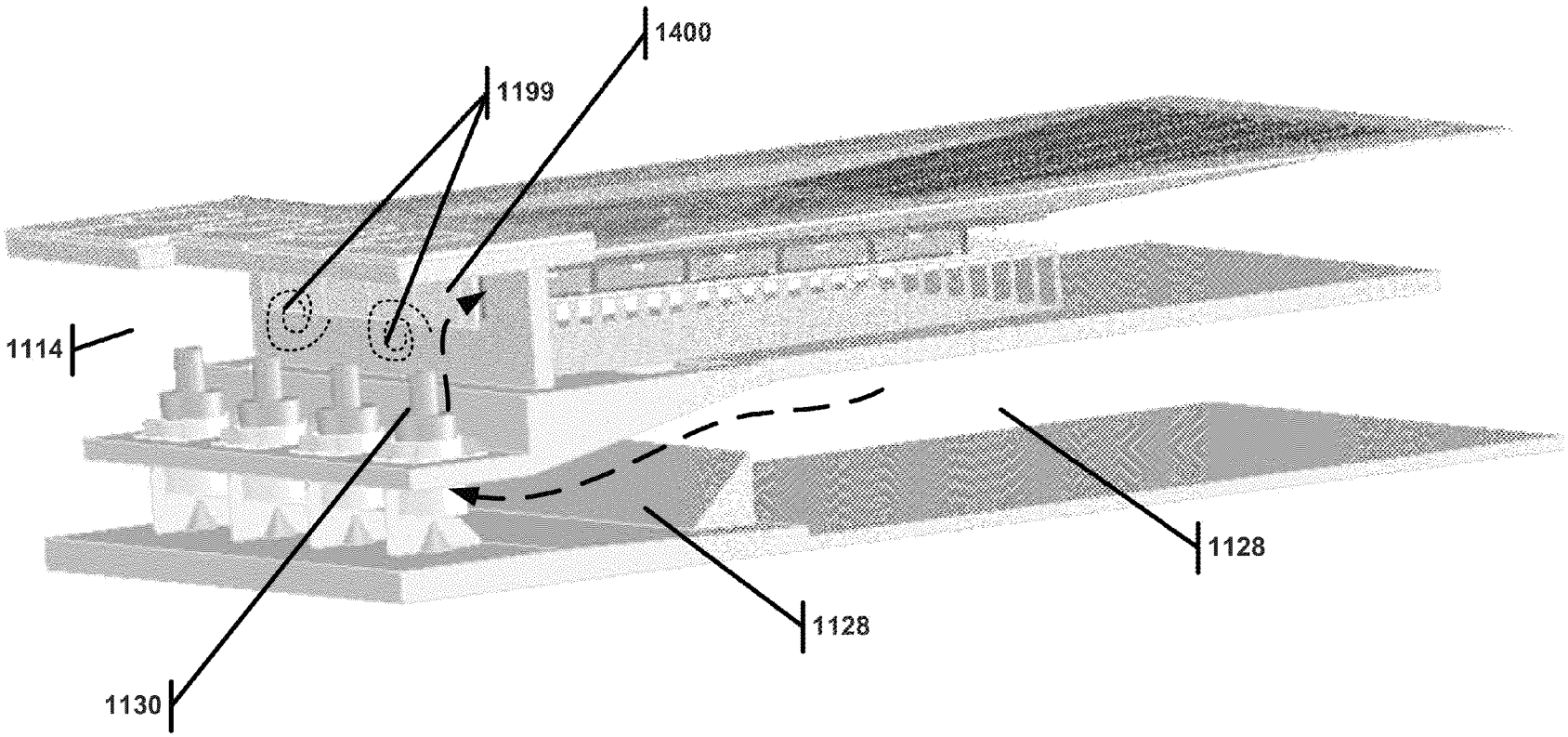
FIG. 68 is a perspective view of the wave forming apparatus of FIG. 64 as cross-sectioned in FIG. 2, showing an example embodiment with only horizontal water smootheners.
Figure 69A:
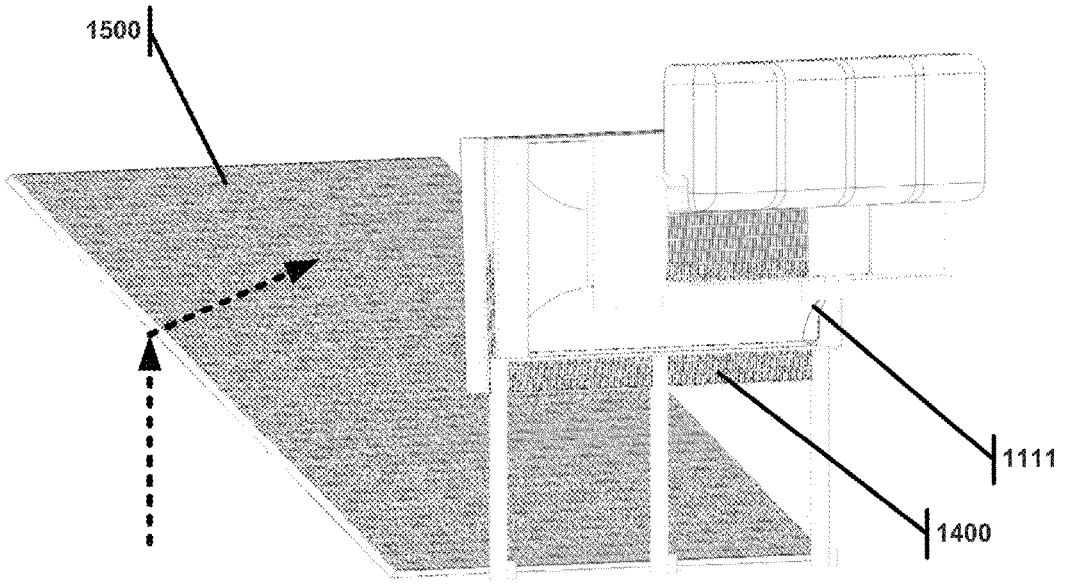
FIG. 69A is a perspective view of two arrays of water smootheners positioned at an example 45 degree angle relative to each other, as used in the embodiment shown in FIG. 67.
Figure 69B:
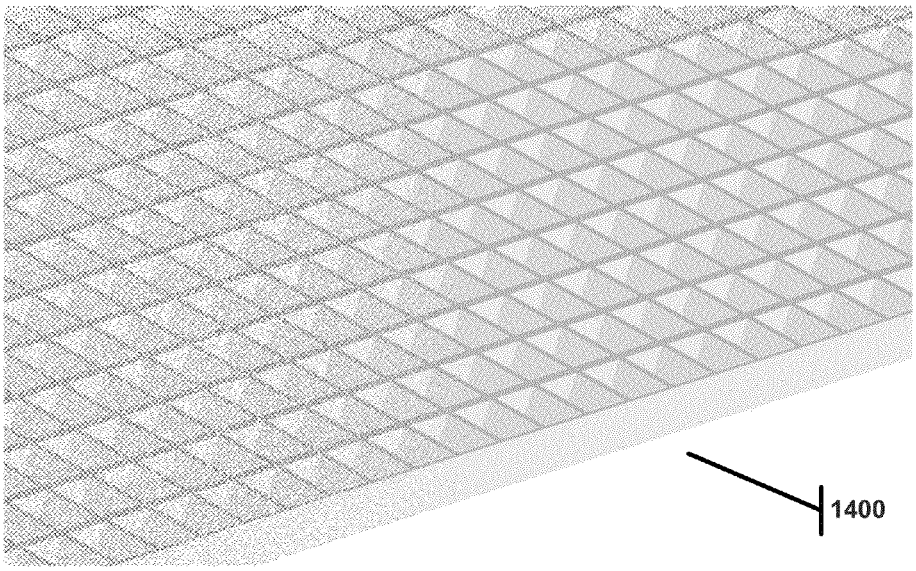
FIG. 69B is a perspective view of an example array of water smootheners, partly cut away.
Figure 71:
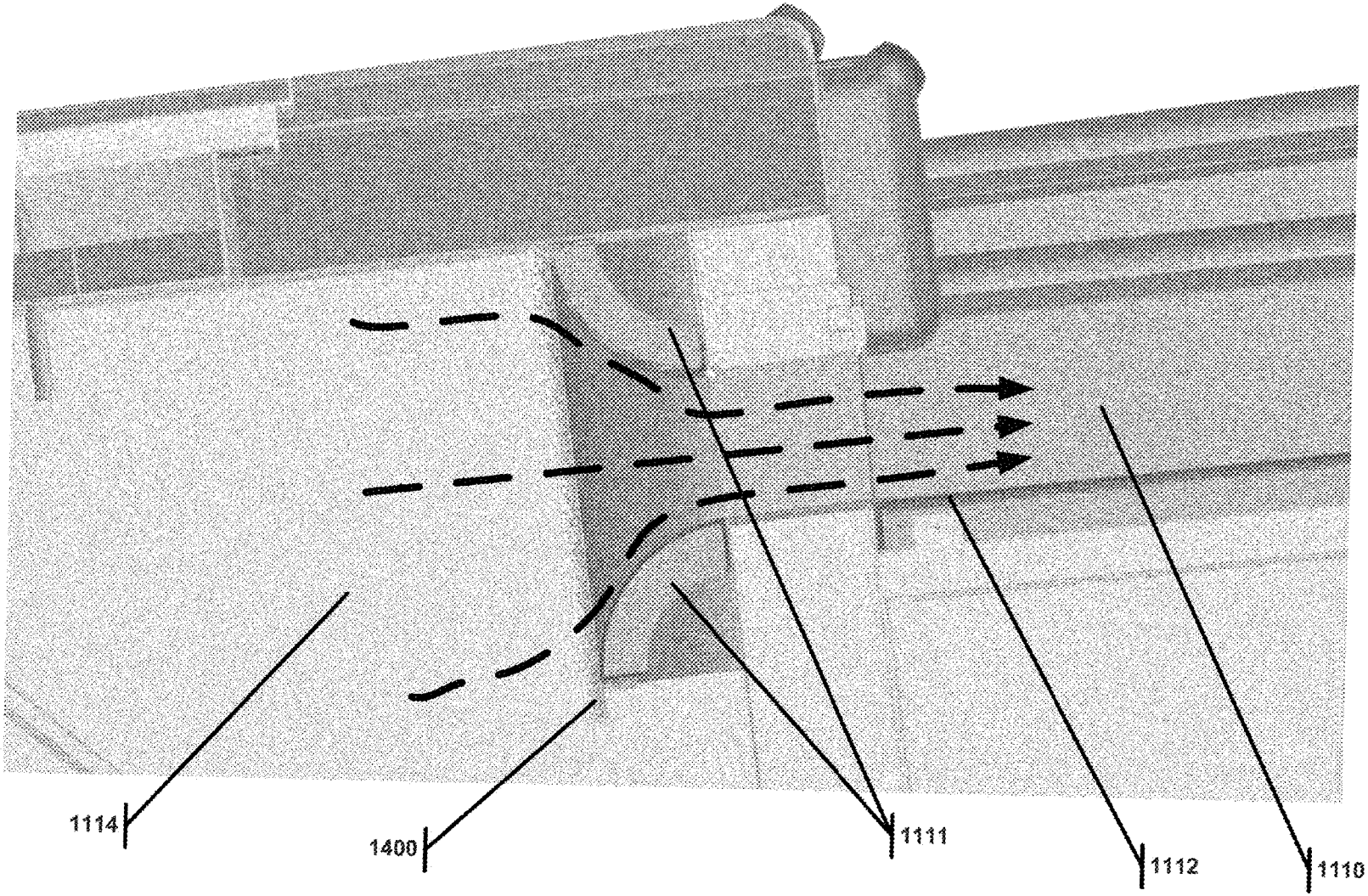
FIG. 71 is a cross-sectional side view along the line A-A of FIG. 64, partly cut away, showing water flow through a horizontal array of water smootheners.

To partially address this turbulence issue, an apparatus 1100 may include one or more smooth radius throat sections 1111 guiding water over optional weir 1112 and into the channel 1110, which tends to have somewhat of a water smoothening effect, as best illustrated in FIG. 71. However, significant eddy currents and resulting turbulence can still pass from reservoir 1114 through the relatively large opening of throat sections 1111 into the channel 1110. To further smoothen the water flow into the channel 1110, a first water smoothener 1400 may be provided covering the entry of throat sections 1111 such that the water flowing from reservoir 1114 into throat sections 1111 must first pass through smoothener 1400, as shown in FIGS. 66, 68 and 71. Water smoothener 1400 may comprise any array, matrix, or other assemblage of a plurality of apertures dimensioned to cause water flowing through the apertures to become more laminar. An example smoothener with square apertures is shown in part in FIG. 69B; however, smootheners with round or other shaped apertures can also be used. In one embodiment the square root of the cross sectional area of each aperture is equal to half the distance of the length of each tube or cell (i.e., the depth or thickness of each aperture). Where the apertures are squares, the depth of each tube or cell may be twice the length of one side of the square. In one embodiment the apertures are 2" per side and the depth of the aperture is approximately 4".

Figure 67:
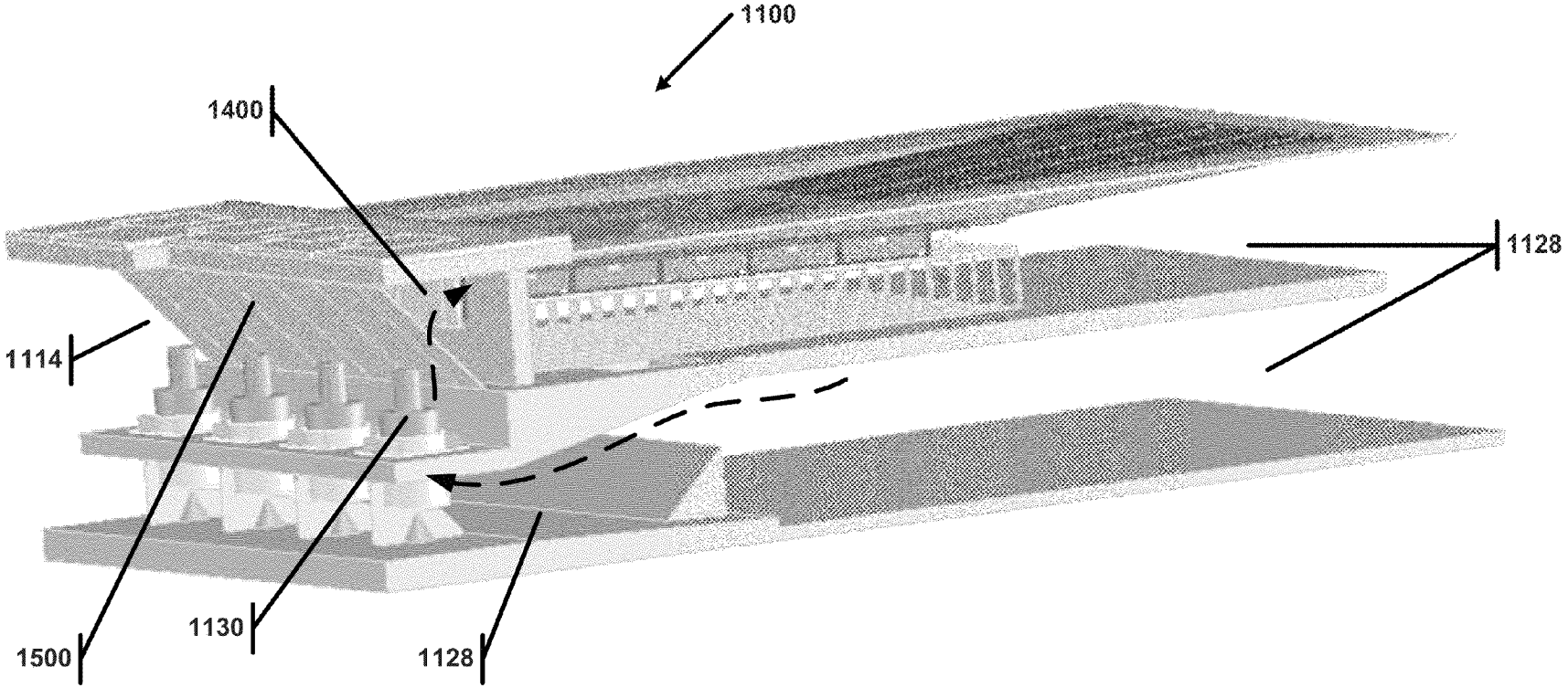
FIG. 67 is a perspective view of the wave forming apparatus of FIG. 64 as cross-sectioned in FIG. 2, showing an example embodiment with horizontal and angled water smootheners.
Figure 70:
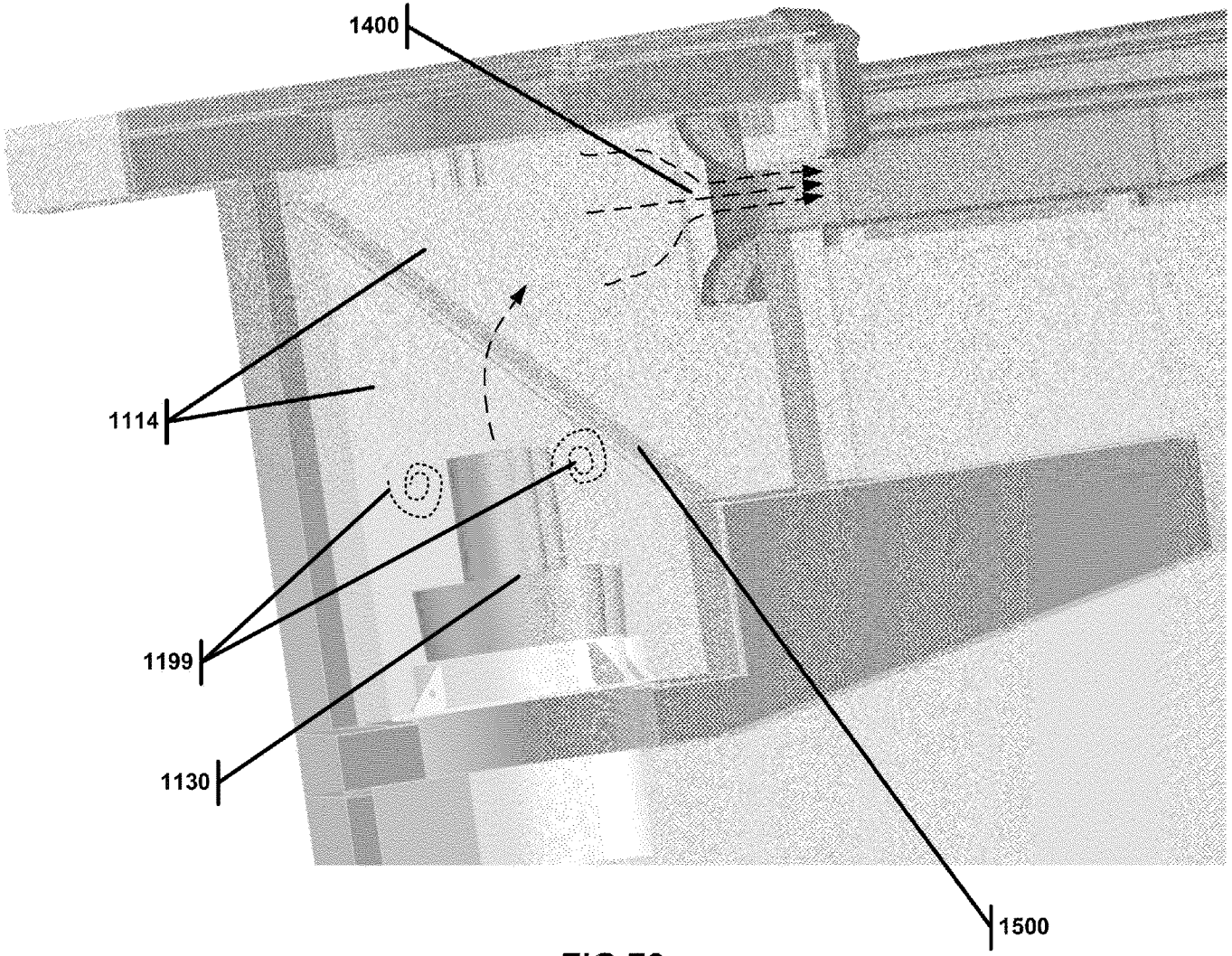
FIG. 70 is a cross-sectional perspective view along the line A-A of FIG. 64, partly cut away, showing an example embodiment with horizontal and angled water smootheners.

To provide still smoother water to the channel 1110, an additional second water smoothener 1500 may optionally be added, as shown in FIGS. 65, 67 and 70. For maximum effectiveness in the embodiment shown in these figures, all the water that reaches smoothener 1400 should first pass through smoothener 1500. A second smoothener 1500 can be especially helpful where the direction of water flow is being changed. Turns in flowing water, especially turns approaching ninety-degree or right turns, tend to cause additional eddy currents and turbulence in the water. It has been found that these turn-induced eddy currents can be lessened by placing multiple smootheners at different points through the turn, such that the smootheners may not be parallel to each other but rather are at an angle with respect to each other. For example, in the embodiments of the apparatus 1100 shown herein, the water may be recirculated essentially in a loop, as best shown in FIG. 65, in which case the water must make several ninety-degree turns. Specifically in these example embodiments, the pumps 1130 are vertical oriented as that design can be easier and less expensive to manufacture, install, operate and maintain, and can provide lower water speeds than horizontally oriented pumps, which eases the challenge of smoothening the water flow. But in the present example embodiments, water exiting the vertically oriented pumps 1130 must make a ninety degree turn within reservoir 1114 before entering throat sections 1111 and flowing out into the channel 1110. Accordingly, adding a second water smoothener *1*500 to apparatus *1*100, as shown in FIGS. 65, 67 and 70, and positioning that second water smoothener 1500 part-way through the turn, not parallel to the first water smoothener 1400 but at an angle thereto (in this case, at a forty-five degree angle), substantially reduces turbulence in the water flowing into the channel 1110. Note that water smootheners 1400, 1500 may be physically attached in one assembly, but if so they still constitute multiple water smootheners for purposes of this specification if individual arrays of apertures are oriented at an angle to one another as described herein.

In these example apparatus, an initial smooth and streamlined flow of relatively deep water enters the channel 1110 at foil 1112. In one embodiment, the water velocity at the inlet end of the channel is around 12 feet per second while the water depth is around 0.7 feet. In alternative embodiments, the velocity may be in the range of around 8 to 25 fps, and the water depth may be in the range from 0.5 to 3.5 feet. Part of the water in the left hand half of the channel 1110 (left hand from the perspective of facing the oncoming flow of water) as viewed in FIG. *6*5 rises up the leading face 1145 and bends laterally towards the venturi pass 1148. The water moving in a substantially laminar manner over the leading face 1145 is of sufficient depth and velocity to support surfing maneuvers on various types of surfing equipment such as surfboards, bodyboards, and small kayaks known as playboats. At the same time, water moving towards the venturi face 1146 of foil 1140 combines with deflected water from leading face 1145 to create a standing barreling wave in front of the leading face and venturi face extending laterally into the venturi pass 1148. Riders can therefore ride in the barrel wave on a surfboard or bodyboard, where the apparatus is used as a water park attraction or ride. Alternatively, the apparatus on a smaller scale can be used for a visual or ornamental water feature (like a fountain) in parks, gardens, and other locations. The opposing channel wall 1122 receives some of the water with some spilling onto the river bank 1116 and/or running downstream to the grating or drain 1126, and then draining into passageway 1128 extending under floor 1124 where the water is then pumped by pumps 1130 back into the reservoir 1114, and optionally through smootheners 1400 and/or 1500 to start the cycle over again.

The stream or flow rate of water arriving at the venturi pass is related to the size of the barreling wave formed at the pass. The faster the incoming rate, the bigger the wave. The venturi pass 1148 and venturi face 1146 are shaped to impede the flow of water so that the barrel is supported by deeper water through the pass. If the pass is too constricted, the barrel wave drowns and collapses. If the pass is not restricted enough, the barrel is smaller or non-existent, although there is still a surfable wave face in front of the foil 1140. The venturi face is positioned close enough to the channel side wall 1122 for the water flow to be impeded sufficiently to form a standing barreling wave. In the illustrated embodiment, the width of the venturi pass at the base of the channel is of the order of 37 inches and the overall channel width is around 20 feet. The venturi pass width is varied depending on the size of the channel and foil and the water stream rate characteristics. In general, the venturi pass width is approximately the same as the height of foil 1120, and the maximum height of the foil is approximately the same as the desired wave height.

On arriving at the venturi pass 1148, the water transitions from its initial shallower, higher speed condition ahead of leading edge of venturi face 1145 to a substantially deeper stream above the venturi face and into the venturi pass. After pitching out and forming the barrel, the water lands primarily in the venturi pass area on top of the primary stream. This is a safety advantage, since riders can land in water. The primary stream serves to force the low energy water continuously through the venturi pass and over beta foil 1125.

The standing barrel wave created by the above embodiments is like a river wave created at a narrows. The venturi gap 1148 simulates a narrows, with the shape of the leading face 1145 and venturi face 1146 of the barrel wave forming foil 1140 enhancing the formation of the standing wave. The tilting away of the leading end of the venturi face 1146 from the channel wall 1122 provides a bottom contour at which water piles up on top of the foil in a controlled way. The dimensions of the venturi pass 1148 together with the design of the venturi face 46 impedes water flow and supports the barrel through the pass 1148. The deflection of some of the water flow by the oblique angle and shape of the leading face 1145 of the foil 1140 creates streamlines with a lateral velocity component towards the venturi gap 1148 that collide with streamlines flowing substantially downstream into the venturi pass zone, creating a wave shaped face and a barreling section in the venturi pass 1148. Adjustment of the angle of the leading face 1145 causes the barreling wave to move across the face 1145. At the same time, excess water is allowed to spill out onto the adjacent river bank 1116 and run downstream.

By locating the barreling wave generating foil 1140 upstream of a spoiler 1143 and bed form 1125 designed to create a standing wave, two or more different waves may be created in the channel 1110 under some flow conditions, or the barreling wave forming foil or foils 1140 may be removed from the floor 1124 when only a standing wave is desired. Where there are two separate barreling wave forming foils, only one may be deployed so that a barreling wave is formed in one half of the channel with a standing wave downstream extending across at least the other half of the channel. Alternatively, multiple foils 1140 may be deployed simultaneously or alternately, and may be at different angles to create different barreling wave effects. This allows for a number of different wave variations to increase participants' interest in the ride. To perform well, however, the water flowing through the channel into the waves must be laminar with minimized eddy currents, which can be achieved at least in part with the system of one or more water smoothers disclosed herein.

Figure 75:
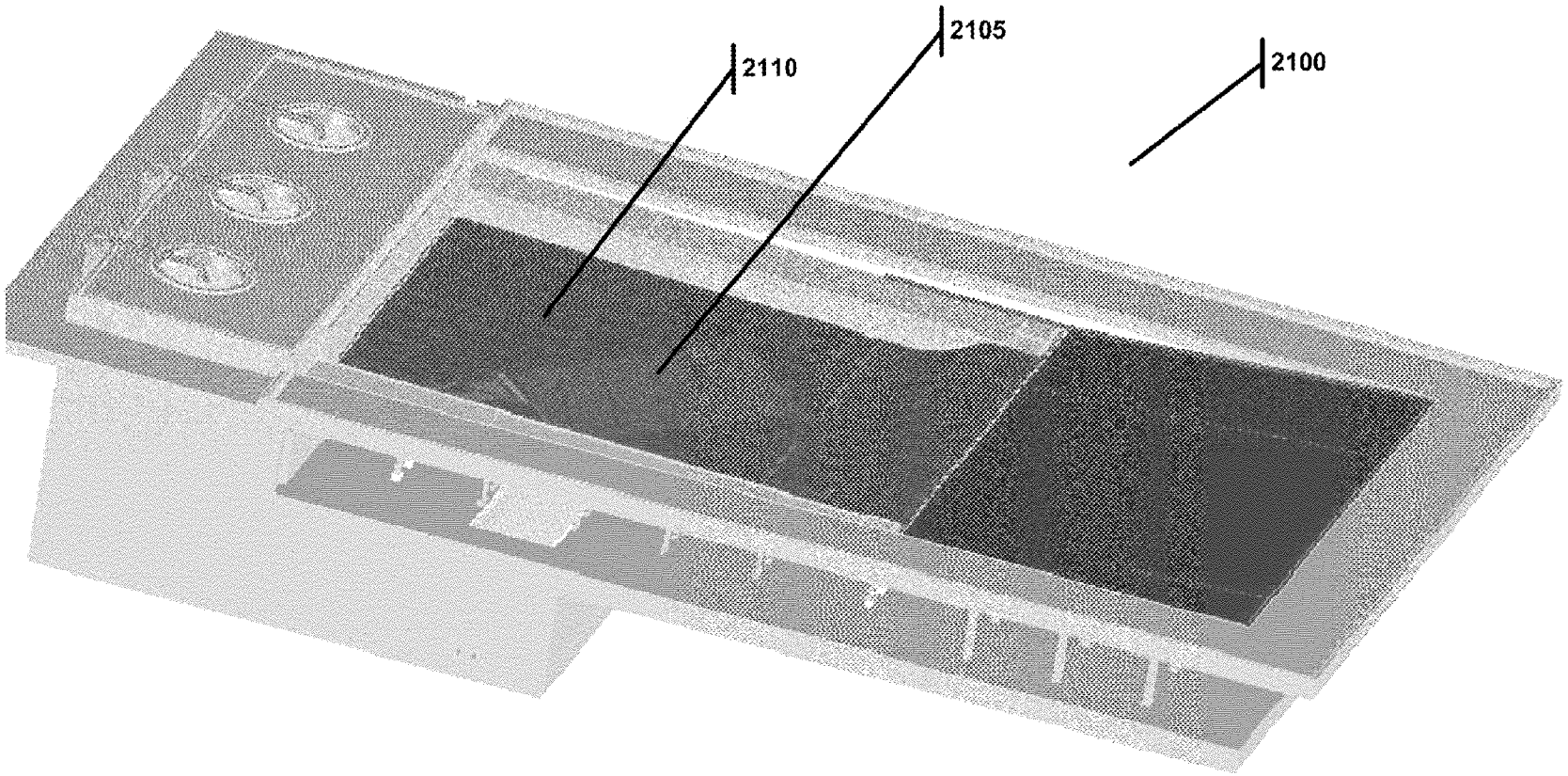
FIG. 75 is a perspective view of a wave forming apparatus according to one embodiment having an oblique foil with a steep upper section and a less-steep lower section.
Figure 76:
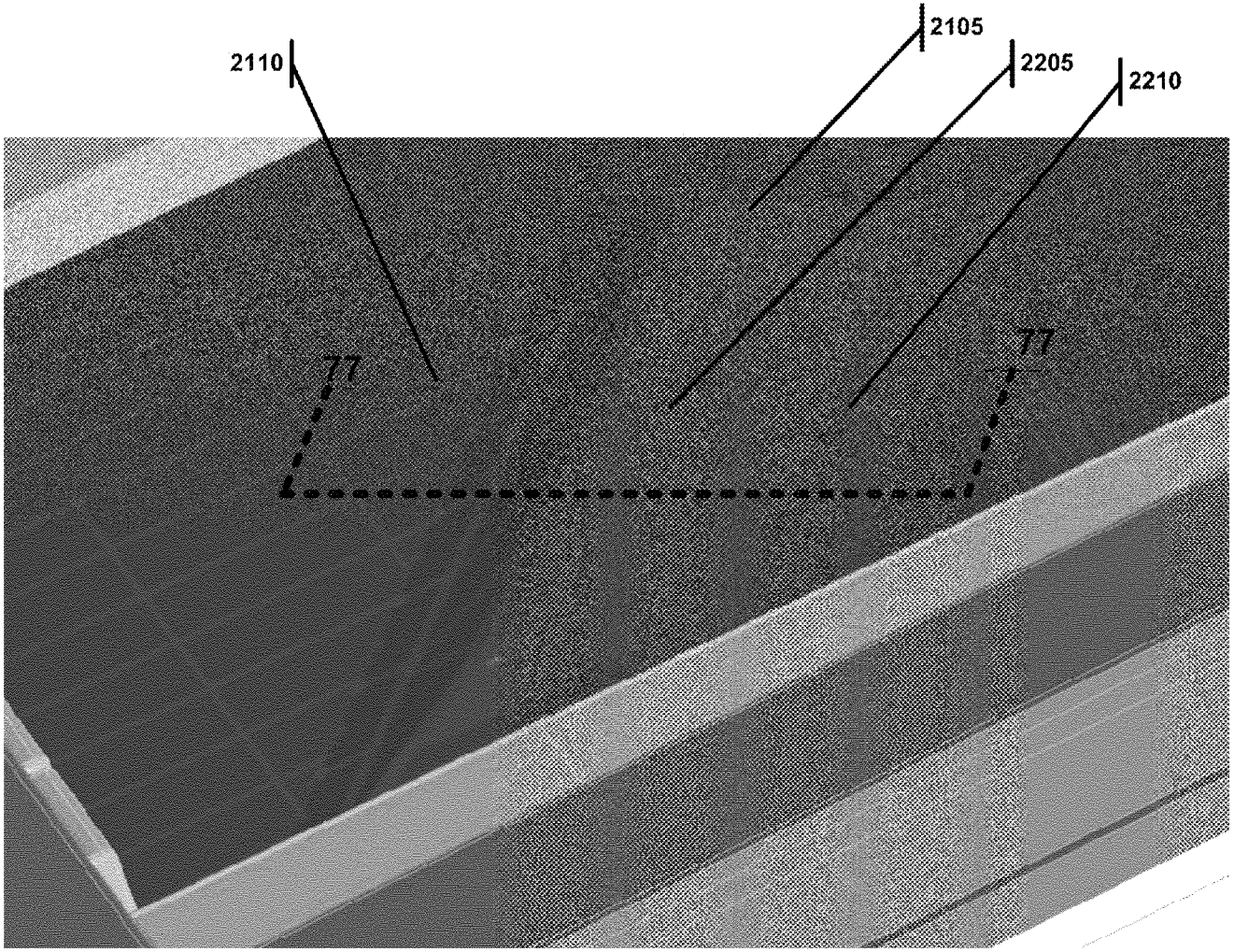
FIG. 76 is a closer perspective view of the wave forming apparatus of FIG. 75.
Figure 77:
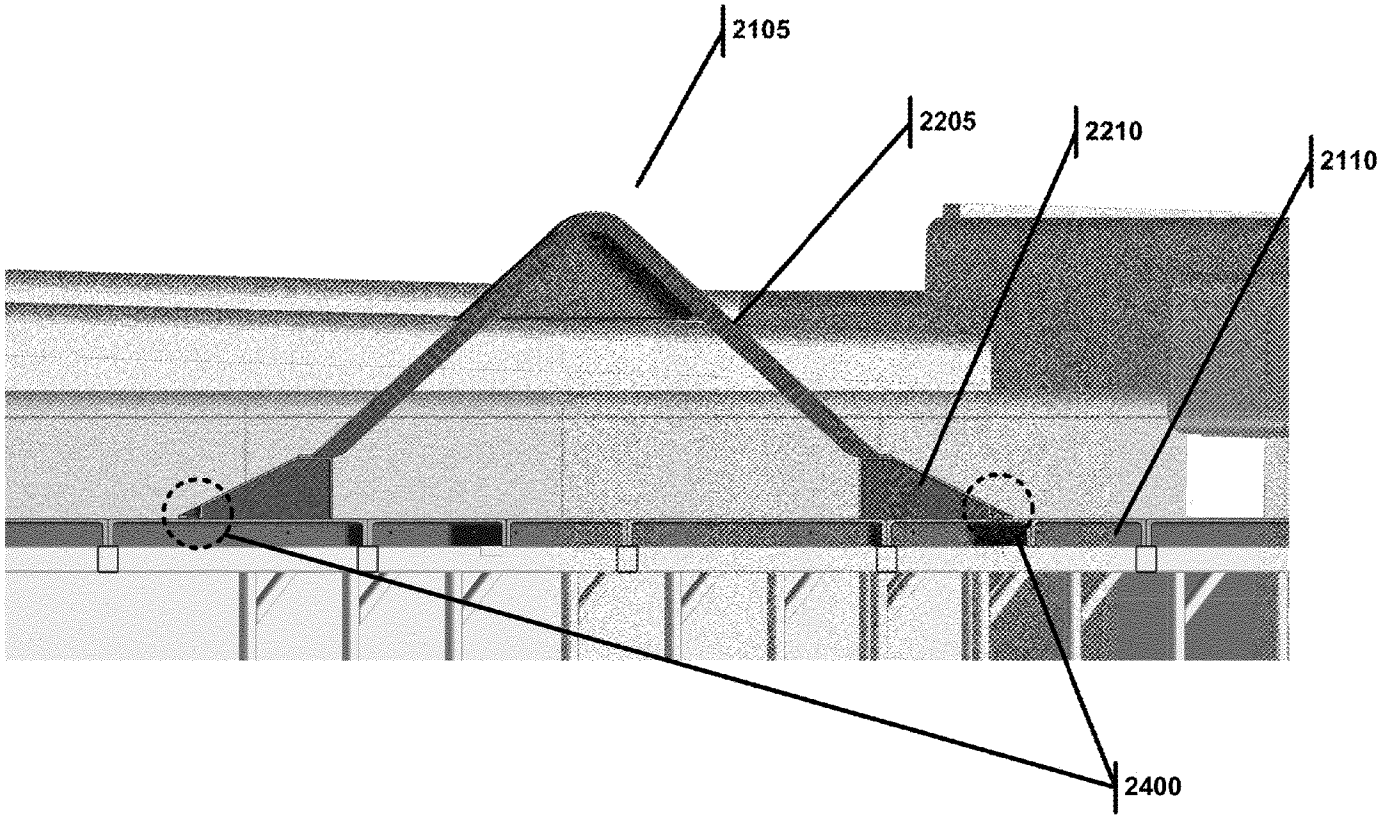
FIG. 77 is a cross-sectional perspective view along the line 77-77 of FIG. 76, showing construction of the foil in that embodiment.

FIGS. 75, 76, and 77 illustrate an example embodiment of an improved wave forming apparatus 2100 designed to form barreling waves. An apparatus 2100 may comprise a wave forming channel 2110 for containing a flow of water. Except as otherwise provided herein, an example wave forming apparatus 2100 may be similar to the apparatus described with respect to FIGS. 1, 2, 3, 4, 7, 8, 9A and 11 in application Ser. Nos. 12/700,036 and 12/700,042, both filed Feb. 4, 2010, and/or may be similar to FIGS. 39-41 in pending application Ser. No. 11/958,785 filed Dec. 18, 2007, all of which are incorporated herein in their entireties by reference.

A bed form, such as one or more barreling wave forming foils 2105 may be mounted in the channel 2110 at, for instance, an oblique angle to the flow direction of water along the channel 2110, as shown in FIG. 75. The example bed form 2105 of this embodiment may be of hollow construction entirely or in part, and may include additional features not shown, such as vents for providing additional flow paths for the water, as described in various applications incorporated herein by reference. Bed forms may alternatively be of solid or any other appropriate construction.

As best illustrated in FIG. 76, the exterior profile of a bed form, such as one or more barreling wave forming foils 2105, may be provided with a base section 2210 adjacent to the wave forming channel 2110, the exterior profile of the base section 2210 defining a first, non-abrupt angle to the direction of flow of water in the wave forming channel 2110. In some embodiments the first angle is, for example, less than forty-five degrees (i.e., the first angle is the included angle between the exterior profile of the base section 2210 and the floor of the water forming channel 2110). The base section 2210 may extend upward and transition to an upper section 2205 at a second, steeper angle to the direction of water flow. In some embodiments the second angle is, for example, greater than thirty degrees (i.e., the second angle is the included angle between the exterior profile of the upper section 2205 and the floor of the water forming channel 2110). The exterior profiles of the base section 2210 and/or the upper section 2205 may define at least in part nominally flat panels. Nominally flat panels may not be perfectly flat due to manufacturing and assembly variations. The base section 2210 and/or the upper section 2205 may be formed on one or more leading sides of the bed form (i.e., the side(s) facing toward the oncoming flow of water), and/or on one or more trailing sides of the bed form (i.e., the side(s) facing away from the oncoming flow of water). Alternatively, as in the example shown in FIG. 76, a base section 2210 and an upper section 2205 may be formed on all sides of the bed form 2105 that interface with the wave forming channel 2110.

FIG. 77 shows a cross-section of an example bed form, namely a barreling wave forming foil 2105, including a base section 2210 with an exterior profile defining a first, non-abrupt angle to the direction of flow of water in the wave forming channel 2110, where the base section 2210 transitions to an upper section 2205 that forms an exterior profile defining a second, steeper angle to the direction of water flow (that direction being generally from left to right, or right to left, in the orientation shown in FIG. 77). In the example shown in FIG. 77, the base section 2210 is formed from a first structure and the upper section 2205 is formed from a second structure connected to the first structure. The first structure may be permanently connected to the second structure, for instance by welding, or may be removably connected to the second structure, for instance by fasteners (not shown). In the example embodiment shown in FIG. 77, the bed form, a barreling wave forming foil 2105, is at least approximately symmetrical about a central vertical axis. In other embodiments, the bed form may be non-symmetrical about a central vertical axis, such that the leading and trailing sides of the bed form have base sections 2210 with exterior profiles that define different included angles to the wave forming channel 2110, and/or such that the leading and trailing sides of the bed form have upper sections 2205 with exterior profiles that define different included angles to the wave forming channel 2110.

In other embodiments, bed forms may be provided with additional sections with exterior profiles that define additional angles to the wave forming channel 2110, for instance three sections with three increasingly steep angles (not shown). Providing a bed form with multiple sections that define an exterior profile that increases in steepness as it rises above the wave forming channel 2110 tends to allow the water in the wave forming channel 2110 to flow better by limiting the amount of water backup near the base of the bed form, because the water meets the bed form at a gentler angle. This tends to generate smoother water and a better wave. Additionally, multi-angle designs incorporating substantially flat sections are typically substantially easier and less expensive to construct than concave or otherwise rounded sections.

Bed forms, such as a barreling wave forming foil 2105, may be permanently connected to the wave forming channel 2110, for instance by welding, or may be removably connected to the wave forming channel 2110, for instance by fasteners or a fastener system, an example of which is described in the following section.

While bed form shapes have historically been permanently formed into the profile of the wave forming channel 2110, the present inventor has invented bed forms that may also comprise separate modular components that can be removably secured in the channel 2110 in various locations and positions as desired, as described in prior applications incorporated herein. For instance, one or more barreling wave forming foils 2105 may each be separately constructed modular components adapted to be attached to, removed from, repositioned in and reoriented in channel 2110. While any appropriate fastening or restraint means may be used, an example fastener system specially adapted to removably attach a bed form to a wave forming apparatus is described below.

FIG. 77 shows an example fastener system 2400, shown in greater detail in FIGS. 78A, 78B, 78C, 78D, 79 and 80. System 2400 may include a first oblong, elongated, or otherwise non-round through-hole 2405 formed in a bottom surface 2411 of a bed form, such as the base section 2210 of a barreling wave forming foil 2105. In certain embodiments, the system 2400 may further include a second oblong, elongated, or otherwise non-round through-hole 2115 formed in the channel 2110. In the example shown in the above figures, holes 2405 and 2115 are adapted to match in size, orientation and location upon mounting the bed form into the channel 2110. Alternatively, the hole 2115 in the channel 2110 may be a smaller size and/or a different shape than hole 2405, for instance to prevent a fastener placed into hole 2405 from falling through hole 2115.

In the example shown in the above figures, holes 2405 and 2115 are adapted to accept a twistlock fastener 2600, as shown in FIGS. 78C, 78D, 79 and 80. In the example shown in FIG. 80, a twistlock fastener 2600 includes a longitudinally-extending main body 2605 having a top portion and a bottom portion and an oblong, elongated, or otherwise non-round cross-section adapted to fit in but not rotate within correspondingly sized and shaped holes 2405 and 2115. Rotationally attached to the top portion of the main body 2605 is a top locking member 2610, and rotationally attached to the bottom portion of the main body 2605 is a bottom locking member 2615. Top and bottom locking members 2610, 2615 may be rotationally attached to the main body 2605 by any suitable means, for example by rotation-permitting members 2620, which may include, for instance, a screw, a bolt, a rivet, or a shaft having a head or other means for retaining the locking members 2610, 2615 to the main body 2605, such as a retaining clip (not shown). The twistlock fastener 2600 may be formed from any suitable material, such as stainless steel.

Figure 78A:
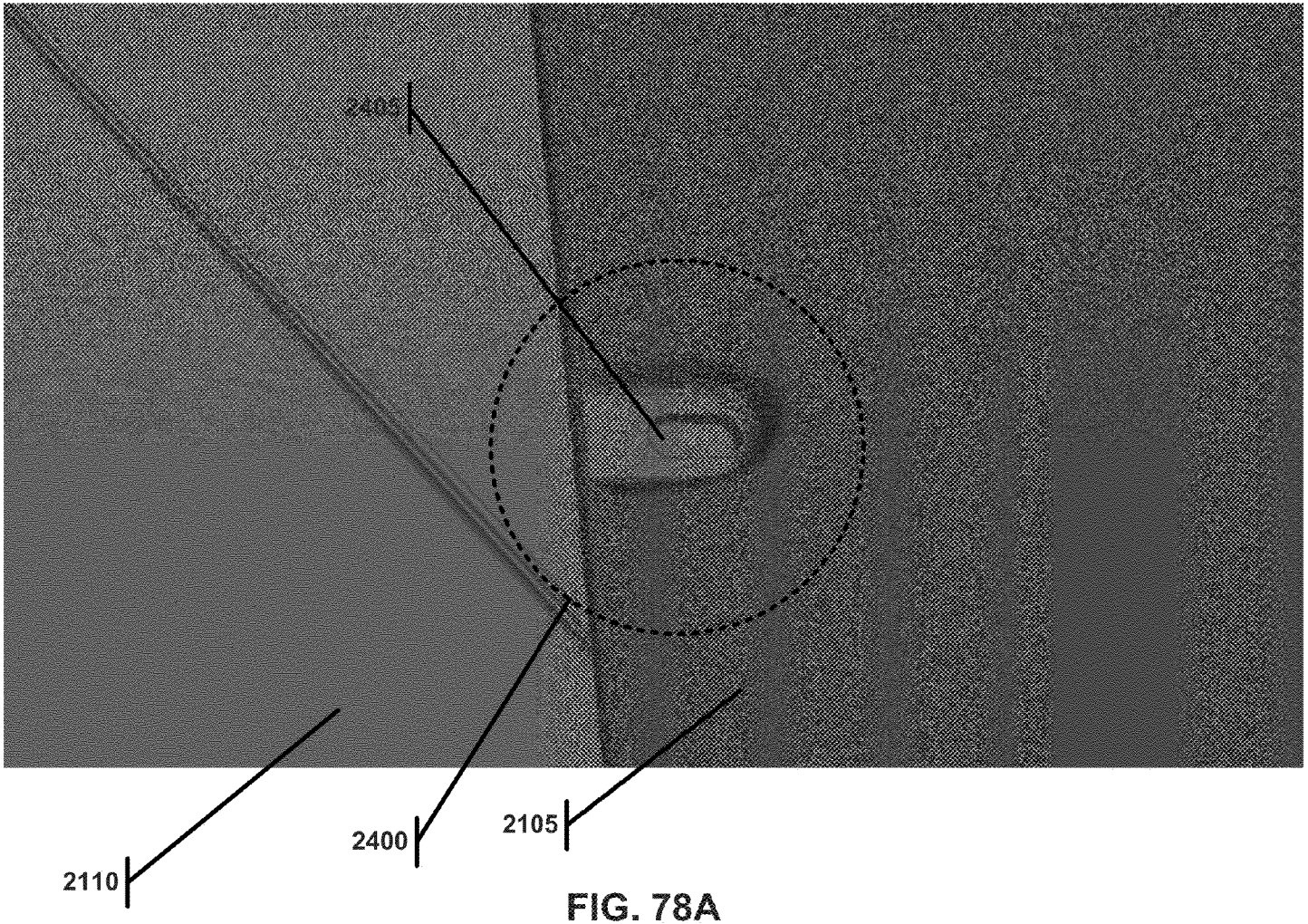
FIG. 78A is a perspective top view of the wave forming apparatus of FIG. 75, showing a recess and oblong hole formed in the foil adapted to interface with a fastener according to one embodiment.
Figure 78C:
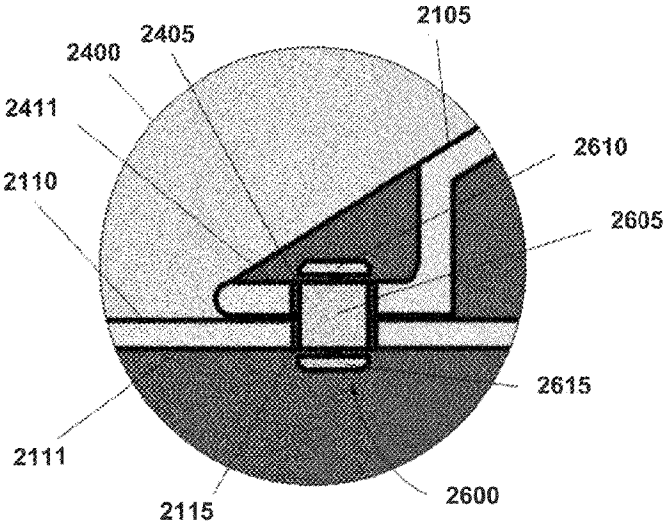
FIG. 78C is a cross-sectional side view along the line 77-77 of FIG. 76, partly cut away by line 2400 as shown in FIG. 77, showing the wave forming apparatus of FIG. 78B, with a fastener according to one embodiment installed in an unlocked position.
Figure 78B:
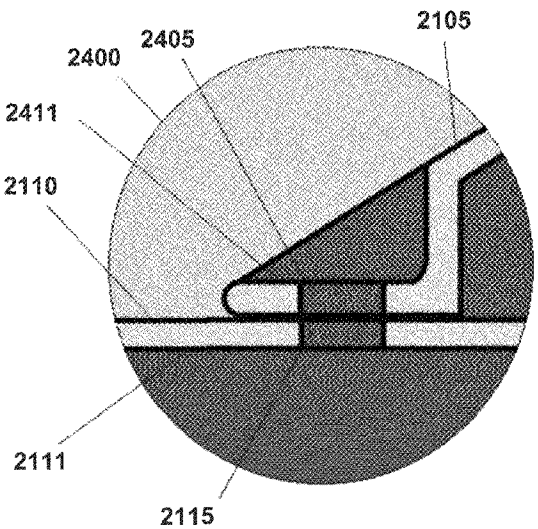
FIG. 78B is a cross-sectional side view along the line 77-77 of FIG. 76, partly cut away by line 2400 as shown in FIG. 77, showing oblong holes formed in the foil and the bottom of the flume adapted to interface with a fastener according to one embodiment.
Figure 78D:
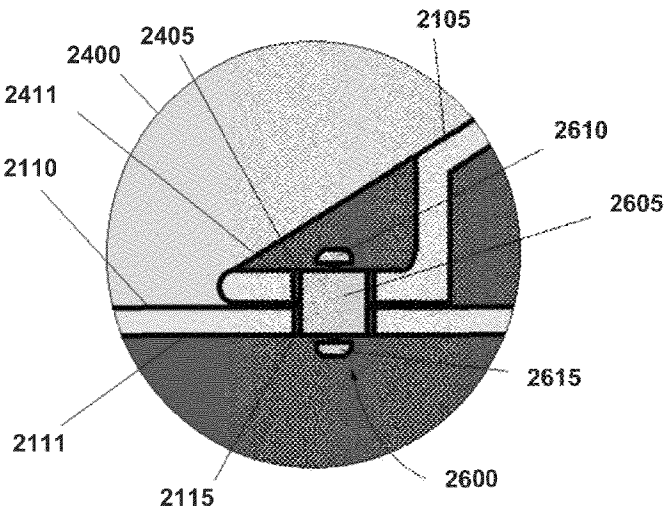
FIG. 78D is a cross-sectional side view along the line 77-77 of FIG. 76, partly cut away by line 2400 as shown in FIG. 77, showing the wave forming apparatus of FIG. 78C according to one embodiment, with the fastener installed in a locked position.
Figure 79:
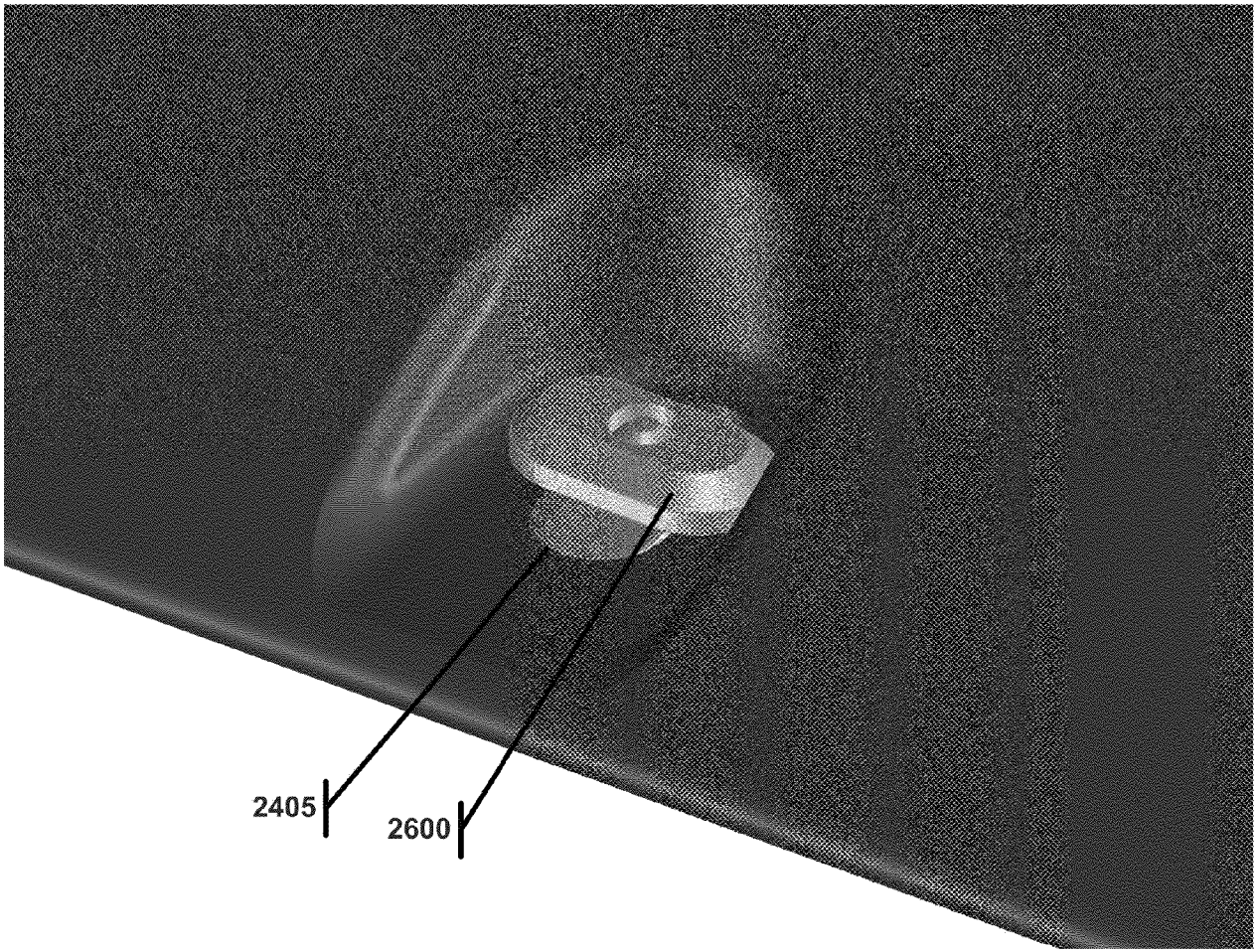
FIG. 79 is a perspective top view of the wave forming apparatus of FIG. 78D according to one embodiment, showing the fastener installed in a locked position.
Figure 80:
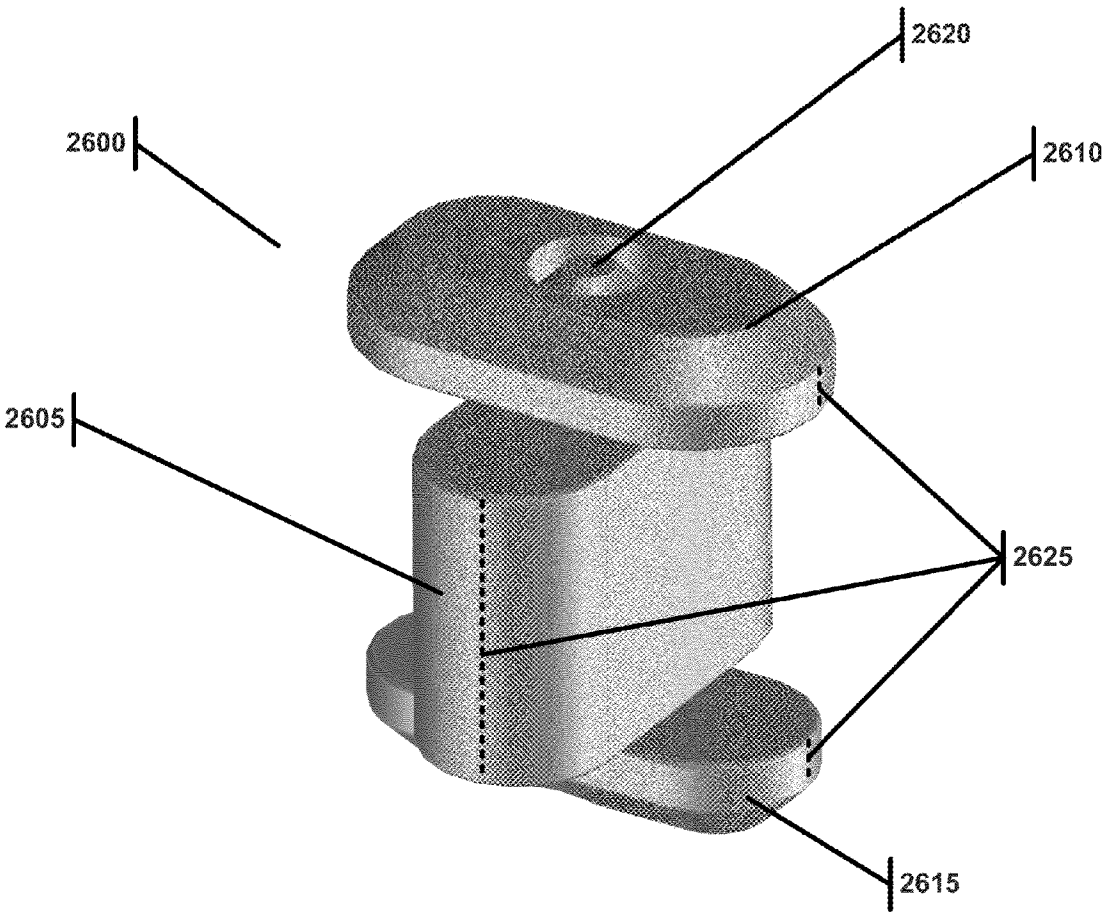
FIG. 80 is a perspective top view of the fastener of FIGS. 78C and 78D according to one embodiment, showing the fastener in a locked position.

In the example shown in the above figures, the twistlock fastener 2600 may be installed in holes 2405 and 2115 when the top and/or bottom locking members 2610, 615 are rotationally aligned with the main body 2605. As shown in FIG. 80, such alignment would be achieved by rotating said pieces until dashed lines 2625 were aligned. FIG. 78C shows an example twistlock fastener 2600 installed in holes 2405 and 2115 with the locking members 2610, 2615 rotationally aligned with the main body 2605. Rotating locking members 2610, 2615 relative to the main body 2605, which is rotationally trapped within holes 2405, 2115, locks the twistlock fastener 2600 in place, as shown in FIGS. 78D and 79. Specifically, when bottom locking member 2615 is rotated (for instance approximately 45 to 135 degrees, such as for instance 90 degrees) relative to the main body 2605 as shown in FIG. 80, then any attempt to move twistlock fastener 2600 upwards (i.e., towards the bed form 2105) will cause the bottom locking member 2615 to push upward against the bottom surface 2111 of the channel 2110. Likewise, when top locking member 2610 is rotated (for instance approximately 45 to 135 degrees, such as for instance 90 degrees) relative to the main body 2605 as shown in FIG. 80, then any attempt to move twistlock fastener 2600 downwards (i.e., towards the channel 2110) will cause the top locking member 2610 to push downward against an upper surface 2411 of the bed form 2105. Accordingly, once the example twistlock fastener 2600 is installed in holes 2405 and 2115 with the locking members 2610, 2615 rotated with respect to the main body 2605, as shown in FIGS. 78D and 79, then the bed form 2105 will be securely fastened to the channel 2110, preventing both vertical and lateral relative movement between the bed form 2105 and the channel 2110. Unfastening the bed form 2105 from the channel 2110 is achieved by simply rotationally realigning either the top and/or bottom locking members 2610, 2615 with the main body 2605, such that dashed line segments 2625 would be aligned, and removing the twistlock fastener 2600 from the holes 2405, 2115, after which the bed form 2105 may be lifted off and/or moved on the channel 2110. The fastener system 2400 described herein may be used to connect a bed form or similar feature to any portion of a channel 2110, including the bed or floor, and/or the walls thereof. The foregoing system 2400 is quick and easy for a user to manipulate and may be adapted for use by hand without tools. The fastener system 2400 may be located in recessed areas of a bed form 2105, as shown most clearly in FIGS. 78A and 79, in some embodiments under removable covers (not shown).

The above described improvements may be incorporated in a wave forming apparatus that uses multiple chambers such as those described in patent application Ser. Nos. 13/603,223, 13/411,520 and 13/740,419, all by the present inventor, all of which are incorporated herein by reference.

This disclosure uses the terminology weir, bed form and foil to describe guide devices that guide the flow of water to produce a wave. Apparatus as described in each of the above embodiments may be scaled up or down depending on the type of water attraction desired. At a smaller scale it is suitable for inner tubing rather than surfing, and at an even smaller scale it may be used for a visual, fountain-like water feature rather than a ride. Larger scales of the apparatus may be used for surfing sports parks and events.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

[1. A wave forming apparatus for producing a rideable barreling wave, comprising:

a wave forming channel which contains a flow of water, the channel comprising:
a floor, side walls, an inlet end and an exit end; and
a wave guide comprising;
a pivot or hinge connected to the floor;
a surface having a leading edge connected to the pivot or hinge and an edge opposite to the leading edge and the opposite edge is not connected to the channel floor, the surface forming a pitch angle with the channel floor; and
an actuator connected to the surface adapted to adjust the pitch angle;
a pump adapted to pump water into the inlet end of the channel, over the leading edge and over the wave guide, wherein the pump, during operation, is adapted to produce a water level in the channel sufficient to enable the formation of the rideable barreling wave;
wherein the opposite edge rotates about the pivot by the pitch angel adjustment;
a passageway connected to the pump with an opening downstream of the wave guide, the passageway constructed to deliver water through the opening in a direction that is not parallel to the flow of water in the channel, said delivery assisting in the formation of the rideable barreling wave.]

[2. The apparatus of claim 1, further adapted to change the characteristics of the wave when the pitch angle is changed.]

[3. The apparatus of claim 1, wherein the surface is generally flat to slightly convex.]

[4. The apparatus of claim 1, wherein the floor defines an opening, and the wave guide is disposed at least partially within that opening, and a portion of the actuator is beneath the floor.]

[5. The apparatus of claim 4, wherein the pitch angle is zero when the surface is generally flush with the floor.]

[6. The apparatus of claim 1, wherein the pitch angle is between 0 and 90 degrees.]

[7. The apparatus of claim 1, further comprising an inclined ramp connected to the floor proximate the inlet end, the inclined ramp having an elevated portion that is higher than the floor, the elevated portion connected with the pump, the inclined ramp adapted to discharge the water into the channel.]

[8. The apparatus of claim 1, further comprising:
a conduit connected to the pump and connected to the exit end, and
wherein the channel comprises an overflow at the exit end adapted to allow water to flow from the channel into the conduit, the position of the overflow regulating the water level in the channel.]

[9. The apparatus of claim 1, wherein the pump is oriented in a direction that is generally perpendicular to the channel floor.]

[10. The apparatus of claim 1, wherein the wave guide comprises a plurality of wave guides.]

[11. The apparatus of claim 1, wherein the pump comprises a plurality of pumps.]

[12. The apparatus of claim 1, further comprising a structure at the exit end, the structure adapted to cause the water to back up into the channel, enhancing the formation of the rideable barreling wave.]

[13. A wave forming apparatus for producing a rideable barreling wave, comprising:
a wave forming channel which contains a flow of water, the chnnel comprising:
a floor, side walls, an inlet end and an exit end; and
a wave guide comprising;
a pivot or hinge connected to the floor;
a surface having a leading edge connected to the pivot or hinge, the surface forming a pitch angle with the channel floor; and
an actuator connected to the surface adapted to adjust the pitch angle;
a pump adapted to pump water into the inlet end of the channel, over the leading edge, and over the wave guide, wherein the pump, during operation, is adapted to produce a water level in the channel sufficient to enable the formation of the rideable barreling wave;
a passageway adapted to return water from the exit end to the pump; wherein a portion of the actuator is disposed of in the passageway; and
a secondary passageway connected to the pump with an opening downstream of the wave guide, the secondary passageway constructed to deliver water through the opening in a direction that is not parallel to the flow of water in the channel, said delivery assisting in the formation of the rideable barreling wave.]

[14. The apparatus of claim 13, wherein the passageway comprises a passageway floor and the actuator is fixed to the passageway floor.]

[15. A wave forming apparatus for producing a wave, comprising:
a wave forming channel which contains a flow of water, the channel comprising:
a floor, side walls, an inlet end and an exit end; and
a wave guide comprising;
a pivot or hinge connected to the floor;
a surface having a leading edge connected to the pivot or hinge, the surface forming a pitch angle with the channel floor; and
an actuator connected to the surface adapted to adjust the pitch angle;
a pump adapted to pump water into the inlet end of the channel and over the wave guide, wherein the pump, during operation, is adapted to produce a water level in the channel sufficient to enable the formation of the rideable wave;
a passageway adapted to return water from the exit end to the pump; wherein a portion of the actuator is disposed of in the passageway; and
wherein the passageway comprises a passageway floor and the actuator is fixed to the passageway floor.]

*16. An artificial surfing facility for producing a standing wave comprising:*
*a return channel;*
*a wave pool, an inclined ramp, a lower end of which discharges into the wave pool;*
*a flow section connected at an outlet end thereof to an upper end of the ramp;*
*at least one pump connected to an inlet end of the flow section by means of which water is conveyed from the return channel to the flow section;*
*at least one adjustable guide device in the wave pool at a distance downstream from the lower end of the ramp;*
*an overflow via which water is able to flow back from the wave pool into the return channel;*
*wherein the wave pool is positioned higher than the return channel;*
*wherein the at least one pump unit, during operation, being adapted to produce a liquid level in the wave pool sufficient to produce a defined resistance to water flowing down the ramp which will enable formation of the standing wave at the at least one adjustable guide device by a change of the flow velocity of the water.*

*17. The surfing facility of claim 16, wherein the flow section has side walls which are positioned to produce a narrowing of the flow width of the water in a direction to the lower end of the ramp.*

*18. The surfing facility of claim 16, wherein the at least one guide device comprises a plurality of adjacent guide devices extending widthwise of the wave pool.*

*19. The surfing facility of claim 16, wherein the guide devices are guide profiles which have a front edge which is directed opposite a direction of water flow and which are supported to pivot around a pivot bearing located at a downstream end of the profiles.*

*20. The surfing facility of claim 19, wherein an adjusting mechanism is provided for pivoting the profiles around the pivot bearing so as to adjust an angle of incidence of the profiles relative to the water flow.*

*21. The surfing facility of claim 19, wherein the profiles are supported in a manner enabling free floating of the front edge thereof at least in a predefined pivoting region.*

*22. The surfing facility of claim 18, wherein the guide profiles are located at different positions relative to each other in a lengthwise direction of the wave pool.*

*23. The surfing facility of claim 16, wherein the overflow is located in the rear wall of the wave pool.*

*24. The surfing facility of claim 16, wherein the adjustable guide device comprising:*

*a pivot or hinge connected to a floor of the wave pool;*

*a surface having a leading edge connected to the pivot or hinge and an edge opposite to the leading edge and the opposite edge is not connected to the wave pool floor, the surface forming a pitch angle with the wave pool floor; and*

*an actuator connected to the surface adapted to adjust the pitch angle.*

*25. The surfing facility of claim 16, wherein the wave pool is positioned above the return channel.*

*26. An artificial surfing facility for producing a standing wave comprising:*

*a return channel;*

*a wave pool, an inclined ramp, a lower end of which discharges into the wave pool;*

*a flow section connected at an outlet end thereof to an upper end of the ramp;*

*at least one pump connected to an inlet end of the flow section by means of which water is conveyed from the return channel to the flow section;*

*at least one adjustable guide device in the wave pool at a distance downstream from the lower end of the ramp; an overflow via which water is able to flow back from the wave pool into the return channel;*

*wherein the at least one pump unit, during operation, being adapted to produce a liquid level in the wave pool sufficient to produce a defined resistance to water flowing down the ramp which will enable formation of the standing wave at the at least one adjustable guide device by a change of the flow velocity of the water.*

* * * * *